US006267476B1

(12) United States Patent
Kato et al.

(10) Patent No.: US 6,267,476 B1
(45) Date of Patent: Jul. 31, 2001

(54) METHOD AND APPARATUS FOR INK-JET PRINTING

(75) Inventors: Masao Kato; Hiromitsu Hirabayashi, both of Yokohama; Jiro Moriyama, Kawasaki; Hiroshi Tajika; Toshiharu Inui, both of Yokohama; Yutaka Kurabayashi, Tokorozawa; Hitoshi Sugimoto, Yokohama; Masaya Uetsuki, Yokohama; Minako Kato, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/251,419

(22) Filed: Feb. 17, 1999

Related U.S. Application Data

(62) Division of application No. 08/598,842, filed on Feb. 9, 1996, now Pat. No. 6,102,537.

(30) Foreign Application Priority Data

| Feb. 13, 1995 | (JP) | ................................. 7-023863 |
| Feb. 13, 1995 | (JP) | ................................. 7-023910 |
| Feb. 13, 1995 | (JP) | ................................. 7-024442 |
| Feb. 19, 1995 | (JP) | ................................. 7-024443 |
| Feb. 7, 1996 | (JP) | ................................. 8-21455 |

(51) Int. Cl.[7] ............... G01D 11/00; B41J 2/01
(52) U.S. Cl. ............... 347/100; 347/101
(58) Field of Search ............. 347/101, 96, 15, 347/43, 21, 23

(56) References Cited

U.S. PATENT DOCUMENTS

| 4,313,124 | 1/1982 | Hara ......................... 347/57 |
| 4,345,262 | 8/1982 | Shirato et al. ............ 347/10 |
| 4,459,600 | 7/1984 | Sato et al. ................. 347/47 |
| 4,463,359 | 7/1984 | Ayata et al. ................ 347/56 |
| 4,538,160 | * 8/1985 | Uchiyama ................. 347/101 |
| 4,558,333 | 12/1985 | Sugitani et al. ........... 347/65 |
| 4,599,627 | 7/1986 | Vollert ...................... 347/20 |
| 4,608,577 | 8/1986 | Hori .......................... 347/66 |
| 4,630,076 | 12/1986 | Yoshimura ............... 347/43 |
| 4,723,129 | 2/1988 | Endo et al. ............... 347/45 |
| 4,740,796 | 4/1988 | Endo et al. ............... 347/56 |
| 5,359,355 | * 10/1994 | Nagoshi et al. ........... 347/9 |
| 5,549,740 | 8/1996 | Takahashi et al. ...... 106/31.43 |
| 5,618,338 | 4/1997 | Kurabayashi et al. ... 106/31.37 |
| 5,623,294 | 4/1997 | Takizawa et al. ........ 347/98 |
| 5,625,397 | 4/1997 | Alfred et al. ............. 347/100 |
| 5,635,969 | 6/1997 | Allen ........................ 347/96 |
| 5,640,187 | 6/1997 | Kashiwazaki et al. .. 347/101 |
| 5,644,350 | 7/1997 | Ando et al. .............. 347/101 |
| 5,898,443 | * 4/1999 | Yoshino et al. .......... 347/101 |

FOREIGN PATENT DOCUMENTS

| 0578434 | 1/1994 | (EP) . |
| 0635373 | 1/1995 | (EP) . |
| 53-024486 | 3/1978 | (JP) . |
| 54-043733 | 4/1979 | (JP) . |

(List continued on next page.)

Primary Examiner—John Barlow
Assistant Examiner—Juanita Stephens
(74) Attorney, Agent, or Firm—Fitzpatrick, Cella, Harper & Scinto

(57) ABSTRACT

An ink jet printing method for performing printing onto a printing medium with the use of both of a colored ink ejected from an ink jet head and a printing property improving liquid to be applied to the printing medium for improving a printing property for an ink jet printing apparatus, having the steps of: at least one time or more printing a first colored ink on the printing medium, at least one time or more applying the printing property improving liquid onto a region printed with the colored ink, and at least one time or more printing a second colored ink on a region where the printing property improving liquid is applied.

21 Claims, 55 Drawing Sheets

FOREIGN PATENT DOCUMENTS

| | | |
|---|---|---|
| 54-056847 | 5/1979 | (JP) . |
| 55-150396 | 11/1980 | (JP) . |
| 58-128862 | 8/1983 | (JP) . |
| 59-123670 | 7/1984 | (JP) . |
| 59-138461 | 8/1984 | (JP) . |
| 60-071260 | 4/1985 | (JP) . |
| 61-249755 | 11/1986 | (JP) . |
| 63-299971 * | 12/1988 | (JP) . |
| 01114450 | 7/1989 | (JP) . |
| 6-106841 | 4/1994 | (JP) ................ B41M/5/00 |
| 6-270409 | 9/1994 | (JP) ................ B41J/2/175 |
| WO 87/03363 | 6/1987 | (WO) . |

* cited by examiner

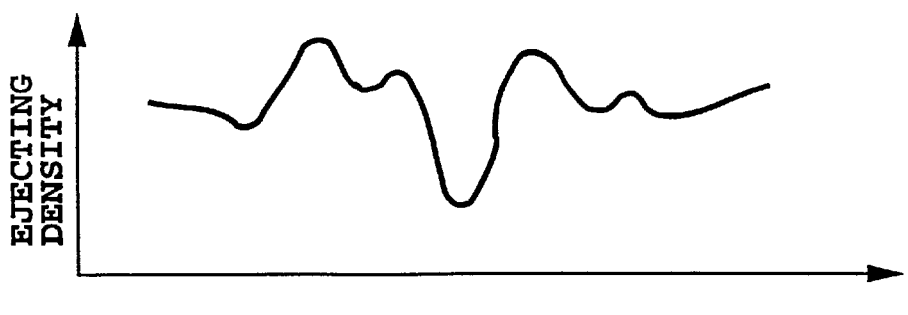
FIG.3C (PRIOR ART)
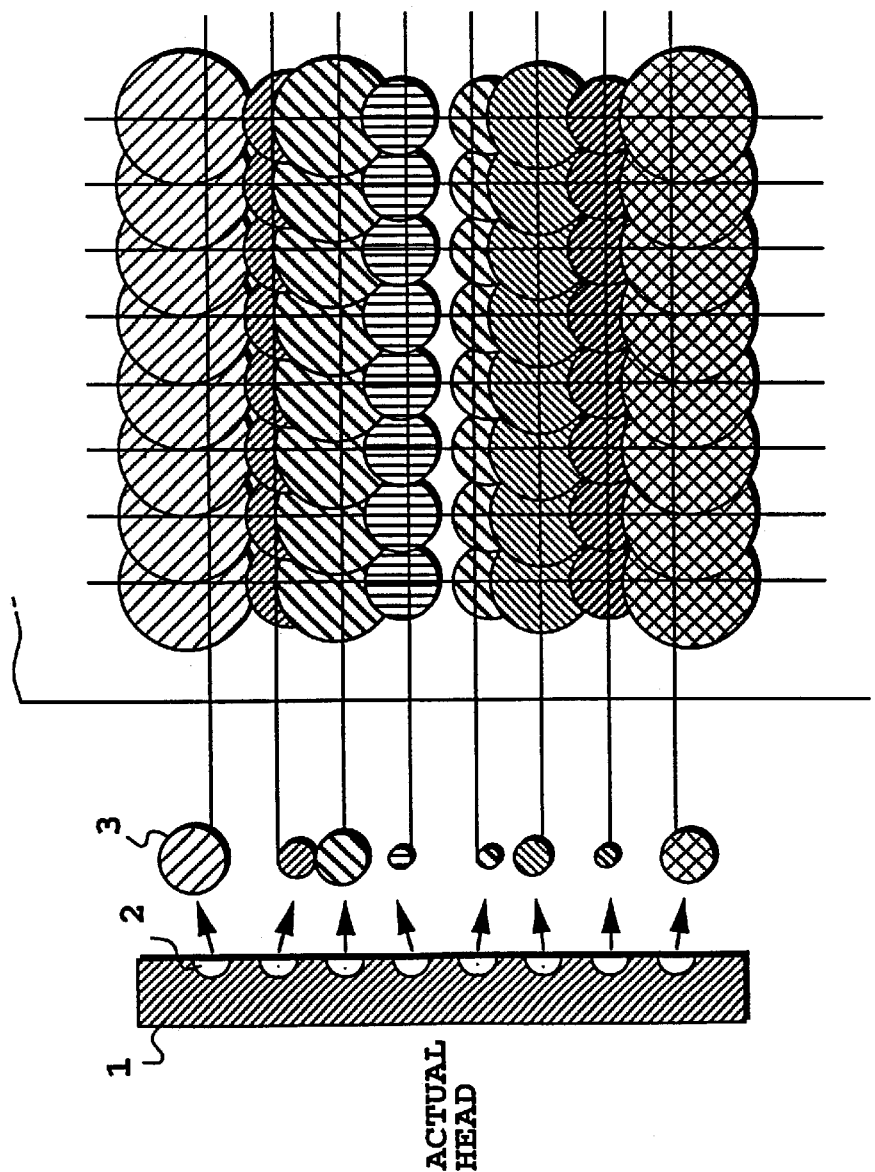
FIG.3B (PRIOR ART)
FIG.3A (PRIOR ART)

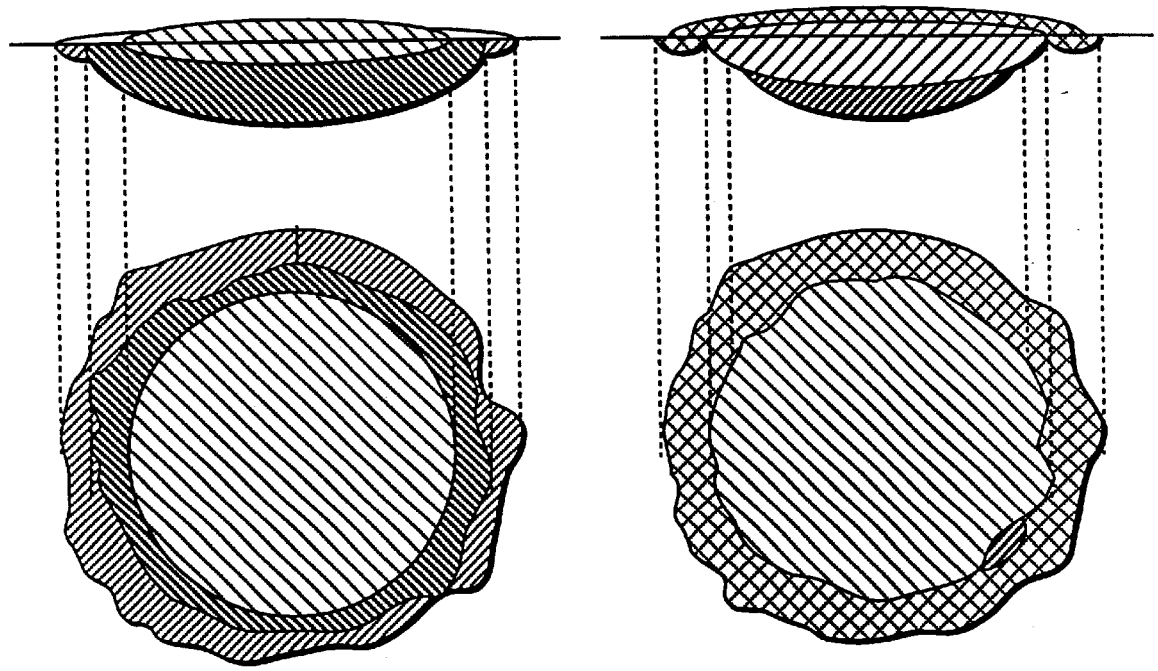
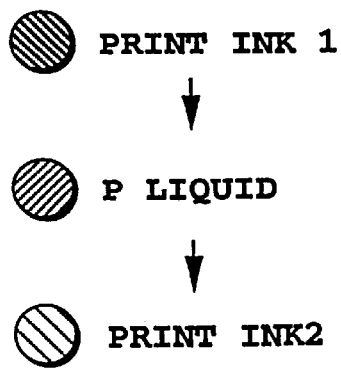
FIG.11A
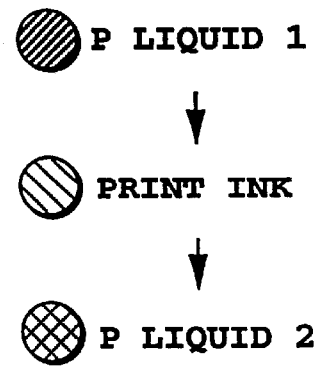
FIG.11B

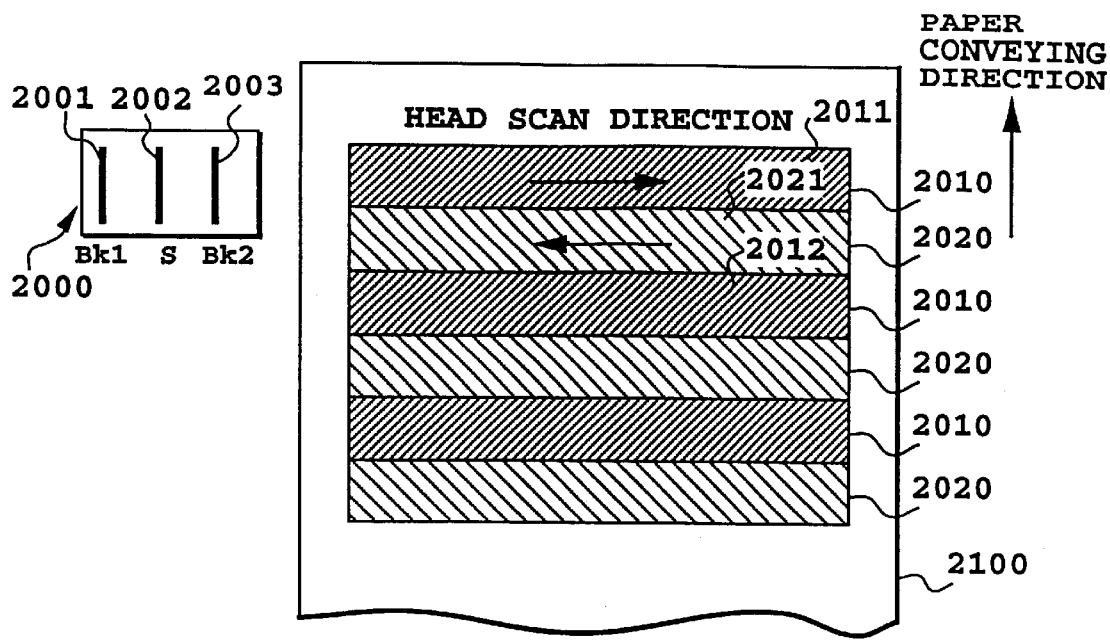
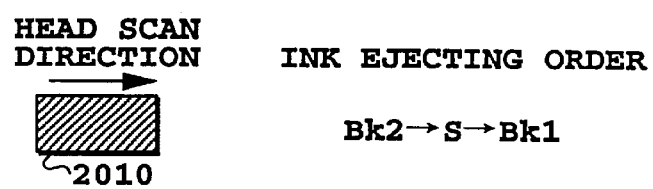
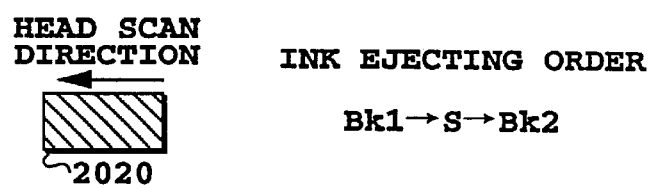
FIG.12

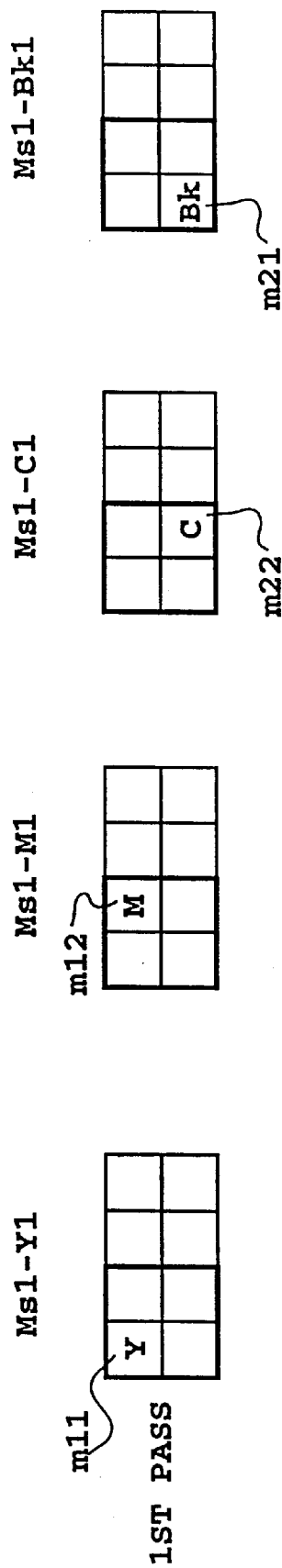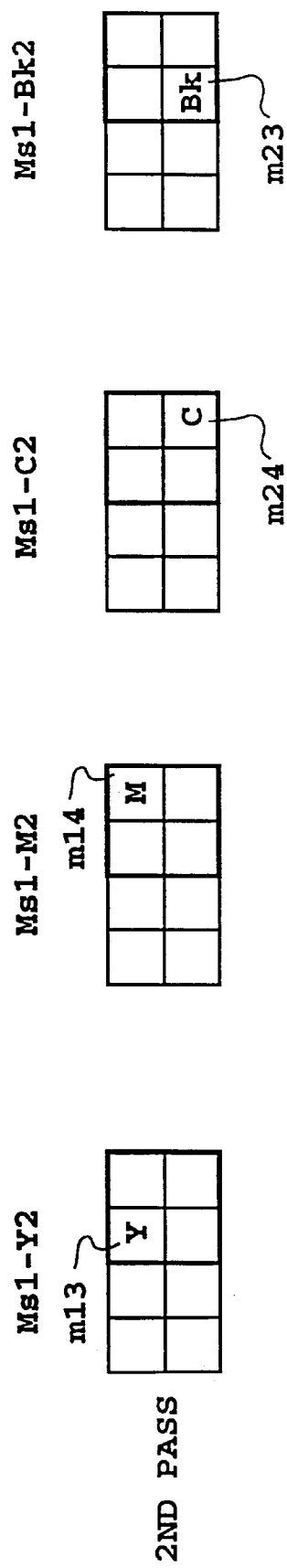

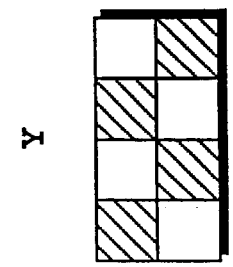
Y
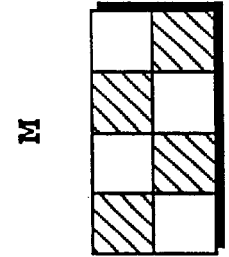
M
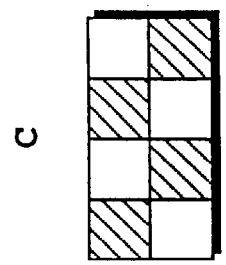
C
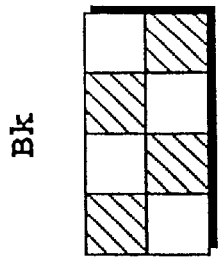
Bk
FIG.34D
1ST PASS
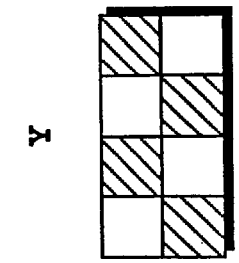
Y
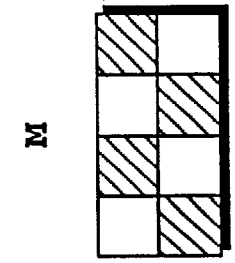
M
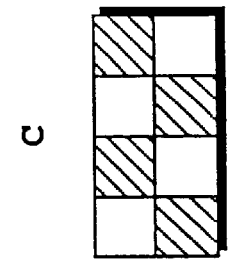
C
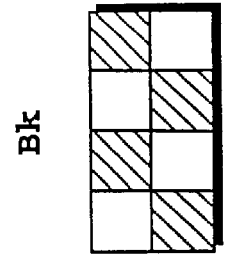
Bk
FIG.34E
2ND PASS

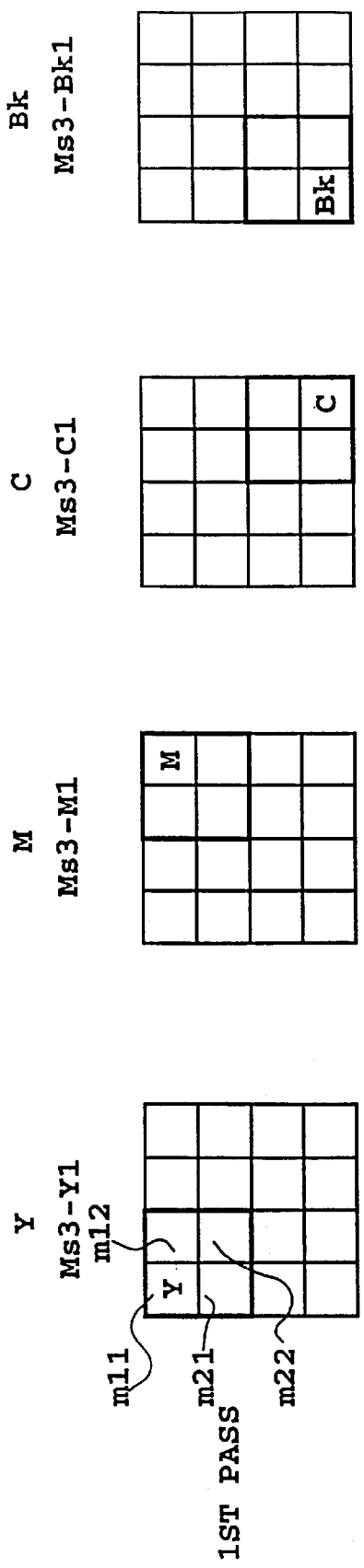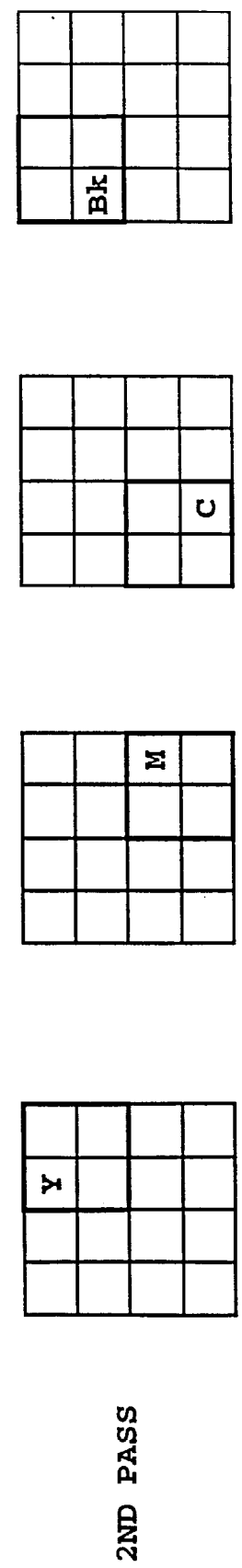
FIG.36A
FIG.36B

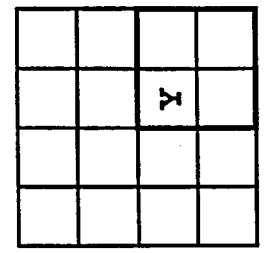
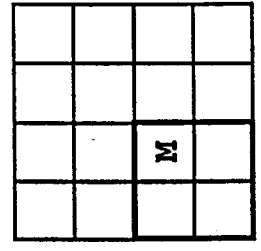
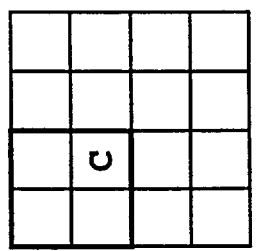
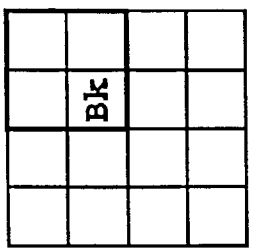
*FIG.36C*
3RD PASS
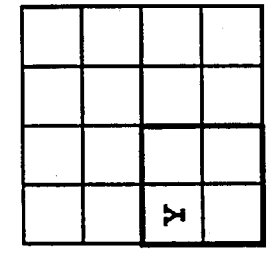
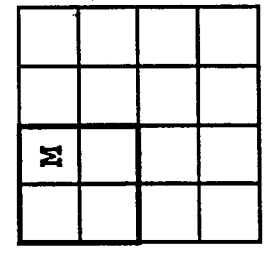
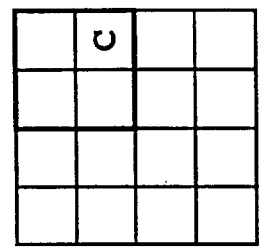
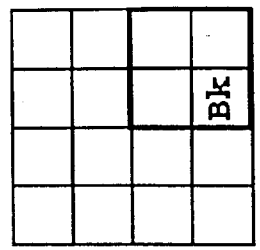
*FIG.36D*
4TH PASS

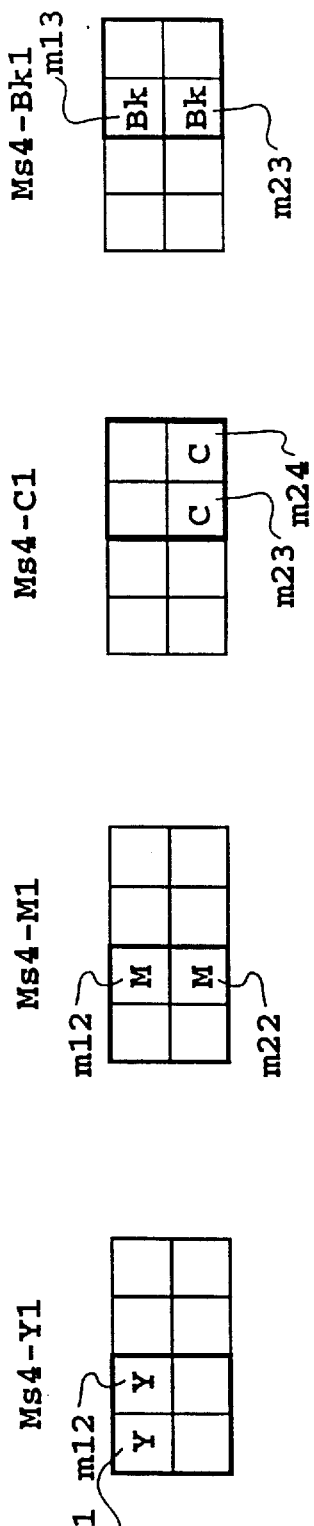
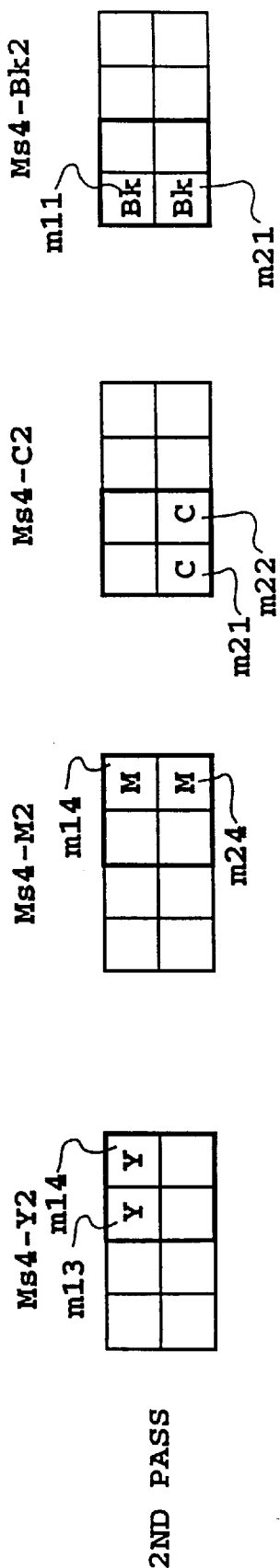
FIG.37A      FIG.37B

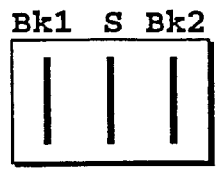
FIG.47A  3-CHIP INTEGRAL TYPE
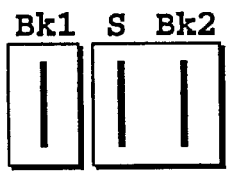
FIG.47B  2-CHIP INTEGRAL TYPE + 1 CHIP
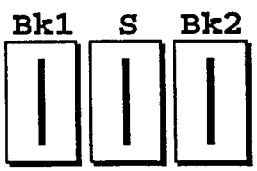
FIG.47C  3 UNIT CHIPS

3-CHIP INTEGRAL TYPE

2-CHIP INTEGRAL TYPE + 1 CHIP

3 UNIT CHIPS

6-CHIP INTEGRAL TYPE

3-CHIP INTEGRAL TYPE + 3 UNIT CHIP

3-CHIP INTEGRAL TYPE + 3 UNIT CHIP

6 UNIT CHIPS

METHOD AND APPARATUS FOR INK-JET PRINTING

This application is a Divisional of Ser. No. 08/598,842 filed Feb. 9, 1996 now U.S. Pat. No. 6,102,537.

BACKGROUND OF THE INVENTION

1. Field of the Invention

The present invention relates generally to an ink-jet printing method and an apparatus therefor, which can obtain high quality printed image on a printing medium, and more particularly to an ink-jet printing method and an apparatus therefor, in which a printing ink and a printing property improving liquid coagulating a coloring agent of the printing ink or making the coloring agent insoluble, are ejected on a printing medium.

The present invention is applicable for all of devices or apparatus employing paper, cloth, non-woven fabric, OHP sheet, and so forth, and even a metal as a printing medium. In concrete, the present invention is applicable for office appliance, such as printer, a copy machine, facsimile and so forth, industrial production machines or so forth.

2. Description of the Related Art

Ink-jet printing systems have advantages of low noise, low running cost, easiness of down-sizing and providing color printing capability for the apparatus, and so forth, and have been widely used in printers, copy machines and so forth.

However, when an image is printed on a printing medium, such as a plain paper and so forth, it is possible that water resistance of the printed image is insufficient. Also, in case of printing of color image, it is somewhat difficult to achieve both of high density image which may not cause feathering and an image which may not cause bleeding between adjacent colors. Therefore, it is often impossible to obtain high quality color image with high image fastness.

As a method to improve water resistance of the image, an ink containing color agent which is provided water resistive property, has been put into practical use. However, water resistance of the image is still insufficient in many case. In principle, the ink containing water resistive coloring agent is an ink which is difficult to solve in the water after once dried. Therefore, such ink can easily cause plugging of ink-ejection openings in an ink-jet head. Also, a construction of the apparatus for preventing plugging of ink can be complicated.

On the other hand, in the prior art, there are large number of technologies for improving fastness of the medium to be printed. For example, in Japanese Patent Application Laid-open No. 24486/1978, there is disclosed a technology for fixing by laking dye through post-treatment of the dye product.

Japanese Patent Application Laid-open No. 43733/1979 discloses a method for perform printing employing two or more components which may enhance film forming performance by mutually contacting at normal temperature or upon heating, utilizing an ink-jet printing system. By this, mutually contacting respective components on the printing medium may form a printing product with a film firmly fixed on the printing medium.

Also, in Japanese Patent Application Laid-open No. 150396/1980, a method for applying water-resistance agent forming a lake with a dye after printing with a water soluble ink by ink-jet system, is disclosed.

In Japanese Patent Application Laid-open No. 128862/1983, an ink-jet printing method for printing a printing ink and printing property improving liquid in overlapping manner with preliminarily identifying position of the image to be printed. In the disclosed method, the image is printed with the printing property improving liquid in advance of printing by the printing ink, the printing property improving liquid is applied in an overlapping manner on the printing ink printed in advance, the ink is applied in an overlapping manner on the printing property improving liquid in advance, and then the printing property improving liquid is applied over the printing ink in an overlapping manner.

It has been known that separately applying the printing ink and a printing property improving liquid is effective for improving light-resistance, water-resistance, image density and chroma.

However, the above-mentioned publications are silent about a recovery means for maintaining reliability of ejection, which is specific to an ink-jet printing apparatus, a head construction, a tank construction, a printing mode for enhancing quality of the printed image and so forth.

Application of the printing ink and the printing property improving liquid as disclosed in Japanese Patent Application Laid-open No. 128862/1983 may cause a different nature of respective printing pixels at a different order of ejection.

Spreading of the printing ink and the printing property improving liquid are diagrammatically illustrated in FIGS. 1A and 1B. FIG. 1A shows the case where the printing property improving liquid is ejected in advance of the printing ink. In this case, the coloring agent in the printing ink, such as dye and so forth stays relatively close to the surface in the depth direction to enhance color development ability of the printing ink. The dot shape is considered to form a circular dot with less feathering. On the other hand, when the printing ink hits on the printing medium, in conjunction therewith reaction with the printing property improving liquid to cause coagulation is started. Therefore, the component of the coloring agent in the printing ink may not penetrate into the printing medium and thus tends to make the dot side smaller.

FIG. 1B shows the case where the printing property improving liquid is ejected on the printing ink which is ejected in advance, in contrast to the case of FIG. 1A. When the printing ink is ejected in advance, higher water-resistance can be attained in comparison with the case where the printing property improving liquid is not applied. However, since the printing ink penetrates into the inside of the depth direction of the printing medium, the color development ability of the printing ink cannot be improved.

Furthermore, if the order of ejection of the printing ink and the printing property improving liquid is different, hue can become different in either case. It is considered that, even with the equal amount of printing ink, distances between the coloring agent component, such as dye and so forth are differentiated depending upon the manner of coagulation of the ink to cause difference of hue.

As set forth above, depending upon the order of ejection of the printing ink and the printing property improving liquid, the image to be formed can be differentiated.

Also, color development, hue, dot configuration may be differentiated depending upon the position in the depth direction of the printing medium where mixing of the printing ink and the printing property improving liquid is caused. Such condition is caused when time intervals from hitting of the printing property improving liquid on the printing medium to hitting of the printing ink are differentiated between the pixels. This also influences the formed image, significantly.

The followings are discussion for influence of these natures for the image in the conventional ink-jet printing system.

1) When printing is performed by a printing method to form an image with the printing property improving liquid in advance of that of the printing ink as disclosed in Japanese Patent Application Laid-open No. 128862/1983, or a printing method to print the image with the printing ink overlapping with the image printed with the printing property improving liquid, and again print the printing property improving liquid on the image of the printing ink, the dot diameter can become smaller than that not employing the printing property improving liquid. When two modes of a printing mode employing the printing property improving liquid and a printing mode not employing the printing property improving liquid, under the conventional ejection amount designed adapted not to employ the printing property improving liquid, the image, in which lines becomes visually perceptible, can be formed when printing is performed employing the printing property improving liquid.

2) In case of conventional monochrome printing, such as that with Bk ink and so forth, reciprocal printing has been performed for high speed printing. In the printing where a printing property improving liquid ejecting head and a printing in ejecting ink are simply arranged in alignment in the reciprocating direction, the orders of ejection of the printing ink and the printing property improving liquid are differentiated in the forward direction and reverse direction, band fluctuation (color fluctuation, density fluctuation, line fluctuation) in the width of the head width, which has not be caused conventionally, can be caused.

3) FIGS. 2A, 2B and 2C show the case of ideal head. A reference numeral 1 denotes a head, 2 denotes an ejection nozzle, 3 denotes an ejected ink droplet. FIG. 2A shows a manner to eject the ink droplet from the head. FIG. 2B shows a behavior of the dot formed on the printing medium. FIG. 2C shows a distribution of ejection density of the ink in the printing medium. In the practical head, due to tolerance information of the nozzle, nozzle distribution (ejection amount distribution, ejecting direction) can be caused. Therefore, density of the printing ink on the printing medium can be differentiated to form the density fluctuation, line on the printed image. Also, similar density difference of the printing property improving liquid on the printing medium can be caused in application of the printing property improving liquid. Thus reaction amount of the printing ink may be differentiated per ink to cause density difference, color difference and line.

4) In a head unit, in which conventional heads for respective colors are combined, it is difficult to precisely match the registration position between respective heads in the positioning method between the heads (different depending upon the head and main body construction) due to tolerance in production and other reason. Therefore, in a range not to influence the image, certain magnitude of offset has been permitted. In case offsetting of the registration between respective heads of the printing property improving liquid and the printing ink, when the order of ejection of the printing ink and the printing property improving liquid and/or ejection interval is differentiated, density fluctuation, color fluctuation or line can be caused on the image.

5) In the printing method to print the printing property improving liquid and the printing ink in overlapping manner as disclosed in Japanese Patent Application Laid-open No. 128862/1983, little improvement of color development and little improvement of feathering of the dot configuration can be observed.

SUMMARY OF THE INVENTION

The present invention has been worked out in view of the problems set forth above. Therefore, it is an object of the present invention to provide a printing method in consideration of problems which have not been satisfactorily solved in the conventional printing methods wherein a printing property improving liquid is ejected for forming an image in advance of ejection of the printing ink, or the image with the printing ink is formed in overlapping manner on the image formed with the printing property improving liquid and image with the printing property improving liquid is formed in overlapping with the image of the printing ink, and the problems to be caused by difference of the order of ejection and difference of ejection interval.

Also, another object of the present invention is to provide an ink-jet printing method for obtaining a printing image of high printing density, lesser printing fluctuation and superior water-resistance.

A further object of the present invention is to provide an ink-jet printing apparatus which can obtain superior quality of a printed image without causing lowering of printing speed and without requiring increased power source capacity.

A still further object of the present invention is to provide an ink-jet printing apparatus, an ink-jet printing method and a printing product produced by those apparatus and method, wherein a consumption of a liquid containing at least the printing property improving liquid to be applied for the printing medium for improving the printing ability can be minimized with achieving high quality image formation.

In a first aspect of the present invention, there is provided an ink jet printing method of performing printing onto a printing medium with the use of both of a colored ink ejected from an ink jet head and a printing property improving liquid to be applied to the printing medium for improving a printing property for an ink jet printing apparatus, comprising the steps of:

at least one time or more printing the colored ink onto the printing medium;

at least one time or more applying the printing quality improving liquid to an image range of the printing medium which is printed by the colored ink; and at least one time or more printing the colored ink onto the image range of the printing medium.

At least one time printing the colored ink or more onto the printing medium, the printing property improving liquid may be applied to pixels printed with the colored ink or to a position where the printing property improving liquid comes in contact with at least part of the pixels of the colored ink, and printing is then performed with the colored ink at least one time or more onto the printing property improving liquid applied position or a position where the colored ink comes in contact with at least part of the printing property improving liquid applied position.

The color of the colored ink to be used for recording prior to the application of the printing property improving liquid may be coincident with the color of the colored ink to be used for recording after the application of the printing property improvement liquid.

The composition of the colored ink to be used for recording prior to the application of the printing property improving liquid may be different from the composition of the colored ink to be used for recording after the application of the printing property improving liquid.

The color of the colored ink to be used for recording prior to the application of the printing property improving liquid may be different from the color of the colored ink to be used for recording after the application of the printing property improving liquid.

At least two kinds or more of colored inks may be used for plural recordings prior to the application of the printing property improving liquid, the inks having different composition, respectively.

At least two colors inks may be used for plural recordings prior to the application of the printing property improving liquid, the inks having different colors, respectively.

At least two kinds or more of colored inks may be used for plural recordings after the application of the printing property improving liquid, the inks having different composition, respectively.

At least two colors inks may be used for plural recordings after the application of the printing property improving liquid, the inks having different colors, respectively.

A ratio of total quantity of the colored ink shot onto the printing medium to total quantity of the printing property improving liquid shot onto the printing medium may be as follows.

colored ink:printing property improving liquid=1.0:0.1 to 1.0

The printing property improving liquid may contain cationic substances as low and high molecular components, and the colored ink contains an anionic dyestuff.

The printing property improving liquid may contain cationic substances as low and high molecular components, and the colored ink contains an anionic dyestuff or at least anionic compound and pigment.

In a second aspect of the present invention, there is provided an ink jet printing method of performing printing onto a printing medium with the use of both of a colored ink ejected from an ink jet head and a printing property improving liquid to be applied to the printing medium for improving a printing property of an ink jet printing apparatus, comprising the steps of:

at least one time or more applying the printing property improving liquid onto the printing medium;

at least one time or more printing the colored ink onto an image range where the printing property improving liquid is applied; and at least one time or more applying the printing property improving liquid to the image range printed with the colored ink.

After at least one time or more applying the printing property improving liquid onto the printing medium, the colored ink may be applied to a position where the printing property improving liquid is applied or pixels applied with the printing property improving liquid or to a pixel where the colored ink comes in contact with at least part of the printing property improving liquid applied position, and the printing property improving liquid is then applied at least one time or more onto the pixel printed with the colored ink or a position where the printing property improving liquid comes in contact with at least part of the colored ink printed pixel.

All of the colored ink with which plural recordings may be performed after the application of the printing property improving liquid are the same color.

At least two kinds or more of colored inks may be used for plural recordings after the application of the printing property improving liquid, the inks having different composition, respectively.

At least two colors inks may be used for plural recordings after the application of the printing property improving liquid, the inks having different colors, respectively.

A ratio of total quantity of the colored ink shot onto the printing medium to total quantity of the printing property improving liquid shot onto the printing medium may be as follows.

colored ink:printing property improving liquid=1.0:0.1 to 1.0

The printing property improving liquid may contain cationic substances as low and high molecular components, and the colored ink contains an anionic dyestuff.

The printing property improving liquid may contain cationic substances as low and high molecular components, and the colored ink contains an anionic dyestuff or at least anionic compound and pigment.

In a third aspect of the present invention, there is provided an ink jet printing method of performing printing onto a printing medium with the use of both of a colored ink ejected from an ink jet head to the printing medium and a printing property improving liquid to be applied to the printing medium for improving a printing property, comprising the steps of:

at least one time or more applying the printing property improving liquid onto the printing medium;

at least one time or more printing the colored ink onto an image range where the printing property improving liquid is applied;

at least one time or more applying the printing property improving liquid onto the image range of the colored ink; and at least one time or more printing the colored ink onto the image range, wherein these steps are repeatedly performed at least one time.

After at least one time or more applying the printing property improving liquid to the printing medium, the colored ink may be at least one time or more printed on a position where the printing property improving liquid is applied or on at least part of pixels coming in contact with the printing property improving liquid applied position, the printing property improving liquid is at least one time or more applied to pixels printed with the colored ink or a position coming in contact with at least part of the printed pixels, the colored ink is at least one time or more printed on a position where the printing property improving liquid is applied or a position where the colored ink comes in contact with the printing property improving liquid, wherein these steps are repeatedly performed at least one time or more.

All of plural colored inks to be printed may be the same colored ink.

Each of or at least one kind or more of the plural colored inks to be printed may be a colored ink having a different composition.

Each of or at least one kind or more of the plural inks to be printed may be a colored ink having a different color.

A ratio of total quantity of the colored ink shot onto the printing medium to total quantity of the printing property improving liquid shot onto the printing medium may be as follows.

colored ink:printing property improving liquid=1.0:0.1 to 1.0

The printing property improving liquid may contain cationic substances as low and high molecular components, and the colored ink contains an anionic dyestuff.

The printing property improving liquid may contain cationic substances as low and high molecular components, and the colored ink contains an anionic dyestuff or at least anionic compound and pigment.

In a fourth aspect of the present invention, there is provided an ink jet printing method of performing printing onto a printing medium with the use of both of a colored ink to be ejected from an ink jet head and a printing property improving liquid to be applied to the printing medium for improving a printing property for an ink jet printing apparatus, comprising the step of forming an image on the printing medium by using at least two different kinds of pixels selected from the group consisting of the following pixels:

1) a pixel printed with only the colored ink at least one time or more,
2) a pixel printed with the colored ink, the pixel being printed at a position where the colored ink comes in contact with at least part of a position where the printing property improving liquid is applied at least one time or more,
3) a pixel obtained by applying the printing property improving liquid onto a pixel printed with the colored ink so as to come in contact with at least part of the pixel which is printed with the colored ink at least one time or more,
4) a pixel obtained by at least one time or more printing the colored ink, applying the printing property improving liquid onto a pixel printed with the colored so as to come in contact with at least part of the pixel printed with the colored ink, and at least one time or more printing with the colored ink at the printing property improving liquid applied position,
5) a pixel obtained by at least one time or more applying the printing property improving liquid, at least one time or more printing with the colored ink at the printing property improving liquid applied position so as to come in contact with at least part of the printing property improving liquid applied position, and at least one time or more applying the printing property improving liquid onto a pixel printed with the colored ink so as to come in contact with at least part of the pixel printed with the colored ink,
6) a pixel obtained by at least one time or more printing with the colored ink, applying the printing property improving liquid onto a pixel printed with the colored ink so as to come in contact with at least part of the pixel printed with the colored ink, at least one time or more printing with the colored ink at a pixel obtained by the application of the printing property improving liquid, and applying the printing property improving liquid onto a pixel printed with the colored ink so as to come in contact with at least part of the pixel printed with the colored ink, and
7) a pixel obtained by at least one time or more applying the printing property improving liquid, at least one time or more printing with the colored ink at a pixel obtained by the application of the printing property improving liquid so as to come in contact with at least part of the pixel obtained by the application of the printing property improving liquid, at least one time or more applying the printing property improving liquid onto a position where the printing property improving liquid comes in contact with at least part of the pixel printed with the colored ink, and at least one time or more printing with the colored ink at the pixel printed with the colored ink.

When forming an image by using two kinds of different pixels, the same kind of pixels may be not continuously used by a distance more than 420 $\mu$m in both of the printing head main scanning direction and the printing medium conveying direction.

A ratio of total quantity of the colored ink shot onto the printing medium to total quantity of the printing property improving liquid shot onto the printing medium may be as follows.

colored ink:printing property improving liquid=1.0:0.1 to 1.0

The printing property improving liquid may contain cationic substances as low and high molecular components, and the colored ink contains an anionic dyestuff.

The printing property improving liquid may contain cationic substances as low and high molecular components, and the colored ink contains an anionic dyestuff or at least anionic compound and pigment.

In a fifth aspect of the present invention, there is provided an ink jet printing method of performing printing onto a printing medium with the use of both of a colored ink to be ejected from an ink jet head and a printing property improving liquid to be applied to the printing medium for improving a printing property for an ink jet printing apparatus, comprising the steps of:

at least one time or more applying the printing property improving liquid onto the printing medium; and forming an image using a pixel A and a pixel B, the pixel A being printed with the colored ink one time or more at the printing property improving liquid applied position or at a position where the colored ink comes in contact with at least part of the printing property improving liquid applied position within a first specific time period which is a time interval defined from the application of the printing property improving liquid to the printing with the colored ink, the pixel B being printed with the colored ink with the time interval which is more than a second specific time period.

When forming an image by using the pixel A and the pixel B having a different time interval, similar pixels may not be continuously used by a distance more than 420 $\mu$m in both of the printing head main scanning direction and the printing medium conveying direction.

The printing with the colored ink may be performed with a differential time as the first specific time period, the differential time being minimum defined from when the printing property improving liquid is hit to the printing medium to when the colored ink is hit to the printing medium, and wherein the second specific time period is set to be longer than the first specific time period.

The printing property improving liquid droplets and the colored ink droplets used for forming the first pixels A with the first specific time period may be ejected within the same scanning of the printing head, and wherein the printing property improving liquid droplets and the colored ink droplets used for forming the pixels B with the time interval which is more than the second specific time period are ejected during different scanning of the printing head.

A ratio of total quantity of the colored ink shot onto the printing medium to total quantity of the printing property improving liquid shot onto the printing medium may be as follows.

colored ink:printing property improving liquid=1.0:0.1 to 1.0

The printing property improving liquid may contain cationic substances as low and high molecular components, and the colored ink contains an anionic dyestuff.

The printing property improving liquid may contain cationic substances as low and high molecular components, and the colored ink contains an anionic dyestuff or at least anionic compound and pigment.

In a sixth aspect of the present invention, there is provided an ink jet printing apparatus, comprising an ink jet head including an ink ejecting portion for ejecting ink to a printing medium and a liquid ejecting portion for applying a liquid containing at least a printing property improving liquid for improving a printing property for an ink jet printing apparatus, wherein the ink ejecting portion prints with the colored ink on the printing medium at least one time or more, wherein the liquid ejecting portion at least one time or more applies the printing property improving liquid onto a region of the printing medium where the colored ink is printed, and wherein the ink ejecting portion further prints with the colored ink toward the printing property improving liquid applied region at least one time or more.

The ink ejecting portion may print with the colored ink on the printing medium at least one time or more, wherein the liquid ejecting portion applies the printing property improving liquid onto the pixel printed with the colored ink or a position where the printing property improving liquid comes in contact with at least part of the pixel printed with the colored ink, and wherein the ink ejecting portion further prints with the colored ink on a position where the printing property improving liquid is applied or a pixel where the colored ink comes in contact with at least part of the printing property improving liquid applied position at least one time or more.

The ink jet head may include an electrical-thermal transducer as an energy generating element, the energy generating element for generating thermal energy which causes the colored ink or the printing property improving liquid to induce a phenomenon of film boiling.

In a seventh aspect of the present invention, there is provided an ink jet printing apparatus, comprising an ink jet head including an ink ejecting portion for ejecting ink to a printing medium and a liquid ejecting portion for applying a liquid containing at least a printing property improving liquid for improving a printing property for an ink jet printing apparatus, wherein the liquid ejecting portion applies the printing property improving liquid onto the printing medium at least one time or more, wherein the ink ejecting portion prints with the colored ink on a region where the printing property improving liquid is applied at least one time or more, and wherein the liquid ejecting portion applies the printing property improving liquid onto the printing property improving liquid applied region.

The liquid ejecting portion may apply the printing property improving liquid at least one time or more onto the printing medium, wherein the ink ejecting portion prints with the colored ink at a position where the printing property improving liquid is applied or a position where the colored ink comes in contact with at least part of the printing property improving liquid applied position at least one time or more, and wherein the liquid ejecting portion applies the printing property improving liquid onto a pixel where the colored ink is printed or a position where the printing property improving liquid comes in contact with at least part of the pixel printed with the colored ink at least one time or more.

The ink jet head may include an electrical-thermal transducer as an energy generating element, the energy generating element for generating thermal energy which causes the colored ink or the printing property improving liquid to induce a phenomenon of film boiling.

In an eighth aspect of the present invention, there is provided an ink jet printing apparatus, comprising an ink jet head including an ink ejecting portion for ejecting ink to a printing medium and a liquid ejecting portion for applying a liquid containing at least a printing property improving liquid for improving a printing property for an ink jet printing apparatus, wherein the liquid ejecting portion applies the printing property improving liquid onto the printing medium at least one time or more, wherein the ink ejecting portion at least one time or more prints with the colored ink a region where the printing property improving liquid is applied, wherein the liquid ejecting portion at least one time or more applies the printing property improving liquid onto a region where the printing property improving liquid, is applied wherein the ink ejecting portion at least one time or more prints with the colored ink on the printing property improving liquid applied region, and wherein a series of the application by the liquid ejecting portion and the printing by the ink ejecting portion is repeated at least one time or more to form an image.

The liquid ejecting portion at least one time or more applies the printing property improving liquid onto the printing medium, wherein the ink ejecting portion at least one time or more prints with the colored ink on a position where the printing property improving liquid may be applied or a position where the colored ink comes in contact with at least part of the printing property improving liquid applied position, wherein the liquid ejecting portion applies the printing property improving liquid at a pixel where the colored ink is printed or a position where the printing property improving liquid comes in contact with at least part of the pixel printed with the colored ink, wherein the ink ejecting portion prints with the colored ink at a position where the printing property improving liquid is applied or a position where the colored ink comes in contact with at least part of the printing property improving liquid applied position, and wherein a series of the application by the liquid ejecting portion and the printing by the ink ejecting portion is repeated at least one time or more to form an image.

The ink jet head may include an electrical-thermal transducer as an energy generating element, the energy generating element for generating thermal energy which causes the colored ink or the printing property improving liquid to induce a phenomenon of film boiling.

In a ninth aspect of the present invention, there is provided an ink jet printing apparatus, comprising an ink jet head including an ink ejecting portion for ejecting ink to a printing medium and a liquid ejecting portion for applying a liquid containing at least a printing property improving liquid for improving a printing property for an ink jet printing apparatus, wherein an image is formed on the printing medium by using at least two different kinds of pixels selected from the group consisting of the following pixels:

1) a pixel printed with only the colored ink at least one time or more,
2) a pixel printed with the colored ink, the pixel being printed at a position where the colored ink comes in contact with at least part of a position where the printing property improving liquid is applied at least one time or more,
3) a pixel obtained by applying the printing property improving liquid onto a pixel printed with the colored ink so as to come in contact with at least part of the pixel which is printed with the colored ink at least one time or more,
4) a pixel obtained by at least one time or more printing the colored ink, applying the printing property improving liquid onto a pixel printed with the colored ink so as to come in contact with at least part of the pixel printed with the colored ink, and at least one time or more printing with the colored ink at the printing property improving liquid applied position, 5) a pixel obtained by at least one time or more applying the printing property improving liquid, at least one time or more printing with the colored ink at the printing property improving liquid applied position so as to come in contact with at least part of the printing property improving liquid applied position, and at least one time or more applying the printing property improving liquid onto a pixel printed with the colored ink so as to come in contact with at least part of the pixel printed with the colored ink, 6) a pixel obtained by at least one time or more printing with the colored ink, applying the printing property improving liquid onto a pixel printed with the colored ink so as to come in contact with at least part of the pixel printed with the colored ink, at least one time or more printing with the colored ink at a pixel obtained by the application of the printing property improving liquid, and applying the printing property improving liquid onto a pixel printed with the colored ink so as to come in contact with at least part of the pixel printed with the colored ink, and 7) a pixel obtained by at least one time or more applying the printing property improving liquid, at least one time or more printing with the colored ink at a pixel obtained by the application of the printing property improving liquid so as to come in contact with at least part of the pixel obtained by the application of the printing property improving liquid, at least one time or more applying the printing property improving liquid onto a position where the printing property improving liquid comes in contact with at least part of the pixel printed with the colored ink, and at least one time or more printing with the colored ink at the pixel printed with the colored ink.

The ink jet head may include an electrical-thermal transducer as an energy generating element, the energy generating element for generating thermal energy which causes the colored ink or the printing property improving liquid to induce a phenomenon of film boiling.

In a tenth aspect of the present invention, there is provided an ink jet printing apparatus, comprising an ink jet head including an ink ejecting portion for ejecting ink to a printing medium and a liquid ejecting portion for applying a liquid containing at least a printing property improving liquid for improving a printing property for an ink jet printing apparatus, wherein the liquid ejecting portion applies the printing property improving liquid onto the printing medium at least one time or more, wherein the ink ejecting portion prints with the colored ink to form an image using a pixel A and a pixel B, the pixel A being printed with the colored ink one time or more at the printing property improving liquid applied position or at a position where the colored ink comes in contact with at least part of the printing property improving liquid applied position within a first specific time period which is a time interval defined from the application of the printing property improving liquid to the printing with the colored ink, the pixel B being printed with the colored ink with the time interval which is more than a second specific time period.

The ink jet head may include an electrical-thermal transducer as an energy generating element, the energy generating element for generating thermal energy which causes the colored ink or the printing property improving liquid to induce a phenomenon of film boiling.

In an eleventh aspect of the present invention, there is provided an ink jet printed article formed by performing an ink jet printing method of performing printing onto a printing medium with the use of both of a colored ink to be ejected from an ink jet head and a printing property improving liquid to be applied to the printing medium for improving a printing property for an ink jet printing apparatus, the ink jet printing method including the steps of:

at least one time or more printing the colored ink on the printing medium, at least one time or more applying the printing property improving liquid onto a region where the colored ink is printed, and at least one time or more printing the colored ink at the printing property improving liquid applied region.

The ink jet printing method may be including the steps of:

at least one time or more printing the colored ink on the printing medium, applying the printing property improving liquid onto a pixel where the colored ink is printed or a position where the printing property improving liquid comes in contact with at least part of the pixel printed with the colored ink, and at least one time or more printing the colored ink on a position where the printing property improving liquid is applied or a position where the colored ink comes in contact with at least part of the printing property improving liquid applied position.

In a twelfth aspect of the present invention, there is provided an ink jet printed article formed by performing an ink jet printing method of performing printing onto a printing medium with the use of both of a colored ink to be ejected from an ink jet head and a printing property improving liquid to be applied to the printing medium for improving a printing property for an ink jet printing apparatus, the ink jet printing method including the steps of:

at least one time or more applying the printing property improving liquid onto the printing medium, at least one time or more printing the colored ink at a region where the printing property improving liquid is applied, and at least one time or more applying the printing property improving liquid at the region printed with the colored ink.

The ink jet printing method may be including the steps of:

at least one time or more applying the printing property improving liquid onto the printing medium, at least one time or more printing the colored ink at a position where the printing property improving liquid is applied or a position where the colored ink comes in contact with at least part of the printing property improving liquid applied position, and at least one time or more applying the printing property improving liquid onto a pixel where the colored ink is printed or a position where the printing property improving liquid comes in contact with at least part of the pixel printed with the colored ink.

In a thirteenth aspect of the present invention, there is provided an ink jet printed article formed by performing an ink jet printing method of performing printing onto a printing medium with the use of both of a colored ink to be ejected from an ink jet head and a printing property improving liquid to be applied to the printing medium for improving a printing property for an ink jet printing apparatus, the ink jet printing method including the steps of:
- at least one time or more applying the printing property improving liquid onto the printing medium,
- at least one time or more printing the colored ink at a region where the printing property improving liquid is applied, and
- at least one time or more applying the printing property improving liquid at a region where the colored ink is printed,
- at least one time or more printing the colored ink at a region where the printing property improving liquid is applied, and
- at least one time or more repeatedly performing a series of the application of the printing property improving liquid and the printing of the colored ink.

The ink jet printing method may be including the steps of:
- at least one time or more applying the printing property improving liquid onto the printing medium,
- at least one time or more printing the colored ink at a position where the printing property improving liquid is applied or a position where the colored ink comes in contact with at least part of the printing property improving liquid applied position,
- at least one time or more applying the printing property improving liquid at a pixel where the colored ink is printed or a position where the printing property improving liquid comes in contact with at least part of the colored ink printed pixel,
- at least one time or more printing the colored ink at a position where the printing property improving liquid is applied or a position where the colored ink comes in contact with at least part of the printing property improving liquid applied position, and
- at least one time or more repeatedly performing a series of the application of the printing property improving liquid and the printing of the colored ink.

In a fourteenth aspect of the present invention, there is provided an ink jet printed article formed by performing an ink jet printing method of performing printing onto a printing medium with the use of both of a colored ink to be ejected from an ink jet head and a printing property improving liquid to be applied to the printing medium for improving a printing property for an ink jet printing apparatus, wherein the ink jet printed article is formed on the printing medium by using at least two different kinds of pixels selected from the group consisting of the following pixels:

1) a pixel printed with only the colored ink at least one time or more,
2) a pixel printed with the colored ink, the pixel being printed at a position where the colored ink comes in contact with at least part of a position where the printing property improving liquid is applied at least one time or more,
3) a pixel obtained by applying the printing property improving liquid onto a pixel printed with the colored ink so as to come in contact with at least part of the pixel which is printed with the colored ink at least one time or more,
4) a pixel obtained by at least one time or more printing the colored ink, applying the printing property improving liquid onto a pixel printed with the colored so as to come in contact with at least part of the pixel printed with the colored ink, and at least one time or more printing with the colored ink at the printing property improving liquid applied position,
5) a pixel obtained by at least one time or more applying the printing property improving liquid, at least one time or more printing with the colored ink at the printing property improving liquid applied position so as to come in contact with at least part of the printing property improving liquid applied position, and at least one time or more applying the printing property improving liquid onto a pixel printed with the colored ink so as to come in contact with at least part of the pixel printed with the colored ink,
6) a pixel obtained by at least one time or more printing with the colored ink, applying the printing property improving liquid onto a pixel printed with the colored ink so as to come in contact with at least part of the pixel printed with the colored ink, at least one time or more printing with the colored ink at a pixel obtained by the application of the printing property improving liquid, and applying the printing property improving liquid onto a pixel printed with the colored ink so as to come in contact with at least part of the pixel printed with the colored ink, and
7) a pixel obtained by at least one time or more applying the printing property improving liquid, at least one time or more printing with the colored ink at a pixel obtained by the application of the printing property improving liquid so as to come in contact with at least part of the pixel obtained by the application of the printing property improving liquid, at least one time or more applying the printing property improving liquid onto a position where the printing property improving liquid comes in contact with at least part of the pixel printed with the colored ink, and at least one time or more printing with the colored ink at the pixel printed with the colored ink.

In a fifteenth aspect of the present invention, there is provided an ink jet printed article formed by performing an ink jet printing method of performing printing onto a printing medium with the use of both of a colored ink to be ejected from an ink jet head and a printing property improving liquid to be applied to the printing medium for improving a printing property for an ink jet printing apparatus, the ink jet printing method, comprising the steps of:
- at least one time or more applying the printing property improving liquid onto the printing medium; and
- forming an image using a pixel A and a pixel B, the pixel A being printed with the colored ink one time or more at the printing property improving liquid applied position or at a position where the colored ink comes in contact with at least part of the printing property improving liquid applied position within a first specific time period which is a time interval defined from the application of the printing property improving liquid to the printing with the colored ink, the pixel B being printed with the colored ink with the time interval which is more than a second specific time period.

In a sixteenth aspect of the present invention, there is provided an image forming method of forming an image by applying a liquid onto an ink region, the liquid having a component reactive with a component of ink, the ink region being formed by applying a single or plural kinds of ink, wherein an image unit for forming an image includes the ink region as a final surface formed finally, a portion of the liquid below the ink region, and the other ink region below the liquid portion.

Below the other ink region below the liquid portion, the other liquid portion may be arranged.

In a seventeenth aspect of the present invention, there is provided an image forming method of forming an image by applying a liquid onto an ink region, the liquid having a component reactive with a component of ink, the ink region being formed by applying a single or plural kinds of ink, wherein the image is formed by any two portions selected from the following portions, the selected two portions being substantially adjacent to each other, a portion being formed by only the liquid, a portion being formed by only the ink, a first laminated portion including a liquid portion as a final surface formed finally, an ink region below the liquid portion and the other liquid portion below the ink region, and a second laminated portion including an ink region as a final surface formed finally, a liquid portion below the ink region and the other ink region below the liquid portion.

In an eighteenth aspect of the present invention, there is provided an image forming method of forming an image by applying a liquid onto an ink region, the liquid having a component reactive with a component of ink, the ink region being formed by applying a single or plural kinds of ink, wherein a relative time difference between a time when the liquid hits a printing medium for forming the image and a time when the ink hits the printing medium differs by a pixel unit constituting a substantial image, and wherein the image is formed so that the pixel unit is held in the substantially adjacent state.

In a nineteenth aspect of the present invention, there is provided an ink jet printing method for performing a printing by ejecting an ink and a printing property improving liquid to a printing medium, the ejection being performed by using an ink jet ejecting portion for ejecting the ink to the printing medium and a printing property improving liquid ejecting portion for ejecting the printing property improving liquid to the printing medium for improving a printing property in printing by the ink jet ejecting portion while performing a main scanning for reciprocally scanning the ejecting portions in a direction and performing an auxiliary scanning for conveying the printing medium in a perpendicular direction to the main scanning direction, comprising the steps of:

performing the ink ejection by the ink jet ejecting portion in both of the main scanning directions, and performing the printing property improving liquid ejection by the printing property improving liquid ejecting portion in one of the main scanning directions.

Ejecting the printing property improving liquid to a pixel where the printing property improving liquid may be ejected prior to the ink ejection to the pixel.

The printing of the ink jet ejecting portion may be performed by the steps of:

curtailing a printing pattern to be printed by the ink jet ejecting portion to plural curtailed arrangement patterns, the plural curtailed arrangement patterns being compensated for each other, printing the curtailed patterns with the ink so as to apportion the curtailed patterns at the times of the forward and backward movements for the main scanning, and printing a printing pattern to be printed by the printing property improving liquid ejecting portion always only during the forward movement for the main scanning.

A printing pattern to be printed by the printing property improving liquid ejecting portion may be curtailed.

A region printed at the time of the forward movement for the main scanning and a region printed at the time of the backward movement for the main scanning may be partially overlapped.

The auxiliary scanning for the printing medium may be performed at a predetermined cycle in the reverse direction to the normal auxiliary scanning direction.

The printing property improving liquid may contain cationic substances as low and high molecular components, and the colored ink contains an anionic dyestuff.

The printing property improving liquid may contain cationic substances as low and high molecular components, and the colored ink contains an anionic dyestuff or at least anionic compound and pigment.

In a twenties aspect of the present invention, there is provided an ink jet printing apparatus for performing an ink jet printing method for performing a printing by ejecting an ink and a printing property improving liquid to a printing medium, the ejection being performed by using an ink jet ejecting portion for ejecting the ink to the printing medium and a printing property improving liquid ejecting portion for ejecting the printing property improving liquid to the printing medium for improving a printing property in printing by the ink jet ejecting portion while performing a main scanning for reciprocally scanning the ejecting portions in a direction and performing an auxiliary scanning for conveying the printing medium in a perpendicular direction to the main scanning direction, the method, comprising the steps of:

performing the ink ejection by the ink jet ejecting portion in both of the main scanning directions, and performing the printing property improving liquid ejection by the printing property improving liquid ejecting portion in one of the main scanning directions, the apparatus, comprising:

an ink jet ejecting portion for ejecting the ink to the printing medium, and a printing property improving liquid ejecting portion for ejecting the printing property improving liquid to the printing medium, wherein the ejecting portions have a thermal energy transducer for generating a thermal energy to be applied to the ink.

At least one of the ejecting portions may be reciprocally displaced in a space on the printing medium.

The ink jet ejecting portion and the printing property improving liquid ejecting portion may be arranged in the reciprocal displacing direction.

The ejecting portion may have a row of ink ejecting ports arranged in the substantially perpendicular direction to the reciprocal displacing direction.

In a twenty first aspect of the present invention, there is provided a printed article obtained by performing an ink jet printing method for performing a printing by ejecting an ink and a printing property improving liquid to a printing medium, the ejection being performed by using an ink jet ejecting portion for ejecting the ink to the printing medium and a printing property improving liquid ejecting portion for ejecting the printing property improving liquid to the printing medium for improving a printing property in printing by the ink jet ejecting portion while performing a main scanning for reciprocally scanning the ejecting portions in a direction and performing an auxiliary scanning for conveying the printing medium in a perpendicular direction to the main scanning direction, the method, comprising the steps of:

performing the ink ejection by the ink jet ejecting portion in both of the main scanning directions, and performing the printing property improving liquid ejection by the printing property improving liquid ejecting portion in one of the main scanning directions.

In a twenty second aspect of the present invention, there is provided a printed article obtained by using an ink jet printing apparatus for performing an ink jet printing method for performing a printing by ejecting an ink and a printing property improving liquid to a printing medium, the ejection being performed by using an ink jet ejecting portion for ejecting the ink to the printing medium and a printing property improving liquid ejecting portion for ejecting the printing property improving liquid to the printing medium for improving a printing property in printing by the ink jet ejecting portion while performing a main scanning for reciprocally scanning the ejecting portions in a direction and performing an auxiliary scanning for conveying the printing medium in a perpendicular direction to the main scanning direction, the method, comprising the steps of:

performing the ink ejection by the ink jet ejecting portion in both of the main scanning directions, and performing the printing property improving liquid ejection by the printing property improving liquid ejecting portion in one of the main scanning directions, the apparatus, comprising:

an ink jet ejecting portion for ejecting the ink to the printing medium, and a printing property improving liquid ejecting portion for ejecting the printing property improving liquid to the printing medium, wherein the ejecting portions have a thermal energy transducer for generating a thermal energy to be applied to the ink.

In a twenty third aspect of the present invention, there is provided an ink jet printing apparatus for ejecting an ink and a liquid containing at least a printing property improving liquid to the same region of a printing medium while displacing an ink ejecting portion for ejecting the ink and a liquid ejecting portion for ejecting the liquid which are relative to the printing medium, comprising:

ink ejection data setting means for separately setting ink ejection data for ejecting the ink from the ink ejecting portion corresponding to recording data so as to correspond to the number of times of the relative displacement;

liquid ejection data setting means for separately setting liquid ejecting data for ejecting the liquid from the liquid ejecting portion corresponding to the recording data so as to correspond to the number of the relative displacement in accordance with a setting manner different from the setting manner determined by the ink ejection data with the ink ejection data setting means; and ejection controller for controllably ejecting the ink and the liquid from the ink ejecting portion and the liquid ejecting portion based on the ink ejecting data and the liquid ejecting date separately set so as to correspond to the number of times of the relative displacement.

The ejection data may be set such that in the liquid ejection data corresponding to the number of times of the relative displacement, the theoretical sum with respect to the respective printing pixel becomes zero.

The liquid ejection data setting means may set the liquid ejecting date so that the rate of the number of printed pixels to which the liquid is ejected to the number of predetermined unit printed pixels becomes smaller than 100%.

The ink ejecting portion may eject plural kinds of inks.

The ejection data setting means may set liquid ejection data so that in the liquid ejection data corresponding to the number of times of the relative displacement, the theoretical sum of each printed pixel becomes zero for every kind of inks.

In the liquid ejection data for every number of times of the relative displacement, the theoretical sum of each printed pixel may become zero for every kind of ink.

The ink ejecting portion may eject four kinds of ink, and wherein the liquid ejection data setting means sets the liquid ejection data so that the rate of the number of pixels for which the liquid is ejected to the number of predetermined unit printed pixels every kind of the ink is kept constant.

The liquid ejection data setting means may set the liquid ejection data so that the rate of the number of pixels for which the liquid is ejected to the number of predetermined unit printed pixels for each kind of the ink is 25% or the less.

The liquid ejection data setting means may set the liquid ejection data so that the rate of the number of pixels for which the liquid is ejected to the number of predetermined unit printed pixels for each kind of the ink is 25%.

The ink ejecting potion may eject at least yellow, magenta and cyan for forming a printed pixel having a secondary color of red, green and blue, and wherein the liquid ejection data setting means sets the liquid ejection data so that the rate of the pixels for which the liquid is ejected to the number of predetermined unit printed pixels for every kind of yellow, magenta and cyan is held constant.

The liquid ejection data setting means may set the liquid ejecting data so that the rate of the number of pixels for which the liquid is ejected to the number of predetermined unit pixels for every kind of ink of the yellow, magenta and cyan is 25% or less.

The liquid ejection data setting means may set the liquid ejecting data so that the rate of the number of pixels from which the liquid is ejected to the number of predetermined unit pixels for every kind of ink of the yellow, magenta and cyan is 25%.

The printing property improving liquid may contain cationic substances as low and high molecular components, and the colored ink contains an anionic dyestuff.

The printing property improving liquid may contain, cationic substances as low and high molecular components, and the colored ink contains an anionic dyestuff or at least anionic compound and pigment.

The ink ejecting portion and the liquid ejecting portion eject the ink and the liquid by utilizing. thermal energy, and wherein the ejecting portions may include a thermal energy transducer for generating thermal energy to be given to the ink and the liquid.

In a twenty fourth aspect of the present invention, there is provided an ink jet printing method for ejecting an ink and a liquid containing at least a printing property improving liquid to the same region of a printing medium while displacing an ink ejecting portion for ejecting the ink and a liquid ejecting portion for ejecting the liquid which are relative to the printing medium, comprising the steps of:

separately setting ink ejection data for ejecting the ink from the ink ejecting portion corresponding to recording data so as to correspond to the number of times of the relative displacement;

separately setting liquid ejecting data for ejecting the liquid from the liquid ejecting portion corresponding to the recording data so as to correspond to the number of the relative displacement in accordance with a setting manner different from the setting manner determined by the ink ejection data with the ink ejection data setting means; and controllably ejecting the ink and the liquid from the ink ejecting portion and the liquid ejecting portion based on the ink ejecting data and the liquid ejecting date separately set so as to correspond to the number of times of the relative displacement.

In a twenty fifth aspect of the present invention, there is provided a printed article obtained by applying an ink and a liquid containing at least a printing property improving liquid to be given to a printing medium to a same range of the printing medium by plural times, wherein the liquid is applied so that a theoretical sum of each printed pixels formed by the liquid applied by plural times.

In a twenty sixth aspect of the present invention, there is provided an ink tank usable for an ink jet printing method of performing printing onto a printing medium with the use of both of a colored ink ejected from an ink jet head and a printing property improving liquid to be applied to the printing medium for improving a printing property for an ink jet printing apparatus, comprising the steps of:

at least one time or more printing the colored ink onto the printing medium;

at least one time or more applying the printing quality improving liquid to an image range of the printing medium which is printed by the colored ink; and at least one time or more printing the colored ink onto the image range of the printing medium, the ink tank, including a tank chamber for accommodating a liquid containing at least a printing property improving liquid to be applied to a printing medium for improving a printing property for an ink or an ink jet printing apparatus or an ink tank including a feed port for feeding to an ink jet head the liquid containing at least the accommodating ink or printing property improving liquid, wherein the tank chamber has a structure that a plurality of ink chambers are integrated with each other, and one of the ink chambers is formed with a plurality of feed ports.

In a twenty seventh aspect of the present invention, there is provided an ink tank, wherein it includes feed ports each for feeding the printing property improving liquid and a pair of colored ink feed ports having the feed ports interposed therebetween, the pair of colored ink feed ports being communicated with a substantially U-shaped ink chamber while the colored ink chamber having the ink chamber disposed therein and the feeding ports for the printing property improving liquid being communicated with the pair of colored ink feeding ports.

Ink may be a black ink, wherein the printing property improving liquid contains cationic substances as low and high molecular components, and wherein the colored ink contains an anionic dyestuff.

The printing property improving liquid may contain cationic substances as low and high molecular components, and the colored ink contains an anionic dyestuff or at least anionic compound and pigment.

In a twenty eighth aspect of the present invention, there is provided an ink jet cartridge, comprising a tank chamber for accommodating a liquid containing at least a printing property improving liquid to be applied to a printing medium for improving a printing property for ink jet printing or tank having the liquid accommodated therein or an ink tank including a feed port for containing at least the printing property improving liquid and feeding it to a ink jet head, an ink tank having a structure that a plurality of ink chamber integrated with each other and one of the ink chambers is formed with a plurality of feeding ports, an ink ejecting head for ejecting the ink therefrom, an liquid ejecting head for ejecting the printing property improving liquid, and ink jet head having the ink tank detachably connected thereto.

In a thirty ninth aspect of the present invention, there is provided an ink jet cartridge as claimed in claim 101, wherein the ink tank includes a feed port for the printing property improving liquid and a pair of feed ports located between the foregoing feed port, and the pair of feed ports are communicated with a substantially U-shaped ink chamber which surrounds the ink chamber for printing property improving liquid.

In a thirtieth aspect of the present invention, there is provided an ink jet cartridge as claimed in claim 102, wherein the colored ink is a black color, wherein the printing property improving liquid contains cationic substances as low and high molecular components, and wherein the colored ink contains an anionic dyestuff.

In a thirty first aspect of the present invention, there is provided an ink tank, comprising:

an ink chamber for accommodating an ink and a three-dimensional netting structure, the ink chamber having an ink conductive port for conducting the ink to an outside of the ink chamber; and a liquid chamber for a printing property improving liquid and a three-dimensional netting structure, the liquid chamber having a liquid conductive port for conducting the printing property improving liquid to an outside of the liquid chamber, wherein the ink chamber is integrated with the liquid chamber.

The printing property improving liquid may contain cationic substances as low and high molecular components, and wherein the ink contains an anionic dyestuff.

The ink may be accommodated within the ink chamber, and wherein the printing property improving liquid is accommodated within the liquid chamber.

It should be noted that, in the present invention, improvement of the printing ability includes improvement of image quality, such as density, chroma, degree of sharpness at the edge portion of the image, dot diameter and so forth, improvement of ink fixing ability, and improvement of weather-resistance, i.e. durability of the image, such as water-resistance, light resistance and so forth.

It is not inherent that the printing property improving liquid is separately ejected from the ink, but can be ejected in the condition mixed with an ink which is not affected by the contained printing property improving liquid. It should be noted that, in the following discussion, the printing property improving liquid may also be referred to as P or S liquid, occasionally.

In the present invention, "similar pixel" means pixels where the printing ink and the printing property improving liquid are printed on the printing medium in the same order and/or pixels which are the same time period T defined from a time when the printing property improving liquid is reached to the printing medium to a time when the printing ink is reached to the printing medium.

Also, in the present invention, "substantially adjacent" means to be partially placed adjacent to each other in the printing medium by penetration thereinto even when the inks are separated away from each other upon ejection or upon hitting on the surface of the printing medium, and thus includes such case.

Also, the ejecting portion is an ejection nozzle array for the ink and the printing property improving liquid. Also, a head chip means a chip, in which the ejection nozzle group is formed to form the ejecting portion in one substrate. By combining a plurality of such head chips, a head unit is formed.

On the other hand, the head portion is not inherent to be formed with one head chip but may extend over different chips.

Furthermore, an ink-jet head of the present invention means a assembly portion of the ejecting portion in so-called ink-jet printing apparatus, which can be integrate with the apparatus or independent therefrom. It should be noted that, in case of independent, the above-mentioned head unit is included. In such case, number of the head chip to be employed is not specified. In case of a color serial type ink-jet head, the direction to arrange respective heads may be in alignment in the transverse direction parallel to the primary scanning direction or in the perpendicular direction perpendicular to the primary scanning direction.

With the printing method set forth above, an image realizing both of uniformity of the image and color developing ability can be obtained.

Namely, after performing printing with a colored ink on the printing medium for one or more times, a printing property improving liquid is applied to the colored ink printed region for one or more times. Subsequently, further printing with the colored ink is performed over the image region where the printing property improving liquid is applied for one or more times on the printing can be performed. By this, on the printing property improving liquid having low coverage ratio, at immediately adjacent position to the colored ink pixel, the color ink enhanced with the printing property improving liquid applied thereto, the coverage ratio becomes uniform through overall portion to achieve both of the uniformity of the image and color development.

On the other hand, the similar effect may be attained by applying the printing colored ink after printing with the printing property improving liquid for at least one time, then, the printing property improving liquid is applied at least once thereover, and subsequently, printing is performed with the color ink for at least once.

In the ink-jet printing employing both of the printing property improving liquid and the colored ink, there are formed a pixel on which the colored ink hits at least once after application of the printing property improving liquid, a pixel, on which, after hitting the colored ink at least once, the printing property improving liquid is hit at least once, and subsequently the colored ink is hit at least once, and a pixel, on which after hitting the printing property improving liquid at least once, the colored ink is hit at least once, and subsequently the printing property improving liquid is hit at least once. By forming the image, in which at least two kinds of pixels among these pixels, uniform image in macro view can be formed with admixing the pixels having mutually different natures in micro view.

It should be noted that, in the printing method of the present invention, it is desirable to form the image with the pixels, on which the finally hitting on the printing medium is the colored ink. It is thus required that such pixel is majority in the image.

The printing property improving liquid includes a liquid to make a dye in the ink insoluble, a liquid to cause dispersion break down of a pigment in the ink, a treatment liquid and so forth. Here, making insoluble means is a phenomenon to cause ionic interaction between an anion group contained in the dye of the ink and a cationic group of a cationic material included in the printing property improving liquid to cause ion coupling and whereby to cause separation of dye which is uniformly solved in the ink, from the solution. It should be noted that even when not all of the dye in the ink is made insoluble, the effects of suppression of color bleeding, improvement of color development, improvement of the image quality, improvement of fixing ability, which the present invention intends to, can be attained when a part of the dye in the ink is made insoluble. Also, the wording "coagulation" is used in the same meaning to "making insoluble in case of a water soluble dye, in which a coloring agent contains anion group. On the other hand, when the coloring agent employed in the ink is a pigment, ionic interaction between the pigment dispersing agent or the surface of pigment and cationic group of cationic material included in the printing property improving liquid occurs to cause dispersion break down of the pigment to cause aggregation of pigment particle to form a large diameter particle. Normally, associated with coagulation, viscosity of the ink is increased. It should be noted that even when not all of the pigment in the ink is made insoluble, the effects of suppression of color bleeding, improvement of color development, improvement of the image quality, improvement of fixing ability, which the present invention intends to, can be attained when a part of the pigment in the ink is made insoluble.

According to the present invention, upon performing a plurality of times of printing operation for the same printing range, by setting manner of application of the liquid containing at least the printing property improving liquid depending upon manner of application of the ink, a printing products with improved water-resistance and/or light resistance, or a high density and high quality printed image with lesser feathering and bleeding between colors and superior color development can be obtained.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 3A to 3C are explanatory illustrations showing the task to be solved by the present invention;

FIGS. 11A and 11B are explanatory illustrations showing the fourth embodiment of the printing method according to the invention;

FIG. 12 is an explanatory illustration showing the fourth embodiment of a printing method according to the invention;

FIGS. 16A, 16B and 16C are explanatory illustrations showing the sixth embodiment of the printing method according to the invention, wherein FIG. 16A is a diagrammatic section showing the internal structure of an ejecting portion, FIG. 16B is a front elevation of the ejecting portion as viewed from the direction of ejecting openings, and FIG. 16C is a plan view of FIG. 16B;

FIGS. 34A, 34B, 34C, 34D and 34E are explanatory illustrations of the ink and a mask for the printing property improving liquid in the ink-jet printing apparatus of FIG. 19;

FIGS. 36A, 36B, 36C and 36D are explanatory illustrations of a mask for the printing property improving liquid in the fourteenth embodiment of the invention;

FIGS. 37A, 37B and 37C are explanatory illustrations of a mask for the printing property improving liquid in the sixteenth embodiment of the invention;

FIGS. 47A, 47B and 47C are drawings showing examples of separate type heads in another embodiment according to the present invention, respectively;

DESCRIPTION OF THE PREFERRED EMBODIMENTS

The preferred embodiments of the present invention will be discussed hereinafter in details with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order not to unnecessary obscure the present invention.

(First Embodiment)

Figure 4:
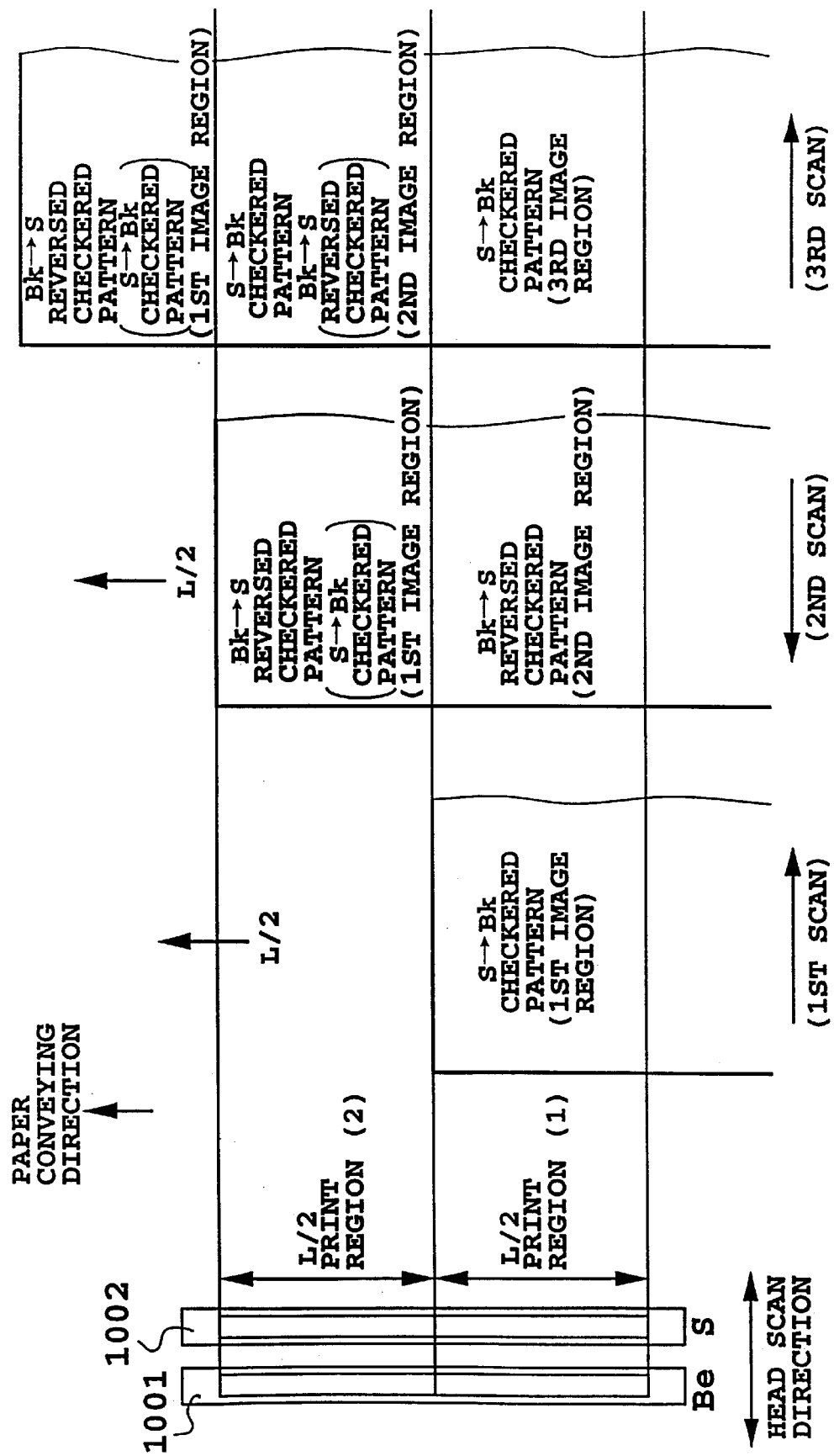
FIG. 4 is an explanatory illustration showing the first embodiment of a printing method according to the invention.

FIG. 4 shows the first embodiment of a printing method according to the present invention. The shown embodiment is directed to the printing method employing a monochrome (Bk) printing ink and a printing property improving liquid (S). It should be noted that improvement of the printing ability by the printing property improving liquid includes enhancement of image quality, such as improvement of density, chroma, degree of sharpness at an edge portion, dot diameter and so forth, improvement of fixing ability of the ink, improvement of durability of image, i.e. weather-resistance, such as water-resistance, light-resistance and so forth.

On a not shown carriage, a Bk head 1001 and a printing property improving liquid ejecting head (S head) 1002 are mounted. In the shown example, in odd number of scanning cycle where the heads are moved from left to right (forward direction) for printing, ejection to the printing medium is performed in the order of the printing property improving liquid and then the Bk ink. On the other hand, in the even number of scanning cycle where the heads are moved from right to left (backward direction) for printing, ejection to the printing medium is performed in the order of the Bk ink and then the printing property improving liquid.

At first, for the first image region, by the first scanning (forward direction), employing nozzles in a printing region 1 corresponding to the lower half of the width of the head nozzles, printing with the Bk ink is performed according to a printing data which is established by thinning the original image data in staggered pattern. The printing data for the printing property improving liquid is the same as the printing data for the Bk ink to be printing in the same scanning cycle. After printing for the first image region, the printing medium is fed in a magnitude corresponding to the half width of the head nozzle width L (L/2). In the second scanning cycle (backward direction), printing is performed according to the complementary printing data to that in the first scanning cycle. The complementary printing data is generated by thinning the original data in reversed staggered pattern. At this time, with a second printing region 2 (upper half) of the printing head, printing is effected for the first image region. In conjunction therewith, second image region is printed with the printing region 1 (lower half) of the printing head. At this timing, the pixels in the portion of the first image region which was not printed in the first scanning cycle is printed by the complementary printing data generated by thinning the original data in reversed staggered pattern in the order of printing property improving liquid and then the Bk ink. Thus, through the second scanning cycle, printing for all of the image data for the first image region is completed. At this time, in the first image region, the staggered pattern is printed in the order of printing property improving liquid and then Bk ink and the reversed staggered pattern is printed in the order of the Bk ink and then printing property improving liquid. On the other hand, in the second image region, half of the image data is printed in the reversed staggered pattern in the order of the Bk ink and then the printing property improving liquid.

After paper feeding for L/2 width of the printing medium, third scanning cycle (forward direction) is performed for printing in the staggered pattern generated in the similar matter to that in the first scanning cycle. Thus, the second image region is printed by the upper half of the nozzle and a third image region is printed by the lower half of the nozzle. Printing for the second image region is completed by this third scanning cycle. Here, the second image region is initially printed with the reversed staggered pattern with ejection of the Bk ink and the printing property improving liquid in the order of the Bk ink and then the printing property improving liquid, and then printed with the complementary staggered pattern with ejection of the Bk ink and the printing property improving liquid in the order of the printing property improving liquid and then the Bk ink. By repeating the foregoing process, the image regions on the printing medium respectively divided into L/2 width are sequentially printed for completing printing with all of the printing data.

The effect of the shown embodiment will be discussed hereinafter.

Figure 5A:
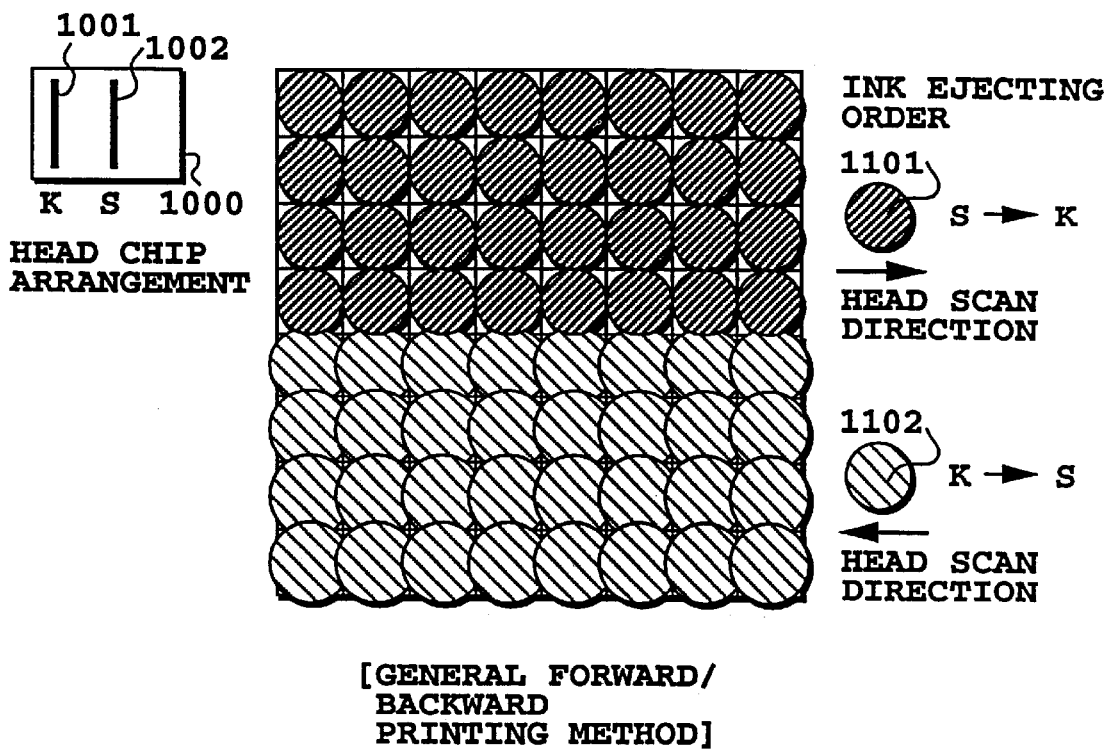
FIGS. 5A and 5B and are explanatory illustrations for comparing the first embodiment of the printing method of the present invention with the conventional method.
Figure 5B:
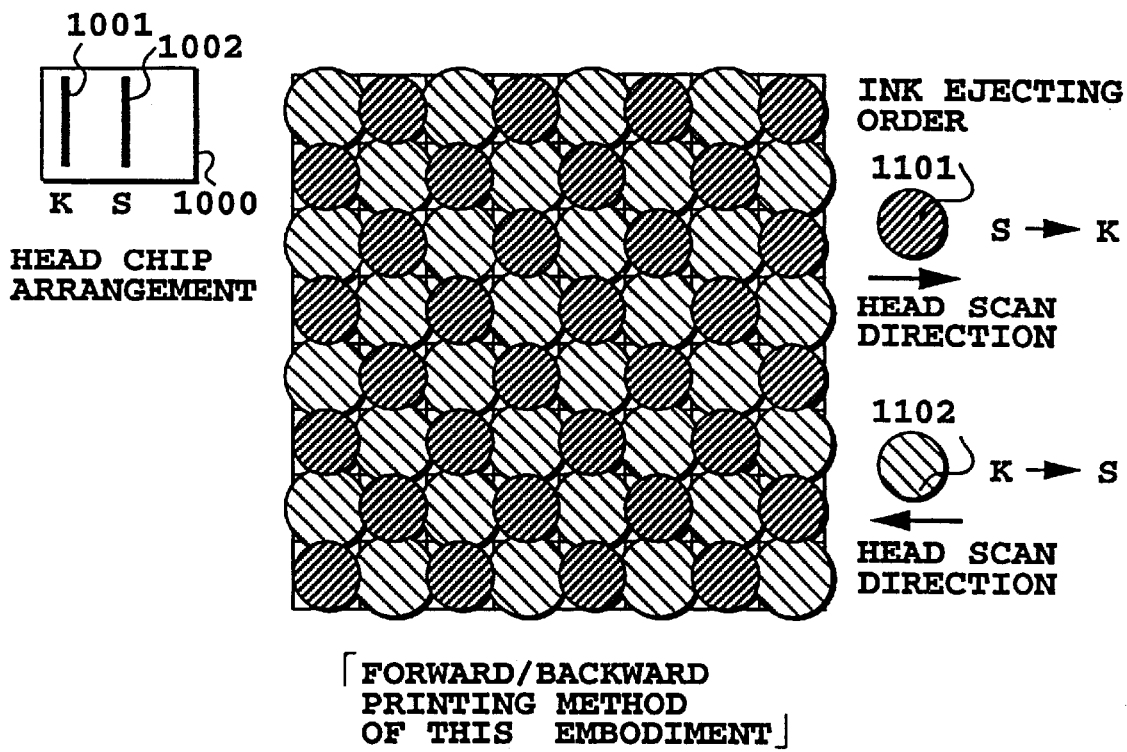

Comparison of the shown embodiment of the ink-jet printing method and the typical printing method will be shown in FIGS. 5A and 5B. It should be noted that, in FIGS. 5A and 5B, an example employing a four nozzle head construction is shown for facilitating understanding of the example of the Bk ink and the printing property improving liquid. The printing pixel 1101 is a pixel which is printed in scanning of the head unit in the forward direction from left to right. Therefore, in the pixel 1101, the printing property improving liquid (S) is ejected at first, and then the Bk ink is ejected. On the other hand, the pixel 1102 is a pixel printed in scanning of the head unit in the reverse direction from right to left. In the pixel 1102, the Bk ink is ejected at first, and then the printing property improving liquid (S) is ejected. In the typical printing method, since one path reciprocal printing 1101 and 1102 become band per nozzle width and the printed pixels 1101 is concentrated. Therefore, in such region, the covering ratio is lowered to make the line perceptible (FIG. 5A). In contrast to this, in the shown embodiment, as shown in FIG. 5B, respective pixels are arranged in the staggered pattern and the reversed staggered pattern and the same region has to be printed by two more scanning cycles. In the printed image, both of the pixels are printed in the forward scanning cycle and the are presented so that the pixel printed in the order of the Bk ink and then the printing property improving liquid to achieve high covering rate is located adjacent to the pixel printed in the order of the printing property improving liquid and then the Bk ink to lower the coverage ratio. Therefore, as a whole, the coverage ratio can be equalized to avoid occurrence of the line.

On the other hand, covering the color development ability, in the shown embodiment, 50% of the pixels are consisted of the pixels having high color development ability, which are uniformly distributed in macro view. Therefore, the image achieving high color development and high uniformity can be formed without significantly degrading the effect of the printing property improving liquid. Furthermore, concerning water-resistance, the image having high water-resistance can be obtained irrespective of the order of ejection of the printing property improving liquid and the Bk ink.

Also, color fluctuation and density fluctuation due to difference of order of ejection of the printing ink and the printing property improving liquid can be caused per dot and thus the uniformity is lowered in the micro view, the image having high uniformity with equalized uniformity in macro view can be formed. Therefore, even when the printing property improving liquid is employed, uniform image can be observed.

Figures 6A, 6B, 6C:
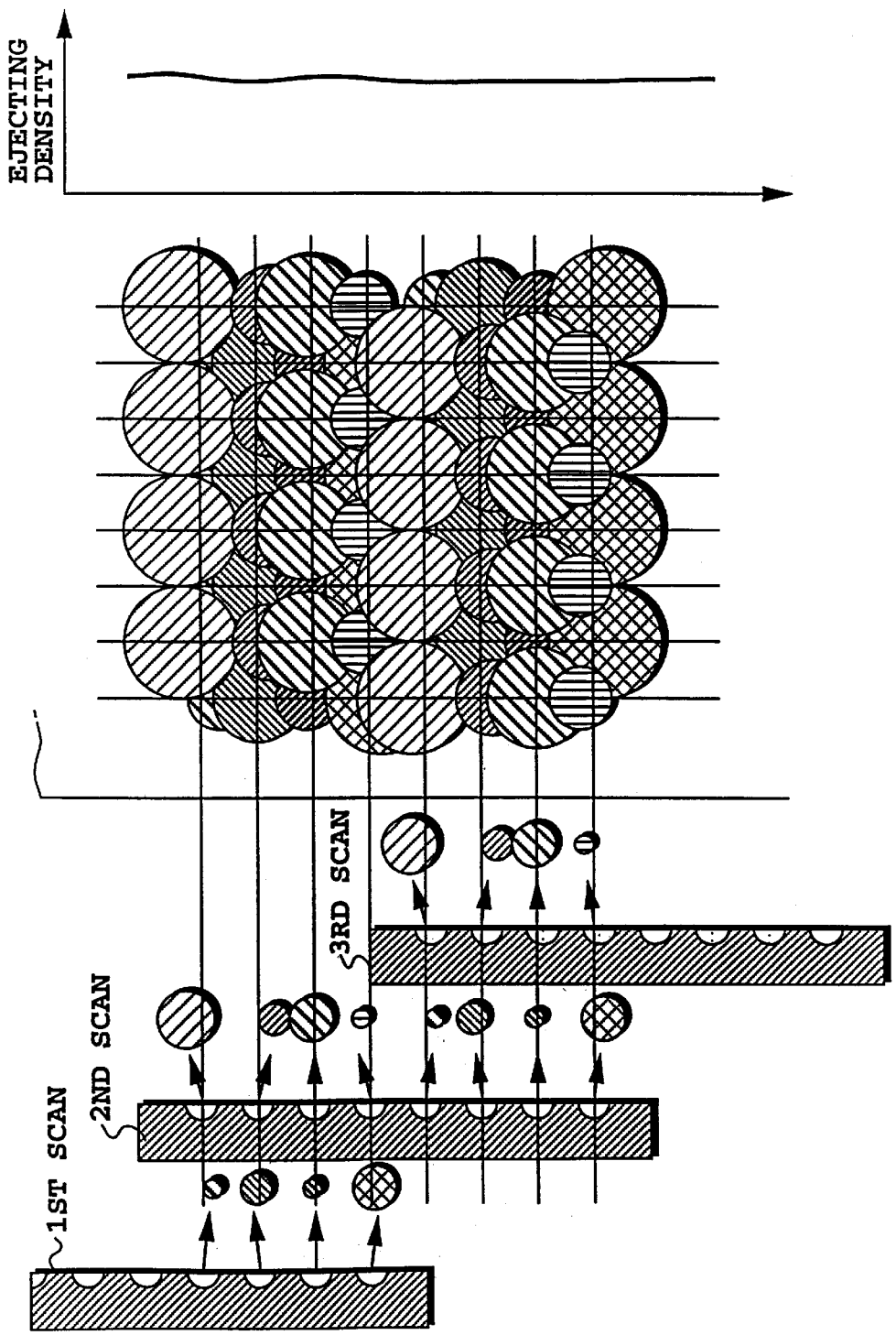
FIGS. 6A, 6B and 6C are explanatory illustrations showing the first embodiment of the printing method according to the invention.

Furthermore, by performing printing in this way, as shown in FIGS. 6A, 6B and 6C, by employing different nozzles in the same raster as the printing method of the conventional printing ink to achieve the effect of the multi-pass printing to avoid nozzle fluctuation. Therefore, amount of the ink and the printing property improving liquid to cause reaction becomes uniform as a whole to suppress the density fluctuation and color fluctuation.

Furthermore, even when the ejection order between the ink and the printing property improving liquid is locally alternated due to registration error between the heads, since the printing method according to the present invention formed the pixels of different ejection order in admixing manner, in nature, the density fluctuation, color fluctuation due to registration error can be avoided. Therefore, the formed image cannot be disturbed significantly to obtain highly uniform image, Namely, while the image formed by conventional printing method with a fixed order of the printing property improving liquid and then the ink, has high color development ability but has low uniformity to have large number of lines, or the image formed by ejection in the order of the printing ink and then the printing property improving liquid has high uniformity but low color development ability, the present invention can provide the image having high color development ability with high uniformity.

Furthermore, even in bi-directional printing employing the printing property improving liquid, lowering of uniformity of the image can be avoided. In addition, the shown embodiment may avoid nozzle fluctuation in the multi-pass printing.

While the shown embodiment shows an example of the monochrome ink and the printing property improving liquid, similar effect can be attained even when a plurality of printing inks are employed, such as in the color printing. Namely, presenting the pixels formed by the ejection order to the printing property improving liquid, then the printing ink 1 and further the printing ink 2, and the pixels formed by the ejection order to the printing ink 2, then the printing ink 2 and the printing property improving liquid in admixing manner in micro view, uniform image can be obtained in the macro view.

Furthermore, while the shown embodiment has been illustrated in the case of two path bi-directional printing, by increasing number number scanning cycles, influence of the nozzle fluctuation and so forth can be further reduced to achieve higher quality of image while the printing speed is inherently lowered.

While the shown embodiment employs staggered and reversed staggered patterns of mask in thinning the image data to be printed, the present invention should not be limited to the shown embodiment. Thus, the thinning pattern may be arbitrarily selected depending upon compositions of the ink and the printing property improving liquid, the desired image quality and printing mode. For example, in the printing mode giving importance for color development on the image, the mask pattern may be determined so that majority of pixels formed by ejection in the order of the ink at first and then the printing property improving liquid.

(Second Embodiment)

Figure 7:
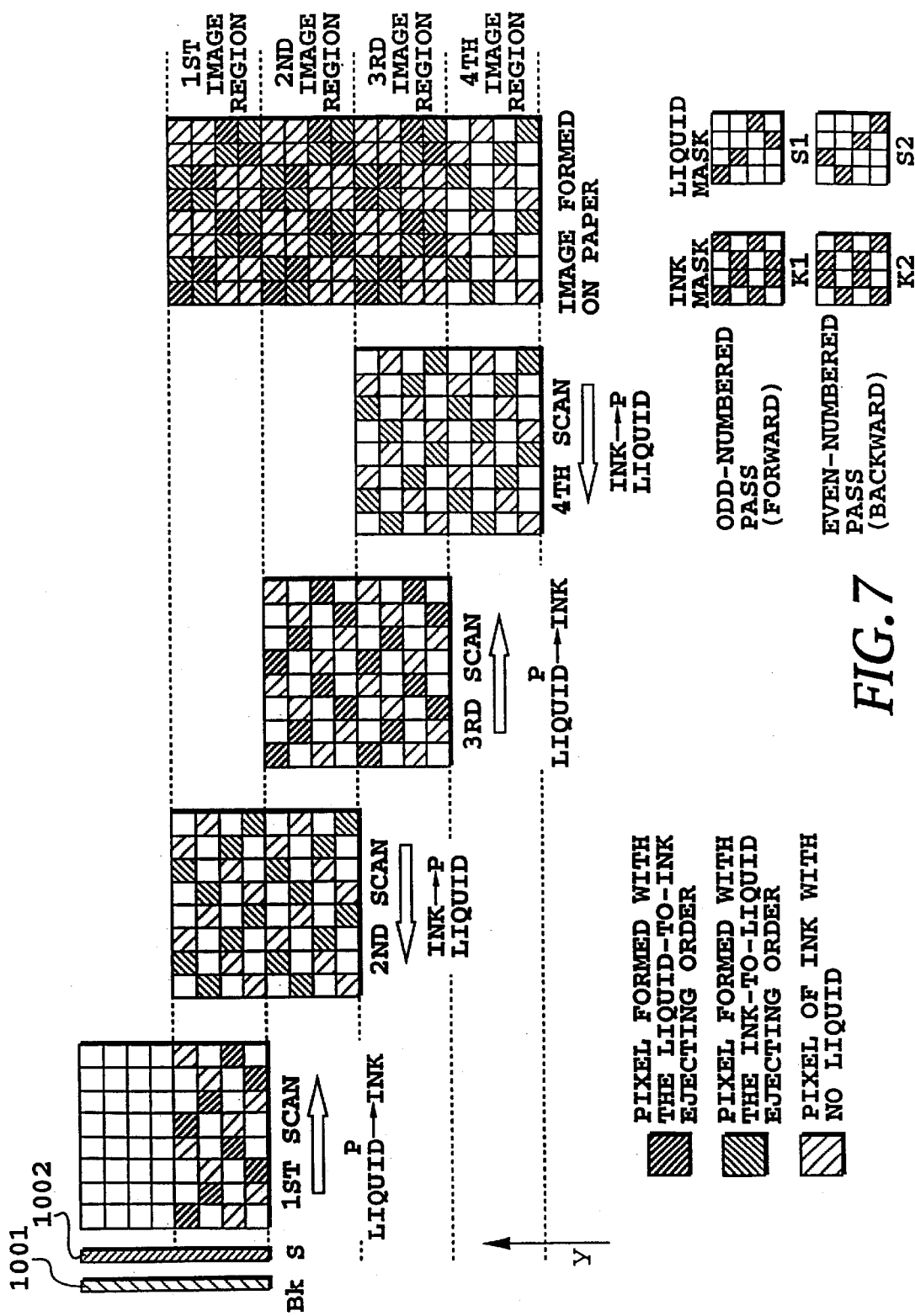
FIG. 7 is an explanatory illustration showing the second embodiment of a printing method according to the invention.
Figure 8:
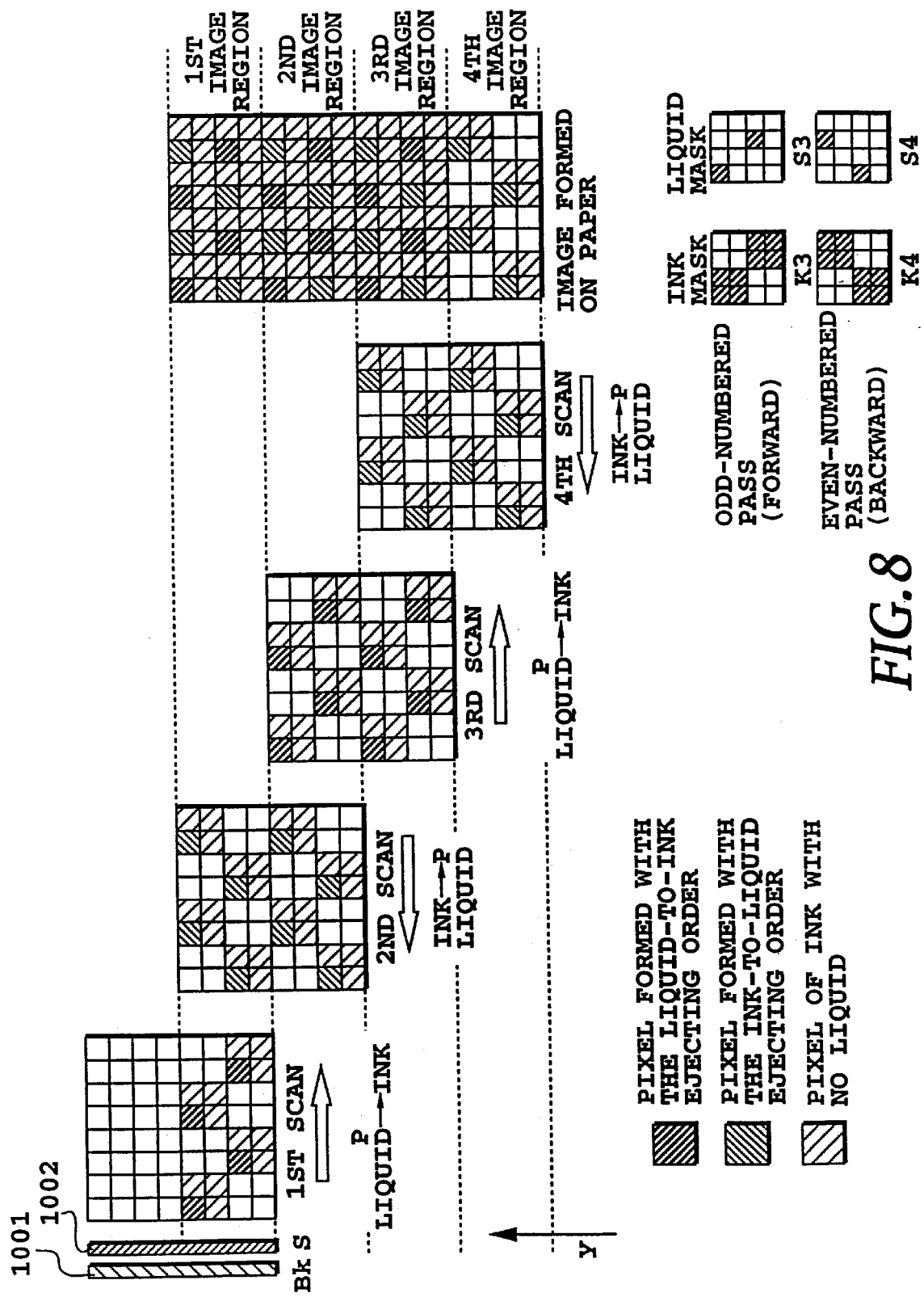
FIG. 8 is an explanatory illustration showing the second embodiment of a printing method according to the invention.

FIGS. 7 and 8 show the second printing method according to the present invention. In the first embodiment, the printing property improving liquid is employed to all of the printing pixels. However, in case of the color printing employing a plurality of inks, if the printing property improving liquid is used for all of the ink printing pixels, the consumption of the printing property improving liquid becomes multiple integer relative to one color of the printing ink. Through the experiments made by the inventors, it has been found that even when the printing property improving liquid is thinned or curtailed to be about 50 to 25% of the printing ink, the effect of the printing property improving liquid may not be varied significantly (slightly differentiated depending upon composition of the printing property improving liquid). Therefore, in the shown embodiment, the equivalent effect to the foregoing first embodiment can be achieved with reducing consumption of the overall printing.

FIG. 7 shows an example where the consuming amount of the printing property improving liquid is 50% of the printing pixels. In FIG. 7, 1001 and 1002 denote heads for Bk ink and the printing property improving liquid, respectively. The printing ink and the printing property improving liquid are performed by bi-directional printing in accordance with two kinds of masks for 4×4 pixels. In the first scanning cycle, printing is performed for the first image region with mask patterns K1 and S1. As a result, 25% of the pixels in the first image region are printed with both of the printing property improving liquid and the printing ink ejected in the order of the printing property improving liquid and then the printing ink, and another 25% of pixels are printed only with the printing ink. Subsequently, the printing medium is fed for L/2 (corresponding to four nozzles in the drawing). Then, in the second scanning cycle, printing is performed for the pixels selected by mask patterns K2 and S2. By this, printing for the remaining pixels in the first image region is completed. On the other hand, in the second image region, 25% of pixels are printing with the printing ink and the printing property improving liquid ejected in the order of the printing ink and then the printing property improving liquid, and another 25% of pixels are printed only with the printing ink. Then, after feeding the printing medium for L/2 again, printing is performed employing the masks the same as those used in the first scanning cycle. By this, printing for the second image region is completed. Namely, the printing property improving liquid is printed with 25% masks in both of the odd number of scanning cycles and even number of scanning cycles and that is printed for 50% of the overall pixels. On the other hand, the printing ink is printed with 50% masks in both of the odd number of scanning cycles and even number of scanning cycles and that is printed for 100% of the overall pixels. Therefore, in total, the distribution of the pixels is 25% of pixels printed by both of the printing ink and the printing property improving liquid ejected in the order of the printing property improving liquid and then the printing ink, 25% of pixels printed by both of the printing ink and the printing property improving liquid ejected in the order of the printing ink and then the printing property improving liquid, and remaining 50% of pixels printed only with the printing ink.

In the formed image, around the pixel printed in the order of the printing property improving liquid and then the printing ink is surrounded with other pixels printed with the printing ink and the printing property improving liquid ejected in the reversed order or only with the printing ink. Therefore, no line will be caused. Similarly to the first embodiment, while the density fluctuation and color fluctuation are present due to presence and absence of the printing property improving liquid and order of ejection of the printing ink and the printing property improving liquid in the micro view, the image having satisfactory uniformity in macro view can be formed. In addition, in the overall printing apparatus, the consuming amount of the printing property improving liquid can be reduced in the extent that the effect thereof may not be lost.

While the shown embodiment has been discussed in terms of the example, in which the pixels to be applied the printing property improving liquid is 50% of the overall pixels, it may also be possible to further reduce the number of pixels to be applied the printing property improving liquid to be 25% of the overall pixels as shown in FIG. 8. In the example, as masks for the printing ink, mask patterns K3 and K4 for printing 50% of pixels, and as masks for the printing property improving liquid, mask patterns S3 and S4 for 12.5% of the pixels are employed.

(Third Embodiment)

Figure 9:
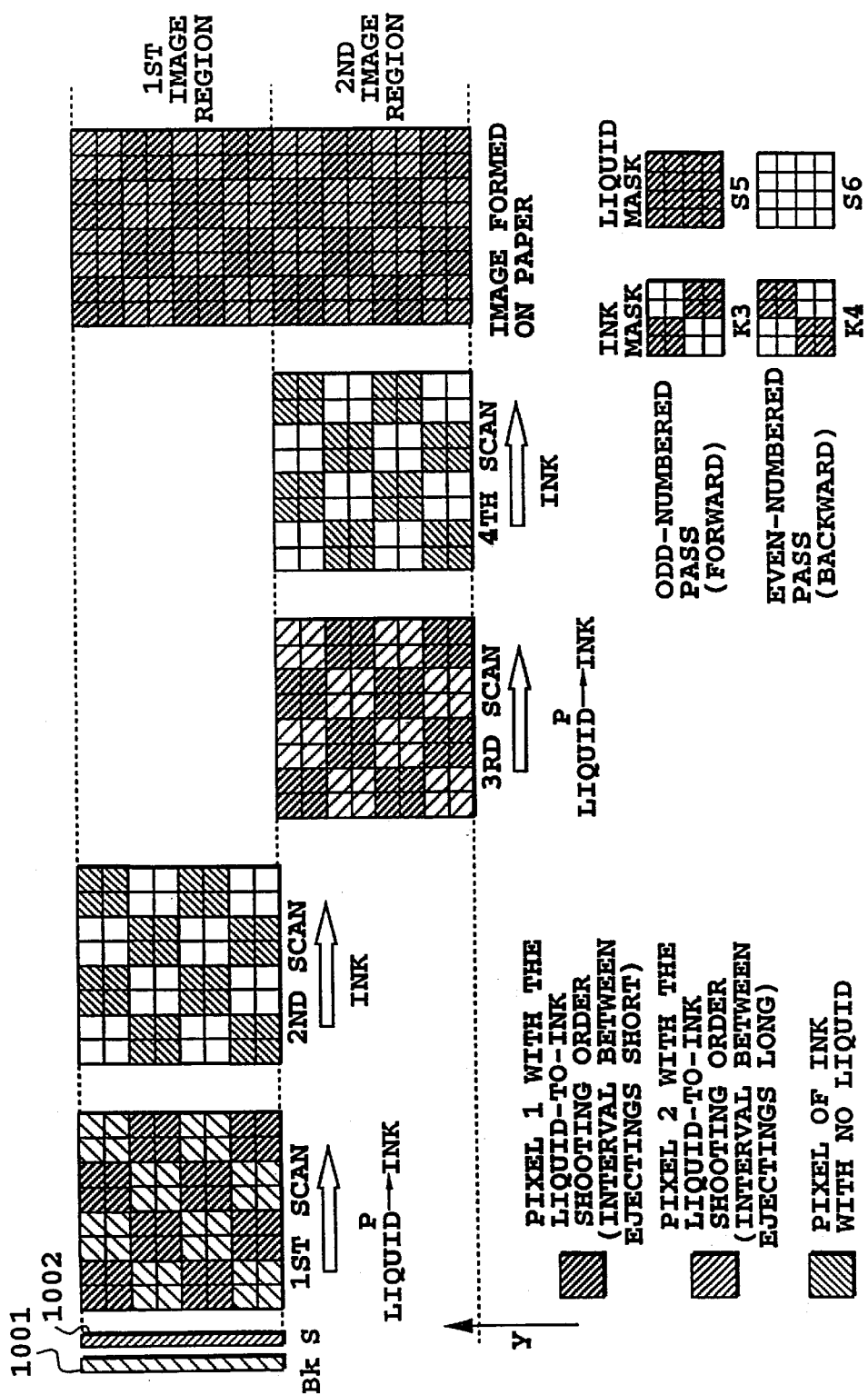
FIG. 9 is an explanatory illustration showing the third embodiment of a printing method according to the invention.

FIG. 9 shows the third embodiment of the printing method according to the present invention. The shown embodiment of the printing method is adapted to avoid fluctuation to make lines perceptible which can be caused in ejection of the printing ink and the printing property improving liquid in the order of the printing property improving liquid and then the printing ink. In FIG. 9, 1001 and 1002 denote heads for Bk ink and the printing property improving liquid, respectively.

The printing ink and the printing property improving liquid are performed only in the forward scanning direction. In the first scanning cycle, printing is performed for the first image region by the Bk ink according to the printing data generated by thinning the Bk printing data with the mask patterns K3. The printing data of the printing property improving liquid is 100% (mask pattern S5) with respect to the Bk image data in the first image region. Printing of the printing property improving liquid is performed in the first scanning cycle. Without feeding the printing medium, the printing heads are returned to their home position by idling scan without printing. Subsequently, in the second scanning cycle, printing is performed with the printing data for the Bk ink complementary with the printing data for the Bk ink in the first scanning cycle, which complementary printing data for the Bk ink is generated by thinning the original Bk image data with the mask pattern K4. At this time, printing with the printing property improving liquid is not performed (mask pattern S6). In this second scanning cycle, printing of the image in the first image region is completed. Thereafter, the printing medium is fed and the printing heads are returned to the home position with idling scan without performing printing. Then, with respect to the second image region, the similar printing operations as those in the first and second printing cycles in the third and fourth scanning cycles. By repeating printing operation set forth above, the image can be formed.

Namely, in the (2n–1)th scanning cycle (n is natural number), the printing with the printing ink is performed in accordance with the printing data generated by thinning the original printing data with the mask pattern K3 and the printing with the printing property improving liquid is performed for the printing data which is 100% in relation to the printing data for the printing data in the same scanning cycle, and in the (2n)th scanning cycle, the printing is performed only with the printing ink according to the printing data which is complementary with the printing data used in the (2n–1)th scanning cycle, which printing data for the (2n)th scanning cycle is generated by thinning the original printing data for the printing ink with the complementary mask pattern K4. In all regions, ejection is performed in the order that the printing property improving liquid and then the printing ink. However, periods from hitting of the printing property improving liquid on the printing medium to hitting of the printing ink on the printing medium (hitting interval T) are differentiated significantly. Namely, in the pixels corresponding to the pattern K3, the hitting interval is short whereas, in the pixels corresponding to the pattern K4, the hitting interval T becomes long.

Figure 10:
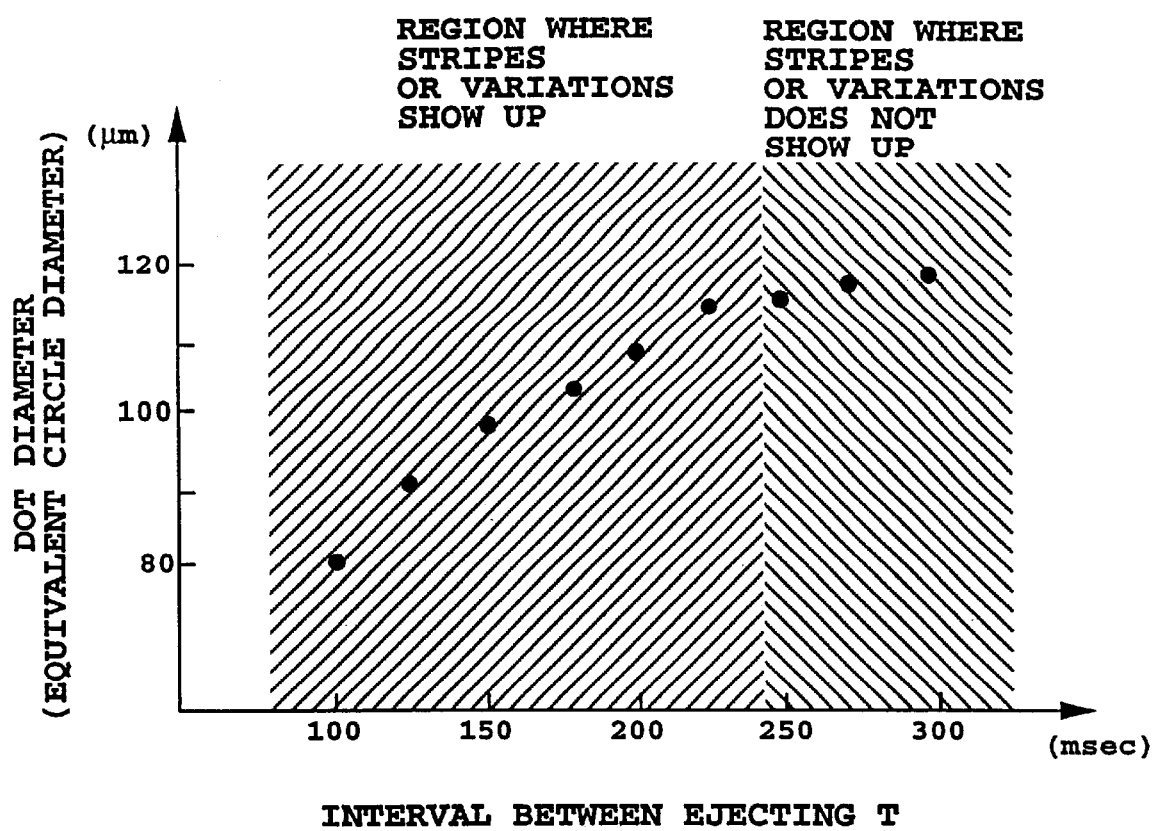
FIG. 10 is an explanatory illustration showing the third embodiment of a printing method according to the invention.

Hereinafter influence of the hitting period T which is the period from hitting of the printing property improving liquid on the printing medium to hitting of the printing ink at the same pixel. At first, considering the relationship between the hitting interval and the dot diameter (diameter of equivalent circle) of the printing ink printed are shorter T results in smaller dot, and conversely, longer T results in larger dot. The results of experiments with respect to the relationship between the hitting interval and the dot diameter (diameter of equivalent circle) of the printing ink printed are shown in FIG. 10. This shows the result where the printing property improving liquid and the printing ink are ideally overlaps in hitting. In the graph, horizontal axis shows a period from hitting of the printing property improving liquid on the printing medium to hitting of the printing ink, and the vertical axis shows the dot diameter (diameter of equivalent circle) of the printing ink on the printing medium. Supposing printing in 360 dpi, when the hitting interval becomes longer than a certain level (longer than or equal to 250 msec.), the image with high uniformity with no perceptible fluctuation line can be obtained.

On the other hand, in terms of color development, it has been known that the shorter hitting interval T may results in the image of higher color development. This is considered that the longer T may permit the reacting component of the printing property improving liquid to penetrate into the printing medium in the certain depth, and associating therewith, the coloring component of the printing ink may also penetrate into the printing medium from the surface thereof to be fixed. In the experiments, it has been found that the effect for further enhancement of the color development can be obtained in the order of 150 msec. of T.

Next, effect of the shown embodiment will be discussed. In the shown embodiment, as shown in FIG. 10, printing of the Bk ink and the printing property improving liquid are performed in the same scanning cycle in one scanning cycle and printing of the Bk ink is performed in different scanning cycle to printing of the printing property improving liquid in the other scanning cycle. Therefore, in each image region, the pixels having different hitting intervals T are present in admixing manner with the mask patterns K3 and K4. Therefore, in micro view, regions which are printed with mutually different hitting periods T, are present in admixing manner. Since the pixel printed with the shorter hitting interval and the pixel printed with the longer hitting interval are located adjacent to each other. Therefore, in total covering ratio is increased to make the fluctuation line not perceptible. In terms of the color development, since the image is formed with containing 50% of pixels having high color development and, in macro view, such pixels with high color development are distributed uniformly, the image having high color development can be attained without significantly lowering the effect of the printing property improving liquid.

In the shown embodiment, the mask patterns are formed in staggered and reversed staggered patterns with respect to 2×2 of pixels. However, this pattern is not exhaustive and merely show one example. Therefore, the mask pattern may be arbitrarily variable depending upon compositions of the ink and the printing property improving liquid, construction of the printing heads, printing data, the image quality required by the user, required printing speed and so forth, together with the printing path and so forth, While the shown embodiment has been illustrated in terms of ejection order of the printing property improving liquid and then the printing ink with different hitting interval T, even if the order of ejection is the printing ink and then the printing property improving liquid, the dot diameter and the color development of the dots may be differentiated when the hitting intervals are different between the dots. Even in such case, by admixing the pixels having different hitting intervals in respective image region, the image having high uniformity in macro view can be obtained.

(Fourth Embodiment)

Next, the fourth embodiment will be discussed.

FIGS. 11A and 11B are illustrations showing penetrating conditions of the printing ink and the printing property improving liquid in the depth direction of the printing medium, in printing in accordance with the shown embodiment of the printing method. In FIG. 11A printing is performed for the printing medium in the order of the printing ink, then the printing property improving liquid and then the printing ink. In this case, the printing ink is ejected twice for one image data. However, the total amount of the printing ink is set to be equivalent to the ink amount in printing performed without employing the printing property improving liquid. Preferably, the ink amount is about 50% of the final ink amount. In this case, since the printing property improving liquid is sandwiched between the printing ink ejected in advance of ejection of the printing property improving liquid (printing ink 1) and the printing ink ejected after ejection of the printing property improving liquid (printing ink 2), in comparison with the case where the ink and the printing property improving liquid are ejected in the order of the printing property improving liquid and then the printing ink or the printing ink and then the printing property improving liquid, reaction area becomes greater to make the effect more stable. Also, because of presence of the printing ink 1 on the surface of the printing medium, the printing property improving liquid may stay in the area relatively close to the surface of the printing medium. Therefore, the coloring element of the dye of the printing ink 2 may stay at the surface of the printing medium to provide high color development. Furthermore, it becomes possible to prevent occurrence of formation of line due to small dot diameter in the case of printing in the order of the printing property improving fluid and then the printing ink.

Hereinafter, examples of the head construction and the printing method for realizing the shown embodiment will be discussed with reference to FIG. 12 in terms of the case where printing is performed in the order of the printing ink, then the printing property improving liquid and then the printing ink as shown in FIG. 11A. It should be noted that, in the shown embodiment, while the shown embodiment will be discussed in the example of the monochrome printing of Bk ink, the present invention should not be limited to the shown example.

In FIG. 12, 2000 denotes a head unit, 2001, 2002 and 2003 denote heads for ejection of Bk 1, printing property improving fluid and Bk 2, respectively. An image region 2011 of the printing medium is a region for performing printing upon scanning the head in the forward direction. At first, by shifting the head in the forward direction printing is performed for the region of 2011 corresponding to the nozzle width L by ejecting the printing ink 1 (Bk 1), the printing property improving liquid and then the printing ink 2 (Bk 2) in order. Then, paper is fed for the nozzle width L. Then, a region 2021 is printed by scanning the head in the reverse direction, and thereafter the printing medium is fed for the nozzle width L to perform printing on an image region 2012 to form the image. By repeating this, an entire image can be formed. Namely, in the image region 2010, the printing is performed by ejecting the printing ink and the printing property improving liquid in the order of Bk 1, then printing property improving liquid and then Bk 2, and conversely, in the region 2020, printing is performed by ejecting the printing ink and the printing property improving liquid in the order of Bk 2, then printing property improving liquid and then Bk 1.

In the shown embodiment, an example where the head for the printing property improving liquid is disposed between two Bk heads. However, the present invention should not be limited to the shown layout of the heads. For instance, in the case where one Bk head and one printing property improving liquid head are employed, the similar effect may be attained by increasing pass in printing.

In the shown embodiment of the printing method, the reaction area between the printing property improving liquid and the ink is increased. In addition, it becomes possible to prevent lowering the covering ratio as problem in the case of ejecting order of the printing property improving liquid and then the printing ink and also prevent burying of the coloring element in the printing medium as the problem of the case of ejection order of the printing ink and then the printing property improving liquid, and thus permit to provide the image with high color development and uniformity.

While the shown embodiment has been discussed in terms of monochrome printing, the present invention should not be limited to the monochrome printing but is applicable even for multi-color printing, such as color printing. In the latter case, printing is performed with two or more inks in the ejection order of the printing ink 1, then printing property improving liquid and the printing ink 2, greater reaction area of the printing inks with the printing property improving liquid and achieves satisfactorily high water-resistance in comparison with the case where the ejection is performed in the order of the printing property improving liquid, then the printing ink 1 and then the printing ink 2.

On the other hand, in FIG. 11B, printing is performed in the order of the printing property improving liquid, then the printing ink and then the printing property improving liquid. The total amount of the printing property improving liquid ejected separately is substantially the same as the amount of the printing property improving liquid in the former embodiment of FIG. 11A. Preferably, the ejection amount of the printing property improving liquid is approximately half. In this case, the area to cause reaction of the printing property improving liquid becomes greater to make the effect of the printing property improving liquid stable. In the similar printing method in the known art, nothing has been discussed about the amount of the printing property improving liquid as in the present invention. If printing is performed with the amount of the printing property improving liquid amount ejected before ejection of the printing ink is that illustrated in FIG. 11A, sufficient reaction should be caused between the printing property improving liquid and the printing ink, the formed image should be equivalent to that formed by ejection of the printing property improving liquid and the printing ink in the order of printing property improving liquid and then the printing ink and, on which fluctuation line is perceptible. On the other hand, when the amount of the printing property improving liquid to be ejected in advance of ejection of printing ink is too small, the formed image becomes equivalent to that formed by ejection of the printing property improving liquid and the printing ink in the order of printing ink and then the printing property improving liquid to form the image with lower color development and containing feathering. Therefore, the respective ejection amounts are preferred to be half of the amount of FIG. 11A.

Also, according to the technical idea of the present invention, reaction between the ink and the printing property improving liquid can be further prompted by further increasing number of times of ejection of the ink and the printing property improving liquid by further dividing the amount of the ink and the printing property improving liquid to be ejected to each pixel, such as printing property improving liquid, then the printing ink, then the printing property improving liquid and then the printing ink. However, this cannot be achieved unless the number of heads is increased or lowering the printing speed. Therefore, manner of realization of this may be differentiated depending upon requirement for the cost of the apparatus, printing speed, printing quality and so forth. At this time, it is desirable to set the ejection amount for each ejection so that the total ejection amount of the printing property improving liquid may not exceed an ink receptacle capacity of the printing medium.

(Fifth Embodiment)

Figure 13:
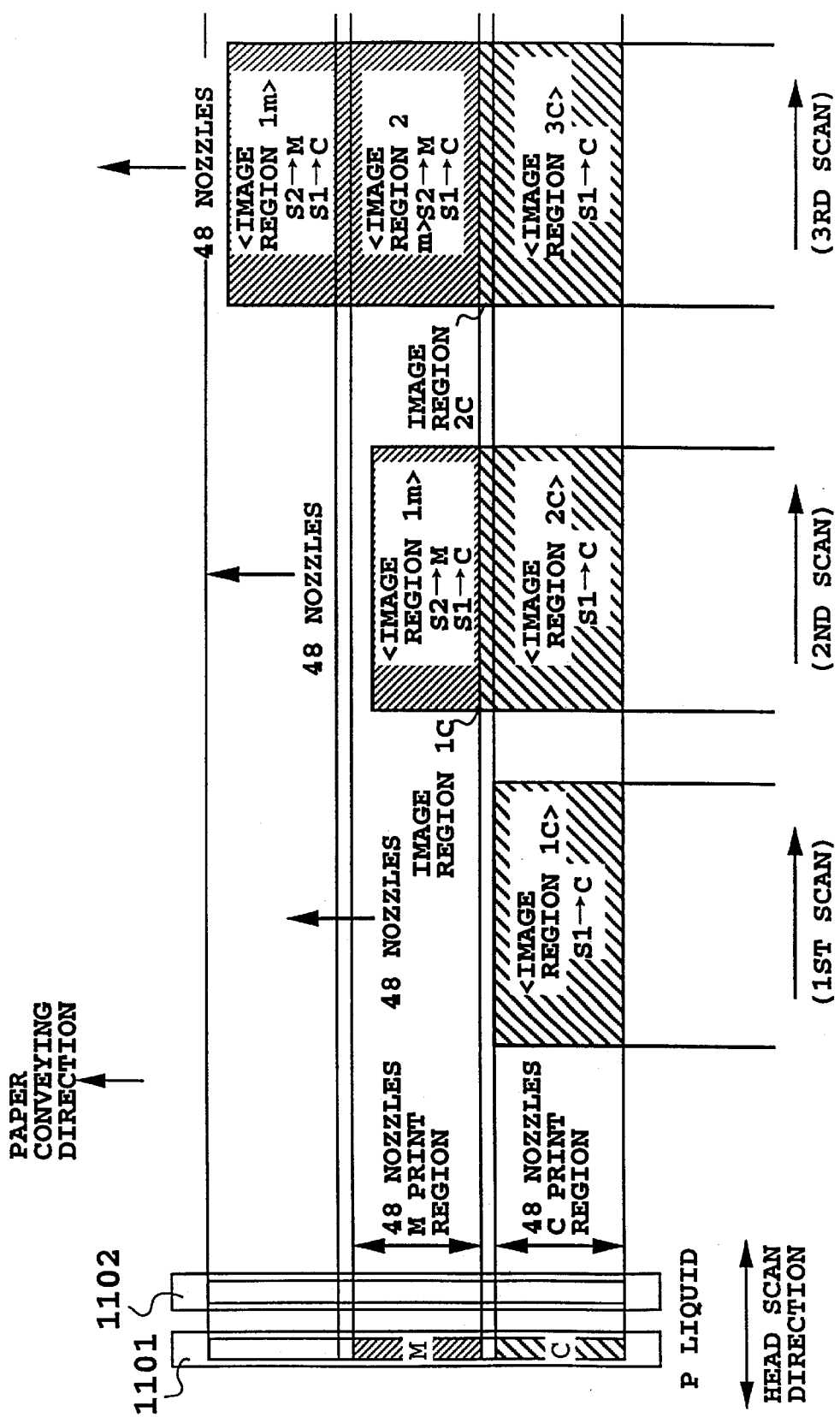
FIG. 13 is an explanatory illustration showing the fifth embodiment of a printing method according to the invention.
Figure 14:
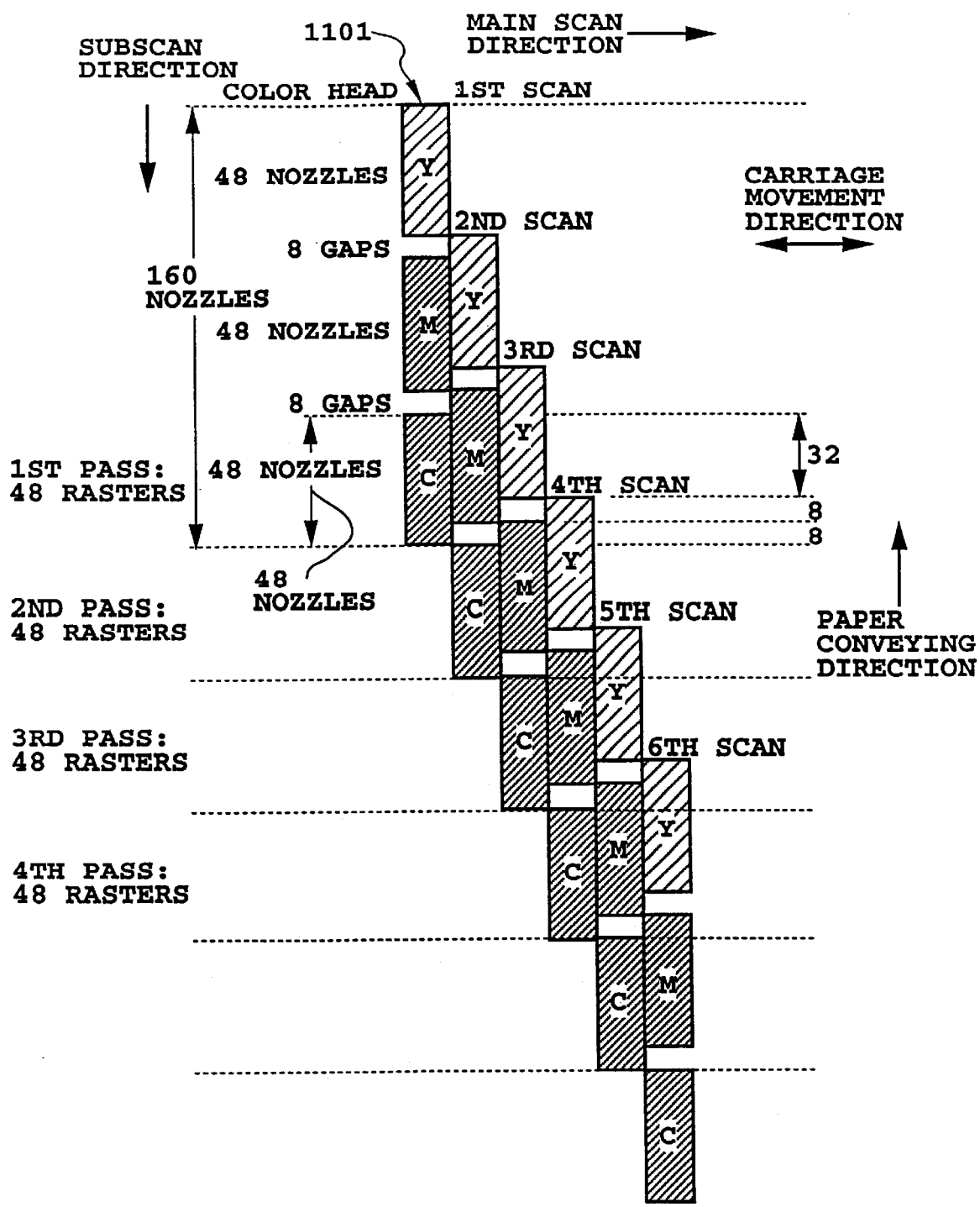
FIG. 14 is an explanatory illustration showing the fifth embodiment of a printing method according to the invention.

In FIG. 13, 1101 and 1102 are color printing head and the printing property improving liquid ejecting head, respectively. The color printing head 1101 is a C-M-Y color integrated chip, in which a cyan ink ejecting head, a magenta ink ejecting head and a yellow ink ejecting head are integrated as shown in FIG. 14. The printing property improving liquid is printed similarly to the pixel data of the color data to be printed in the same scanning cycle.

FIG. 13 shows a printing method according to the shown embodiment. For the purpose of disclosure, discussion will be given for printing of blue employing the C (cyan) and M (magenta) inks. At first scanning cycle, printing is performed in an image region 1c in the order of the printing property improving liquid and then C ink. Subsequently paper feed is performed for 48 nozzles to perform printing on a image region 2c in the order of the printing property improving liquid and then C ink. In conjunction therewith, for an image region 1m, printing is performed in the order of the printing property improving liquid and then the M ink. Thus, printing in blue color is thus completed in the image region 1m. The image regions 1c and 1m are offset for 8 nozzles as intercolor sealing width. Therefore, the image region 1m is set at a width of 40 nozzles. Subsequently, by feeding the paper for 48 nozzle width, printing is performed for the image region 3c in the order of the printing property improving liquid and then C ink. In conjunction therewith, printing is performed for an image region 2m in the order of the printing property improving liquid and then the M ink. The printing region of the M head in the third and subsequent scanning cycles is set at 48 nozzle width. By repeating such printing operation, an image is formed.

Next, effect of the shown embodiment will be discussed. In analogies from the conventional printing method, it is considered typical that the data of the printing property improving liquid is a data of logical sum of the C ink and the M ink and to perform printing in the order of the printing property improving liquid, then the C ink and then the M ink. However, in the shown embodiment of the printing method, immediately before ejecting the ink, the printing property improving liquid is always printed. Namely, printing is performed in the order of a printing property improving liquid 1, the then C ink, then a printing property improving liquid 2 and then the M ink. In the former conventional printing method, effect of the printing property improving liquid becomes insufficient in term of improvement of the color development and so forth, particularly for the M ink which is ejected later. This is considered to be caused by long time interval from hitting of the printing property improving liquid to hitting of the M ink to permit sufficient penetration of the printing property improving liquid penetrates into the printing medium during this period to cause reaction between the printing property improving liquid and the M ink at relatively deep position in the printing medium. In contrast to this, in the shown embodiment of the printing method as latter, printing of the printing property improving liquid 2 is performed immediately before printing of the M ink. By this, the hitting interval between the M ink and the printing property improving liquid becomes short so that the M ink may be ejected before the printing property improving liquid 2 penetrates into the printing medium sufficiently to cause reaction between the M ink and the printing property improving liquid in the vicinity of the surface of the printing medium. Thus, improvement of the color development can be attained.

In case of the C (cyan) ink and Y (yellow) ink, the hitting interval between the printing property improving liquid and the Y ink becomes long to make impossible to obtain the effect of the printing property improving liquid sufficiently. In contrast to this, in the shown embodiment of the printing method, sufficient effect of the printing property improving liquid can be obtained in any cases. Furthermore, in case of multi-pass printing for obtaining higher image quality, the hitting interval is inherently longer whereas the printing method according to the present invention may achieve satisfactory improvement by the printing property improving liquid.

Considering the case where the printing property improving liquid ejecting head and the heads for respective color inks are arranged in lateral alignment, in the conventional method not employing the printing property improving liquid, in order to avoid overflow of the ink by ejecting a large amount of ink for one pixel at one time, thinning mask is set so that a plurality of inks may be ejected for the same pixel at different scanning cycles. When this printing method is applied for the printing method to take the logical sum of the printing data for respective printing inks as printing data for the printing property improving liquid, hitting interval between hitting of the printing property improving liquid and hitting timing of the printing ink to be ejected in the later scanning cycle becomes large. Therefore, by employing the printing method according to the shown embodiment, sufficient effect of the printing property improving liquid can be obtained with satisfactorily avoiding overflow of the ink.

On the other hand, with respect to the shown embodiment of the printing method, when bidirectional printing is performed for higher printing speed, disturbance of uniformity due to difference of order of ejection of the inks and the printing property improving liquid can be prevented by employing the printing system set forth with respect to the first embodiment.

(Sixth Embodiment)

The sixth embodiment of the present invention will be discussed hereinafter.

Figure 15:
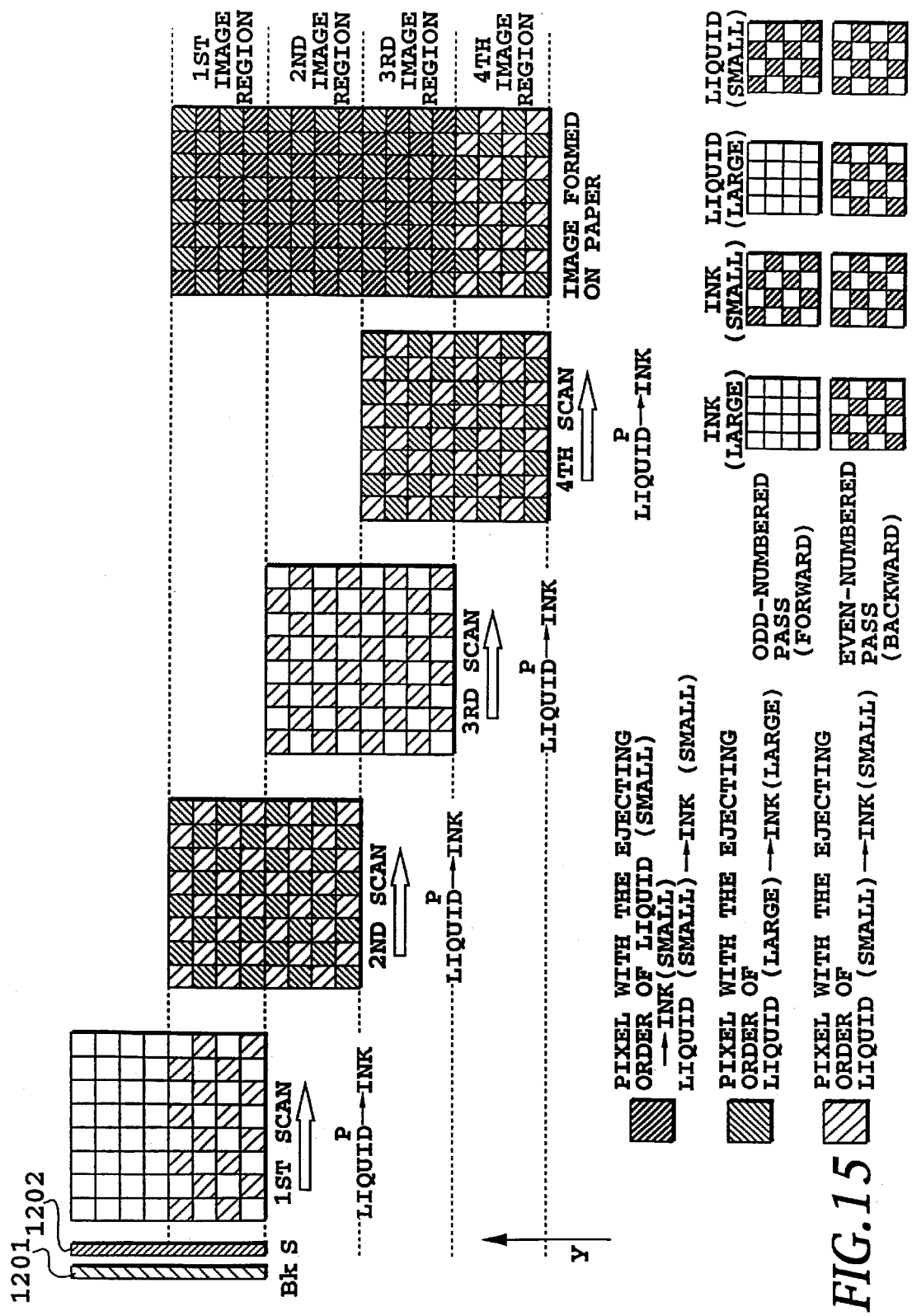
FIG. 15 is an explanatory illustration showing the sixth embodiment of a printing method according to the invention.
Figure 16A:
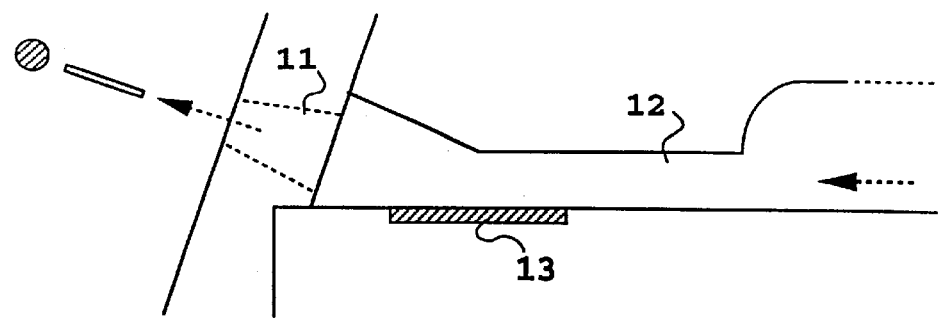
Figure 16B:
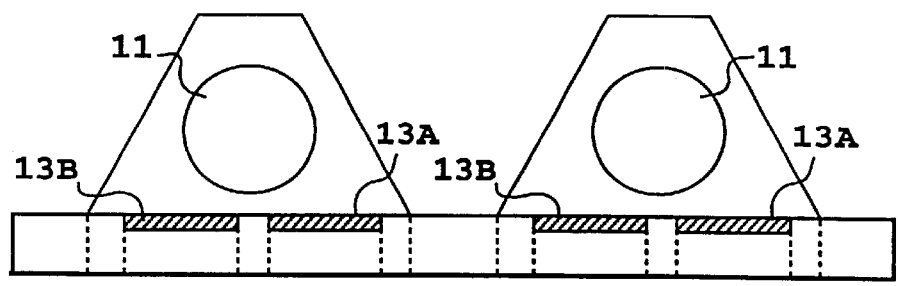
Figure 16C:
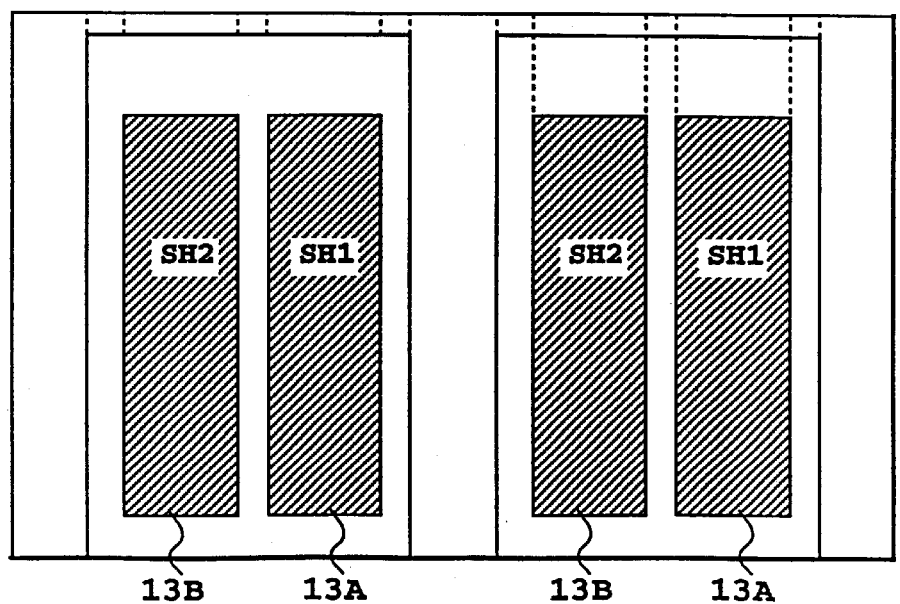

The shown embodiment of the printing method will be discussed with reference to FIGS. 15, 16A, 16B and 16C. In FIG. 15, 1201 and 1202 respectively denotes monochrome (Bk) head and the printing property improving liquid ejecting head. While the Bk ink is employed as monochrome printing ink, the present invention should not be limited to this. These heads are designed to eject different ejection amounts of droplets through one nozzle. Namely, as shown in FIGS. 16A, 16B and 16C, within a liquid pass 12 communicated with one nozzle 11, two heaters 13A and 13B are arranged in parallel. Respective heaters 13A and 13B are driven independently of each other. By both heaters, normal ejection amounts may be obtained. On the other hand, by one of the heaters, an ejection amount approximately half of the normal ejection amount can be obtained. The ejection amount of the Bk head is Vdk1=80 pl, Vdk2=40 pl, and ejection amount of the printing property improving liquid head is Vds1=40 pl, Vds2=20 pl.

In the method shown in FIG. 15, by the first scanning cycle, Vds2 of the printing property improving liquid and Vdk2 of Bk ink are printed in checkered pattern in the order of printing property improving liquid and then the Bk ink. Then, with feeding paper for L/2 width and idling scan in the reverse direction, the heads are returned to the home positions. Subsequently, printing in the second scanning cycle is performed. At this time, for the pixels in the checkered pattern, printing is performed with ejection amounts Vds2 and Vdk2 in the order of the printing property improving liquid and then the Bk ink similarly to the first scanning cycle. On the other hand, for the pixels of reversed checkered pattern, printing is performed with the ejection amounts of Vds1 and Vdk1 in the order of the printing property improving liquid and then the Bk ink. Therefore, in the first image region, the pixels in the checkered pattern are printed in the order of the printing property improving liquid, then the Bk ink, then the printing property improving liquid and then the Bk ink, on the other hand, the pixels in the reversed checkered pattern are printed in the order of the printing property improving liquid and then the Bk ink to complete printing. At this time, the total ejection amounts of each of the Bk ink and the printing property improving liquid are the same in all of the pixels. Subsequently, by feeding the paper for L/2 width and idling scan of the heads, printing of the printing property improving liquid (Vds2) and the Bk ink (Vdk2) is preformed. By this, printing for the second image region is completed. Similarly to the first image region, the second image region is printed in the manner that the pixels in the checkered pattern are printed in the order of the printing property improving liquid, then the Bk ink, then the printing property improving liquid and then the Bk ink, and the pixels in the reversed checkered pattern are printed in order of the printing property improving liquid and then the Bk ink to complete printing. By repeating this, image can be formed.

Namely, in the odd number of scanning cycles, the pixels on the checkered pattern are printed in the order of the printing property improving liquid (Vds2) and then the Bk ink (Vdk2), subsequently, after feeding the printing medium for L/2, in the even number scanning cycles, the pixels on the checkered pattern are printed in the order of the printing property improving liquid (Vds2) and then the Bk ink (Vdk2) and, in conjunction therewith, the pixels on the reversed checkered pattern complementary to the checkered pattern are printed in the order of printing property improving liquid (Vds1) and the Bk ink (Vdk1). Therefore, the pixels printed in the order of the printing property improving liquid, then the Bk ink, then the printing property improving liquid and then the Bk ink are arranged in the checkered pattern, and the pixels printed in the order of the printing property improving liquid and then the Bk ink are arranged in the complementary reversed checkered pattern.

Next, effect of the shown embodiment will be discussed, In the divided printing method, such as ejection in the order of the printing property improving property improving liquid and then the printing ink as set forth in the foregoing fourth embodiment, or ejection in the order of the printing ink, then the printing property improving liquid and then the printing ink, reaction area between the printing property improving liquid and the ink is large for sufficient effect of the printing property improving liquid can be expected. However, if such manner of printing is performed with respect to overall image, the heads are required about twice higher durability. Therefore, in the shown embodiment of the printing system, printing is performed for half of the overall pixels with printing duty (Duty) half of the normal printing duty with ejecting the ink and the printing property improving liquid in the order of the ink, then printing property improving liquid and then the ink, and the remaining half or the pixels are printed with a full printing duty by ejecting the ink and the printing property improving liquid in the order of the printing property improving liquid and then the ink. By thus, with maintaining the effect of the printing property improving liquid as that attained in divided printing in relatively high level, duration of the head can be expanded. As a method for admixing, similarly to the first embodiment, by placing the pixels of the different nature in admixing manner in micro view, the image having high uniformity in the macro view can be obtained.

In the shown embodiment, as an example of divided printing, printing by ejecting ink and the printing property improving liquid in the order of the printing property improving liquid, then the ink, then the printing property improving liquid and then the ink has been discussed. However, the present invention is not limited to the shown manner of dividing printing, and ejection can be done in the order of the printing ink, then the printing property improving liquid and then the printing ink.

(Seventh Embodiment)

In the foregoing embodiments, an example the checkered and complementary reversed checkered patterns of mask patterns are employed or an example where the unit region of 4×4 pixels are arranged in checkered and reversed checkered fashion, are discussed hereabove, other manner will be discussed with the shown embodiment.

Figure 17:
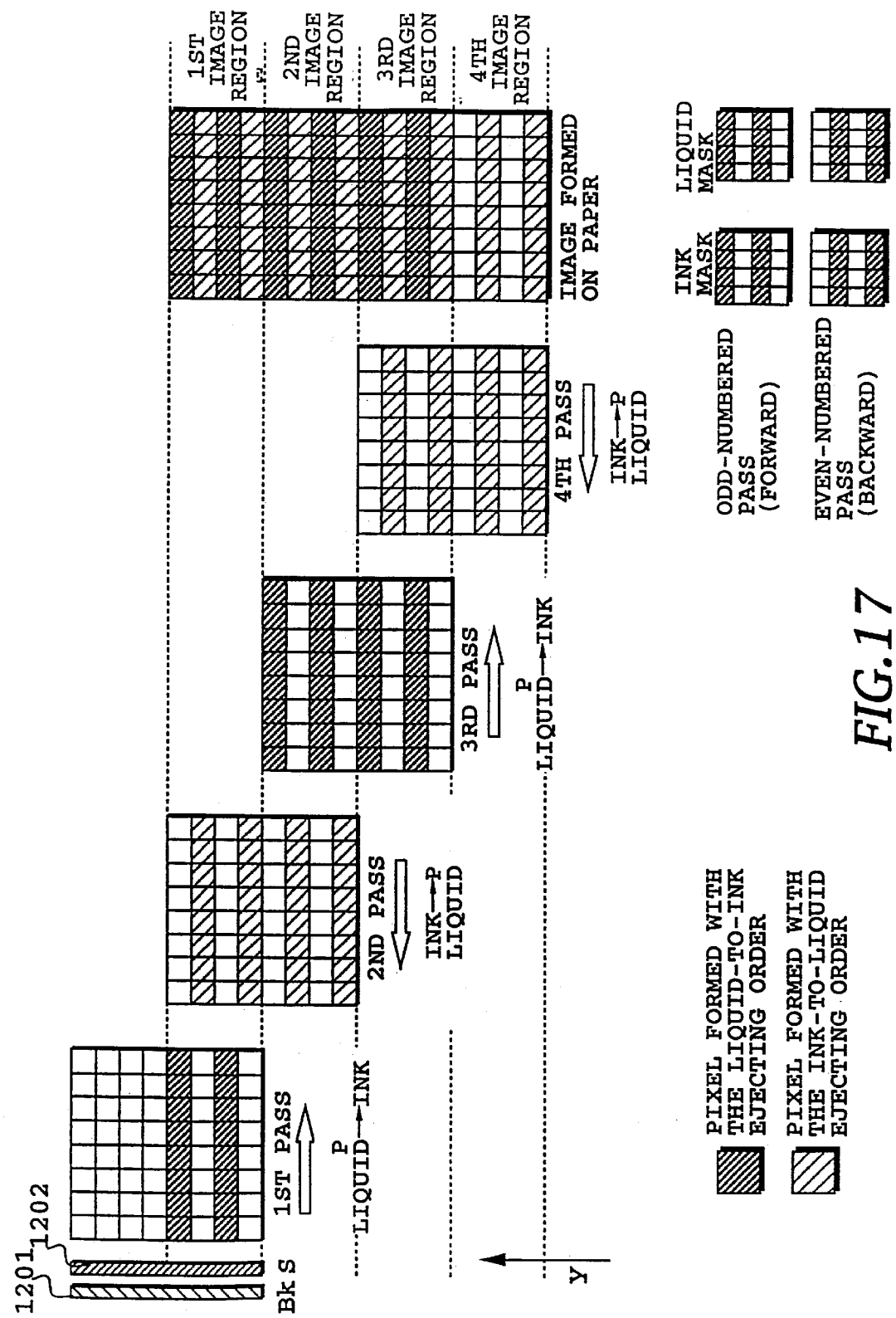
FIG. 17 is an explanatory illustration showing the seventh embodiment of a printing method according to the invention.

FIG. 17 shows a case where the printing property improving liquid and the ink are ejected in the order of the printing property improving liquid and then ink and in the order of the ink and then the printing property improving liquid. In this example, printing is performed in the density of 360 dpi in overall printing width in the main scanning direction of the head. In the shown embodiment, the region of the one pixel width printed by ejecting the printing property improving liquid and the ink in the order of the printing property improving liquid and then the ink and the region of the one pixel printed in the order of the ink and then the printing property improving liquid, are arranged in an alternating manner. Even with repetition of a constant width of bands, and if the width of the band is not significantly large, the image with the uniformity in macro view can be formed.

Figure 18:
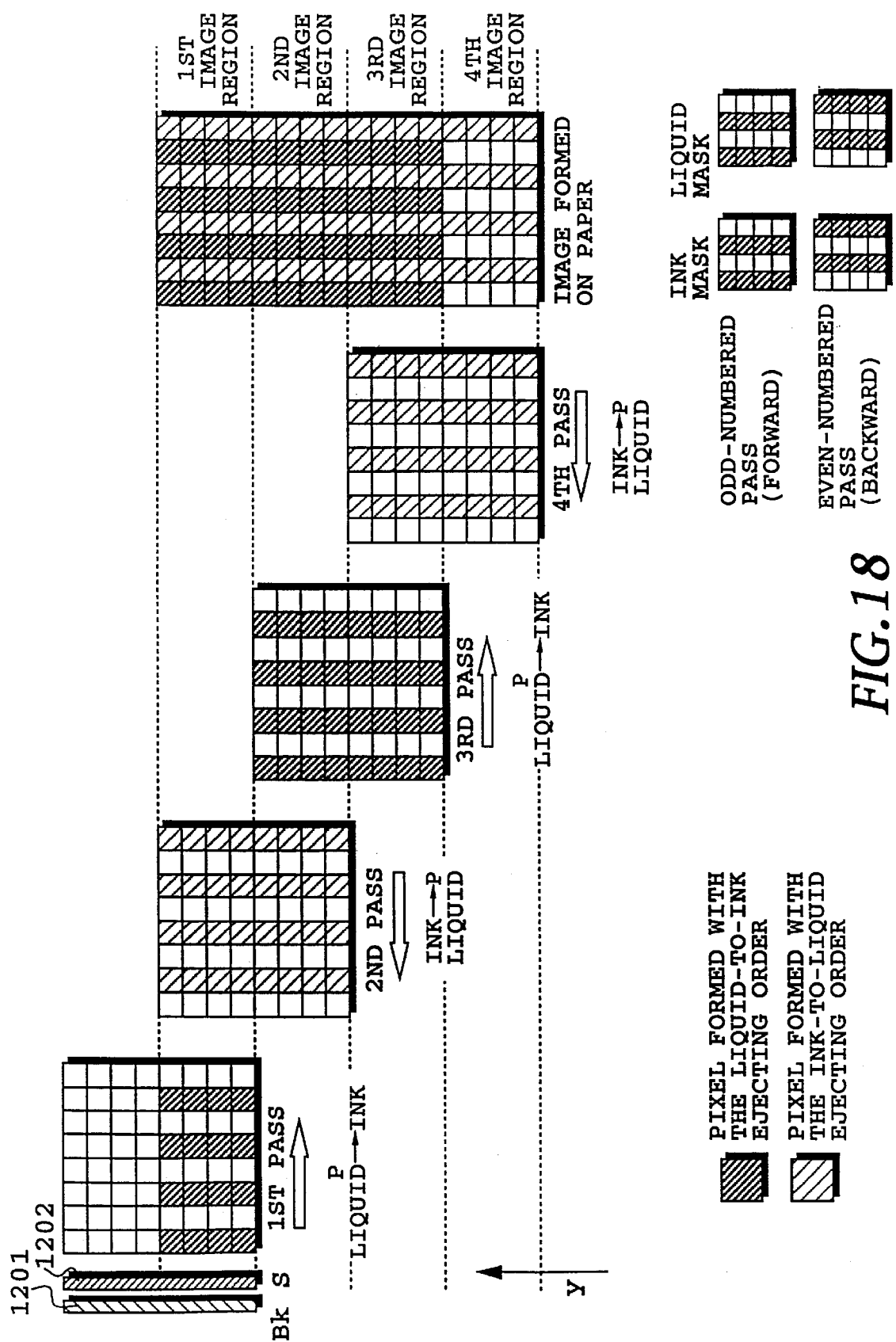
FIG. 18 is an explanatory illustration showing the seventh embodiment of a printing method according to the invention, and is a diagrammatic section showing the internal structure of the ejecting portion.

In FIG. 18, an example where the pixels of different natures are arranged alternately in the main scanning direction of the head. Even in this case, similar effect can be attained. In the shown embodiment, when the width of the band is expanded at 360 dpi, the band fluctuation was not perceptible up to the band width corresponding to five pixels. When greater band width (360 dpi, six pixel width and about 420 $\mu$m width), the band fluctuation becomes significant to lower the uniformity of the image and becomes significant to cause degradation of the printed image. Namely, with respect to the main scanning direction and the auxiliary scanning direction, different quality of pixels may be admixed so as not to arrange the same quality images continuously in the width greater than or equal to certain width (about 430 $\mu$m), the image with high uniformity can be obtained without causing degradation of the image quality.

While the printing in the order of the ink and then the printing property improving liquid is shown in the shown embodiment, similar effect can be obtained even when different quality of pixels are admixed in the manner of the second, third and sixth embodiments.

On the other hand, in the first to sixth embodiments, there are illustrated the case where the printing ink and the printing property improving liquid are hit on the same pixel. However, even in the case where the hitting position of the printing property improving liquid is intentionally shifted from the hitting position of the pixel to be printed, and when the hitting positions of the printing property improving liquid and the printing ink are substantially adjacent, including the case where the printing ink and the printing property improving liquid are located away from each other and the ink and the printing property improving liquid become adjacent after penetration in the printing medium, sufficient effect can be obtained in the above-mentioned embodiment.

(Eighth Embodiment)

In the above-mentioned embodiment, ratio of ejection amounts of the printing property improving liquid and the ink to the printing medium will be discussed.

Figures 1A, 1B:
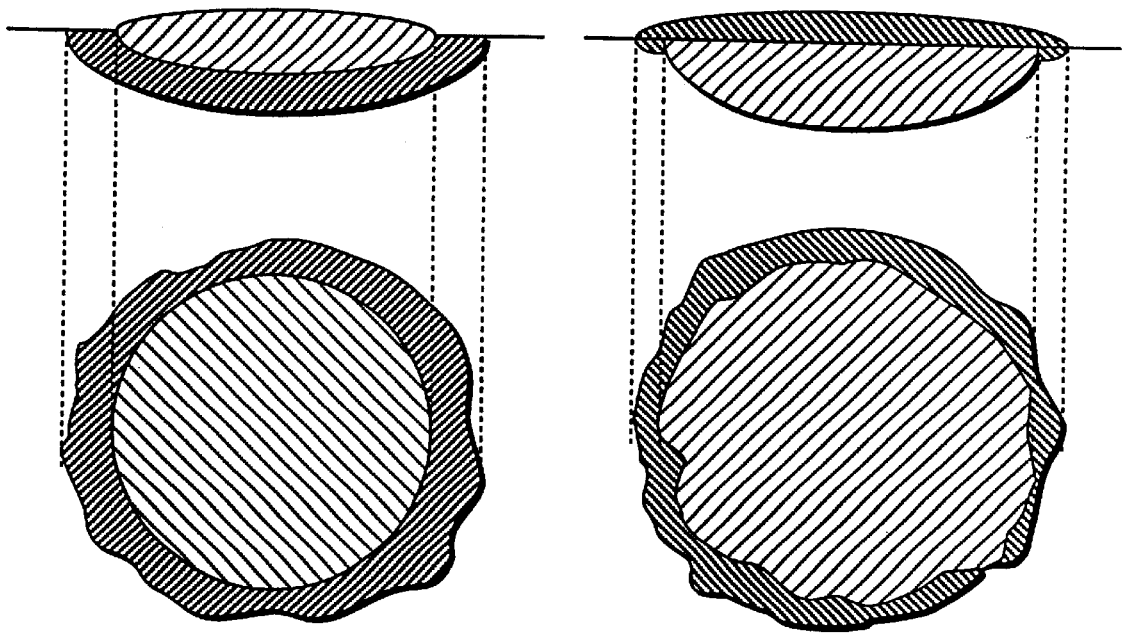
FIGS. 1A and 1B are explanatory illustrations showing the task to be solved by the present invention.
Figures 2A, 2B, 2C:
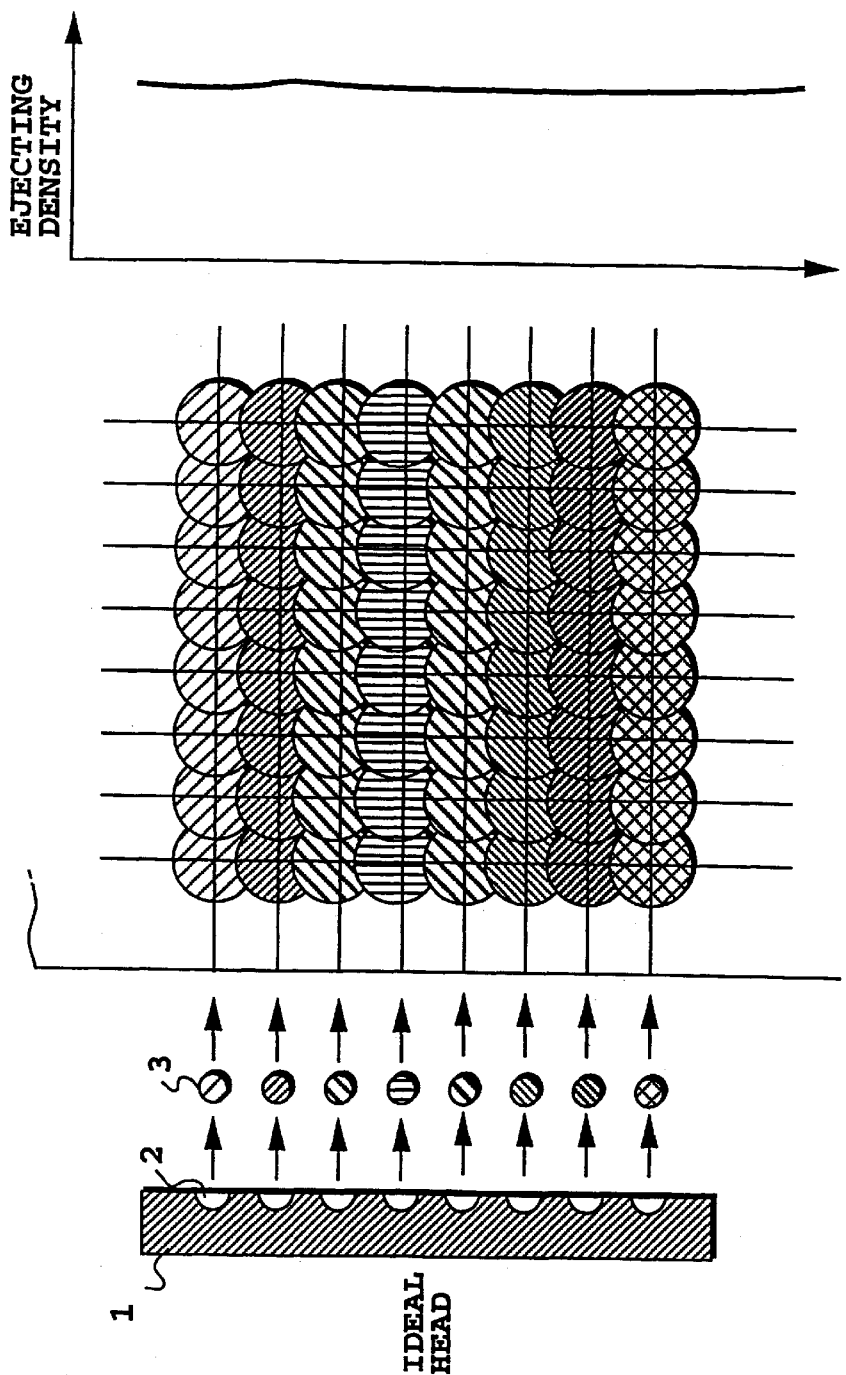
FIGS. 2A to 2C are explanatory illustrations showing the task to be solved by the present invention.

In the printing method illustrated in the first embodiment of FIGS. 1 and 2, the ink and the printing property improving liquid are ejected for the same times for respective pixels. Through experiments of the inventors, by the ratio of the ejection amount to the printing medium, the effect of the printing property improving liquid becomes different. However, in view of the water resistance and fluctuation line, the ratio of ejection amount, about (ink ejection amount):(printing property improving liquid)=1:0.1 to 1 may be appropriate.

The inventors have performed experiments to perform printing with the printing ink (mounting type BK) by the head having ejection amount 80 ng at grid points of 360 dpi, and to vary the ejection amount of the printing property improving liquid within a range of about 5 to 100 ng. When this ratio exceeds 1:0.1, water-resistance is lost. Also, when the ratio exceeds 1:1, in which the ejection amount of the printing property improving liquid exceeds the ejection amount of the ink, line may become perceptible in certain kind of ink. In addition, in consideration of fluctuation of the ejection amount in the tolerance of the printing head and variation of the use environment (ink ejection amount):(printing property improving liquid)=1:0.25 to 0.75

Here, while the example in the first embodiment is discussed, even in the second, third, fourth and fifth embodiments, substantially the same effect can be obtained as long as the ration of the total ejection amount of the ink and the total ejection amount of the printing property improving liquid is within the foregoing value. Namely, the effect of the present invention is obtained not with the ratio of the ejection amount in the microbic region but with the ratio of the macrotically equalized ejection amount.

(Supplementary for Embodiment)

One embodiment of an ink-jet printing apparatus for implementing the foregoing first to eighth embodiments of the printing method according to the present invention will be discussed.

Figure 19:
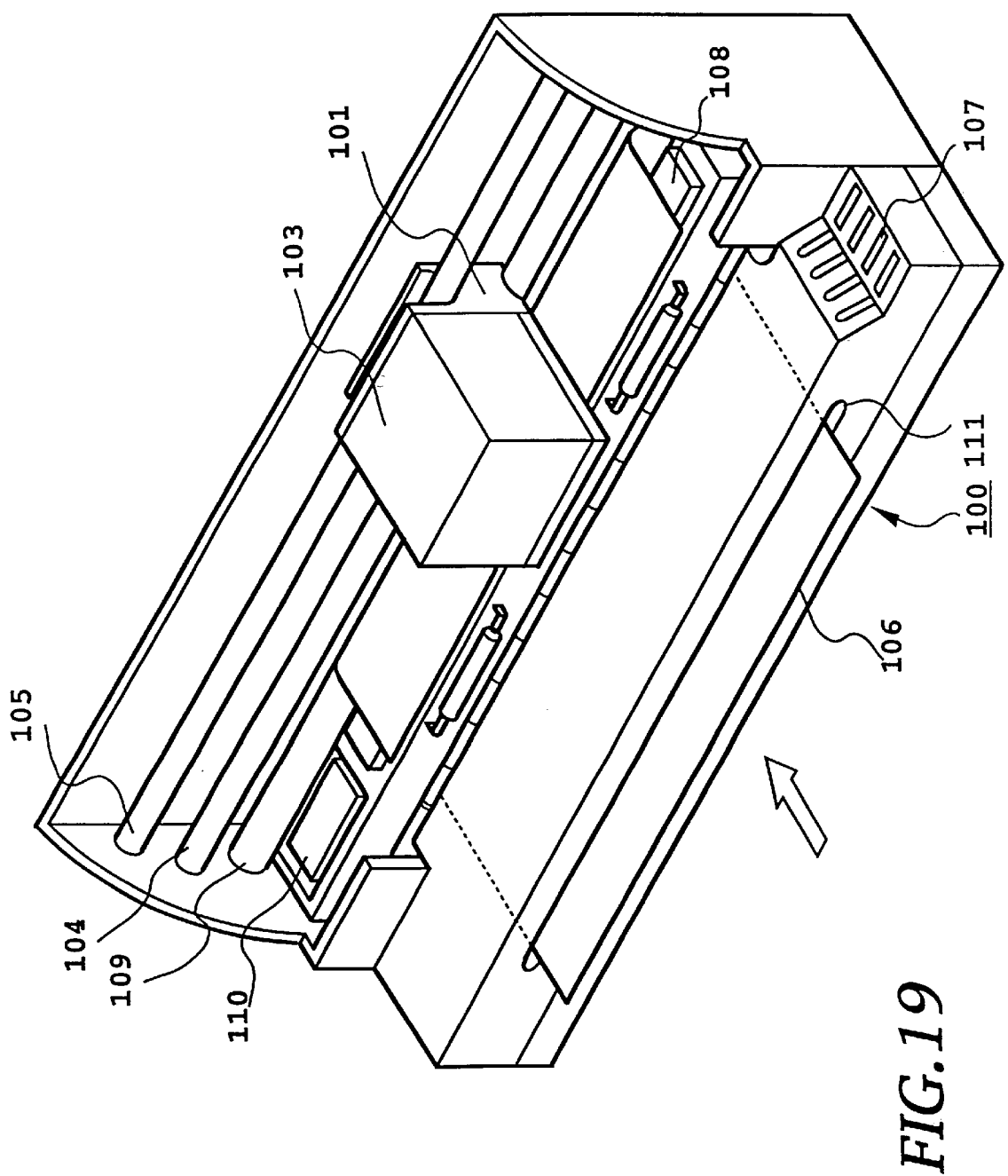
FIG. 19 is a perspective view of an ink-jet printing apparatus for implementing the printing method according to the invention.

FIG. 19 is a perspective view showing general construction of the one embodiment of the ink-jet printing apparatus.

In an ink-jet printing apparatus 100, a carriage 101 slidably engages with two guide shafts 104 and 105 extending in parallel to each other. By this, the carriage 101 can be driven to shift along the guide shafts 104 and 105 by a drive motor and a driving force transmission mechanism (both are not shown) for transmitting the driving force of the drive motor. On the carriage 101, an ink-jet unit 103 having an ink-jet head and an ink tank as an ink container for storing an ink to be used in the head, is mounted.

The ink-jet unit 103 comprises a plurality of heads for ejecting the ink or a printing property improving liquid for improving water resistance or printing ability, and tanks as a container for storing an ink or the printing property improving liquid to be supplied to the heads. Namely, five heads in total for respectively ejecting black (Bk), magenta (M) and yellow (Y) and cyan (C) of four colors of inks, and, in addition for ejecting the above-mentioned printing property improving liquid, and the tanks corresponding to respective heads are mounted on the carriage 101 as the ink-jet unit 103. Each head and the corresponding tank are mutually detachable from each other so that when the ink or the printing property improving liquid in the tank is spent out or so forth, only the emptied tank can be exchanged independently, as required. Also, it is of course possible to exchange only head as required. It should be noted that construction for attaching and detaching of the head and the tank is not specified to the shown example, and the head and tank may also be formed integrally.

A paper 106 as a printing medium is inserted through an insertion opening 111 provided at the front end portion of the apparatus, which is finally reversed in a feeding direction and fed to the lower portion of the motion range of the carriage 101 by a feed roller 109. By this, from the heads mounted on the carriage 101, inks are ejected on the paper 106 supported on a platen 108 associating with motion of the head to perform printing in a printing region.

As set forth above, by alternately repeating printing in a width corresponding to the width of ejection opening arrangement of the head and feeding of the paper 106, printing is performed on overall paper 106. The paper 106 is then discharged front side of the apparatus.

In a region at left side end of the motion stroke of the carriage 101, a recovery unit 110 which can be opposed to a respective head of the carriage 101 from the lower side, is provided. By this, an operation for capping respective ejection openings of the ejection heads in a non-printing state and sucking ink from ejection openings of respective heads can be performed. Also, the predetermined position at the left side end is set as a home position of the head.

On the other hand, at the right side end of the apparatus, an operating portion 107 having switches and display elements are provided. The switches are used for turning ON and OFF of a power source of the apparatus and setting of various printing modes, and so forth. The display elements serve for displaying various conditions.

Figure 20:
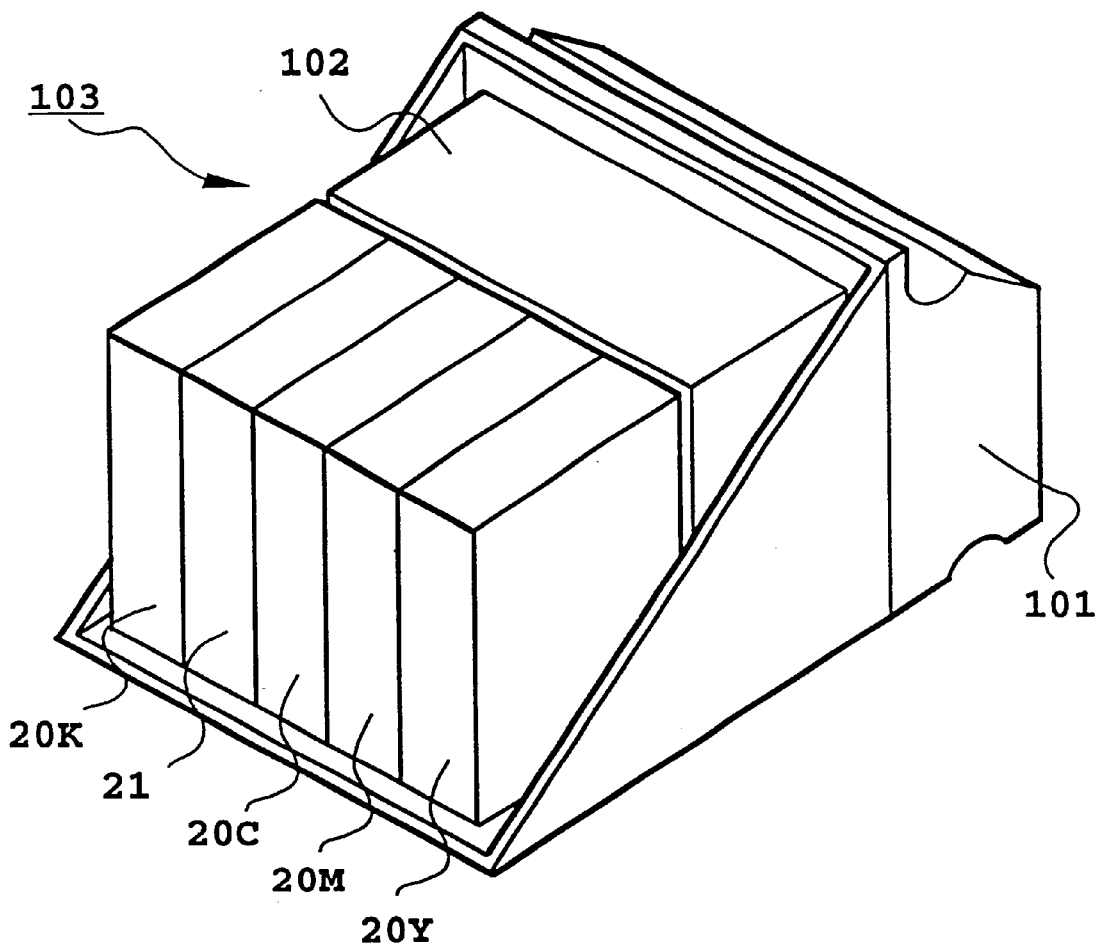
FIG. 20 is a perspective view showing an ink-jet cartridge to be loaded in the ink-jet printing apparatus of FIG. 19.

FIG. 20 is a general perspective view showing the ink-jet unit 103 explained with respect to FIG. 19. In the shown construction, respective tanks of black (Bk), magenta (M), yellow (Y) and cyan (C) color inks and the printing property improving liquid can be exchanged independently.

Namely, in order to detachably load each head independently, a head casing 102 and Bk ink tank 20K, C ink tank 20C, M ink tank 20M and Y ink tank 20YA and a printing property improving liquid tank 21 are mounted on the carriage 101. Respective tanks are connected to heads via connecting portions and supply inks.

It should be noted that, other than the foregoing example, the tanks of the printing property improving liquid and the Bk ink may be an integral construction. On the other hand, the tank of C, M and Y may be integral construction.

Figure 21:
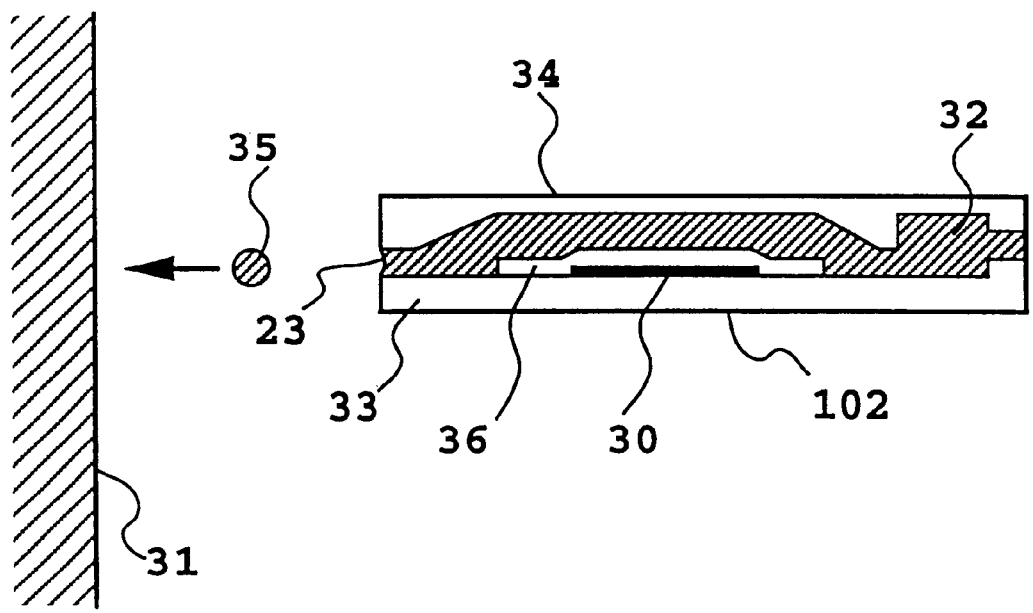
FIG. 21 is an enlarged section near a heater body of a printing head to be loaded in the ink-jet printing apparatus shown in FIG. 19.

FIG. 21 is an enlarged section in the vicinity of the heater of the printing head. The ink-jet printing apparatus in the shown embodiment employs a printing system, in which a heater constituted of an electrothermal transducer is arranged corresponding to each ink ejection opening and applying a drive signal corresponding to a printing information to eject ink droplet through the ejection opening.

Here, the heater is constructed to be heated independently of all other nozzles. In further concrete, the ink in the nozzle abruptly heated by heating of the heater 30 forms a bubble by film boiling. By the pressure in generation of the bubble, the ink droplet 35 is ejected toward the printing medium 31, the character and image are formed on the printing medium. At this time, the volume of the ink droplet of a respective ejected color is 15 to 80 ng.

For each ejection opening, ink passage 34 communicated with the ejection opening 23 is provided. At the back side of the portion where the ink passage 34 is provided, a common liquid chamber 32 is provided for supplying the ink to the ink passage 34. In the ink passages respectively corresponding to the ejection openings 23, the electrothermal transducers as heaters 30 for generating thermal energy to be used for ejection of the ink droplet 35 through the ejection openings 23, and electrode wiring for supplying power to the heater are provided. These heater 30 and the electrode wiring are formed on a substrate 33 formed of silicon and so forth, by a film formation technology. On the heater 30, a protective layer 36 is formed for avoiding direct contact between the ink and the heater. Furthermore, by stacking the partitioning wall 34 by resin or glass material on the substrate 33, ejection openings 23, the ink passage 34 and the common liquid chamber 32 and so forth are constructed.

Such printing system employing the heater 30 constituted of the electro-thermal transducer is called as bubble-jet printing system since bubble formed by application of the thermal energy is used upon ejection of the ink droplet.

Figure 22:
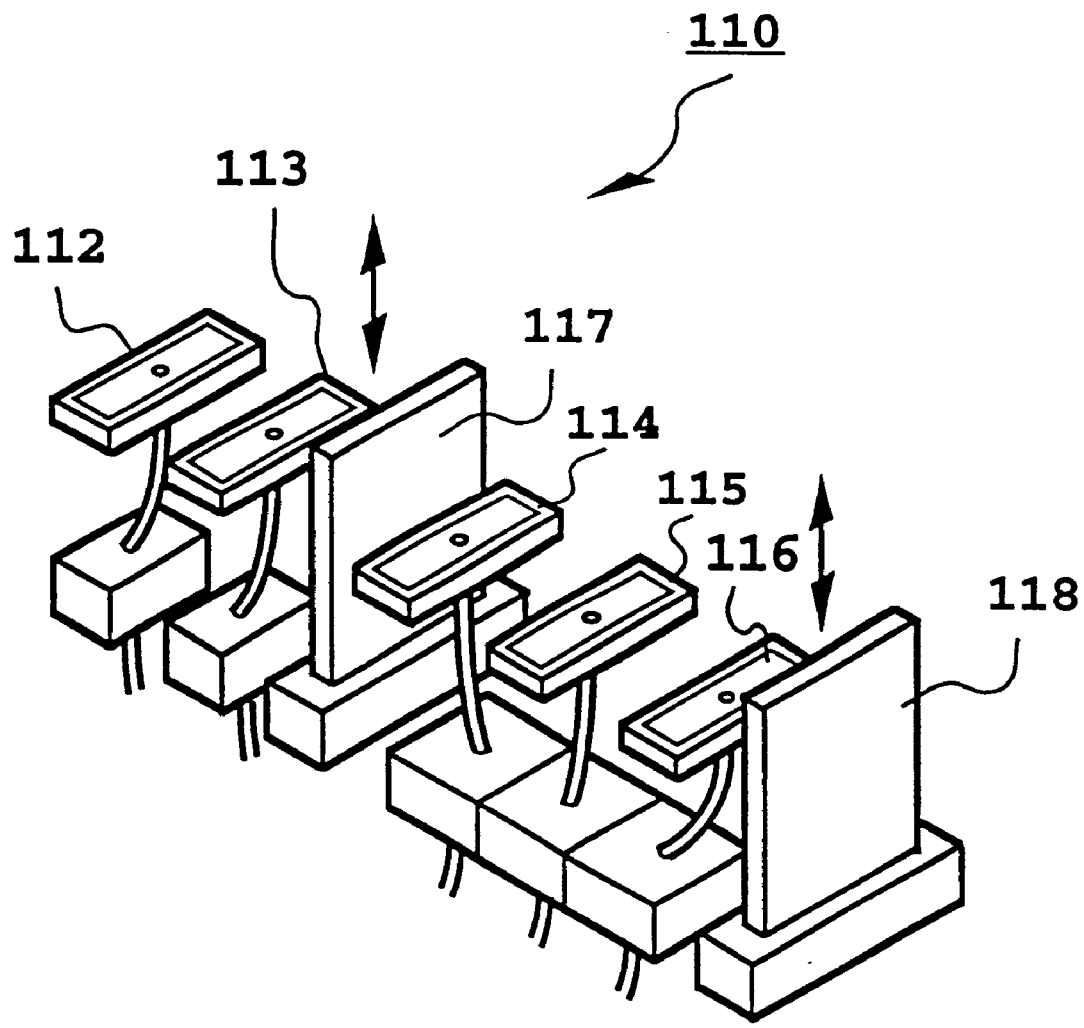
FIG. 22 is a perspective view of a recovery unit in the ink-jet printing apparatus of FIG. 19.

FIG. 22 is a perspective view showing concrete construction of recovery unit 110 shown in FIG. 19. Corresponding to printing heads, a cap 112 for Bk ink, a cap 114 for C ink, a cap 115 for M ink, and a cap 116 for Y cap and a cap 113 for the printing property improving liquid are provided. Each of the caps 113 to 116 are constructed for movement in vertical direction. When the printing heads are positioned at the home position, the caps 112 to 116 contact with the printing head portions for capping to prevent ejection failure caused by increasing of viscosity or plugging of the inks due to evaporation of inks within the ejection openings of the printing heads.

The caps 112 to 116 of the recovery unit 110 are communicated with pump units 119. The pump units 119 are used for generating vacuum upon sucking recovery process for sucking ink from the ejection openings of the printing head by contacting the capping unit and the printing head. The pump units 119 include one provided exclusively for the printing property improving liquid and those provided for respective heads of respective colors of inks independently. Waste liquids are fed to a waste tank through respectively independent pass. This is to avoid occurrence of reaction between the printing color inks and the printing property improving liquid in the pump to make the coloring agents in the inks insoluble. In the alternative, the pump unit may be one for the printing property improving liquid and the other for the printing color inks in common.

In the recovery unit, a printing property improving liquid wiping blade 117 for wiping the ejection opening portion of the printing property improving liquid head and a color ink wiping blade 118 for wiping the ejection opening portions of the printing ink ejecting heads are provided.

These wiping blades 117 and 118 are blades formed of elastic material, such as rubber, for wiping off the ink or the printing property improving liquid depositing on the ejection opening forming surfaces of the printing heads. The blades are constructed to be movable between a lifted up position for wiping the printing head surface and a lowered position not to interfere with the printing head surface by a lifting device.

In order to avoid mixing of the printing ink and the printing property improving liquid in the vicinity of the ejection opening forming surfaces of the printing heads, the printing property improving liquid wiping blade 117 for wiping the printing property improving liquid and the color ink wiping blade 118 for wiping the color inks are provided independently of each other and are designed for independent movement in the vertical direction relative to the other.

Figure 23:
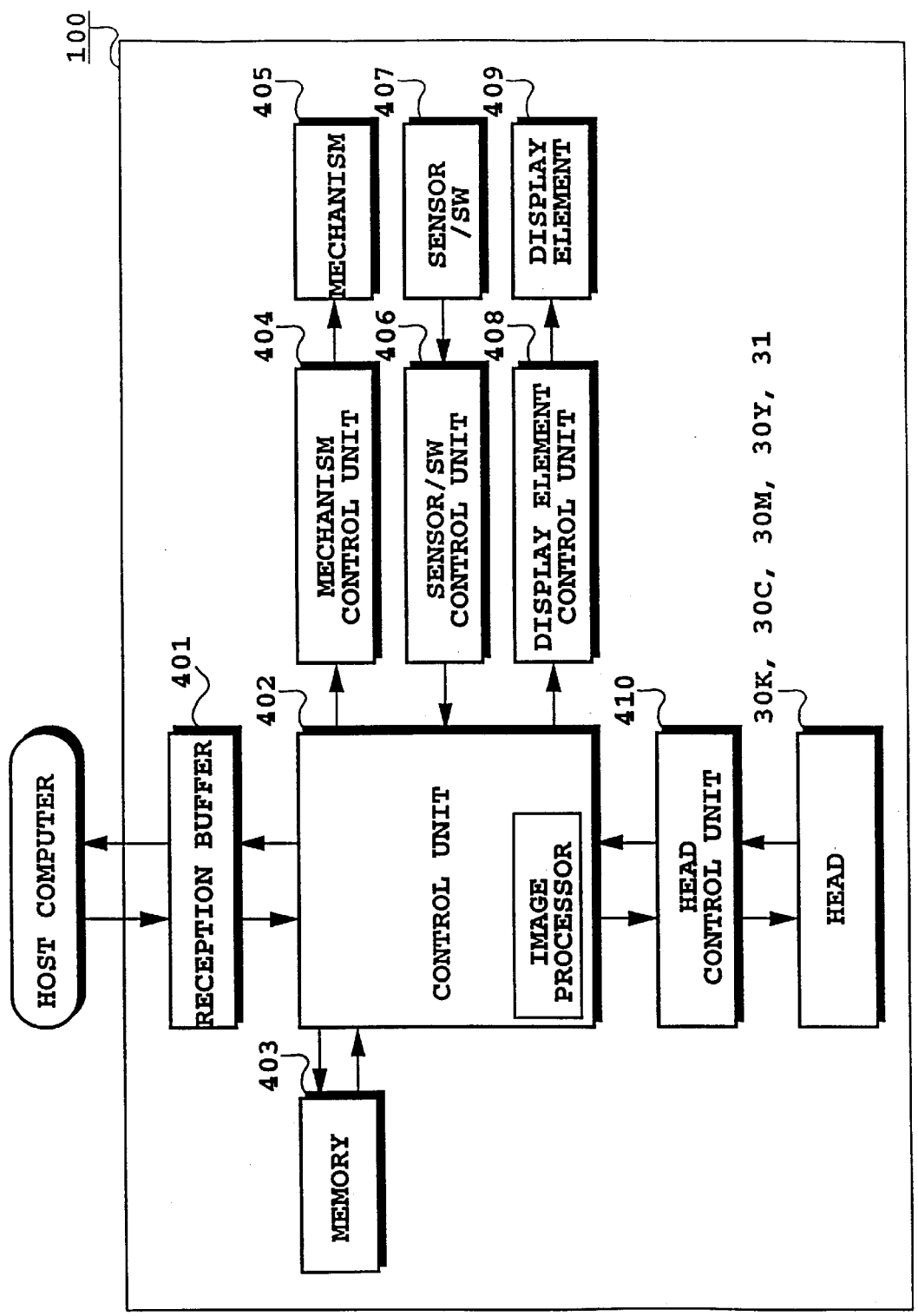
FIG. 23 is a block diagram showing a construction of a control system of the ink-jet printing apparatus of FIG. 19.

FIG. 23 is a block diagram showing a construction of the control system for the shown embodiment of the ink-jet printing apparatus. From a host computer, data of character or image to be printed (hereinafter referred to as image data) is input to a reception buffer 401 of the printing apparatus 100. On the other hand, data verifying if correct data is transmitted or data notifying operating condition of the printing apparatus is transferred from the printing apparatus to the host computer. The data input to the reception buffer 401 is transferred to a memory portion 403 in a form of RAM and temporarily stored therein under control of the control portion 402 having CPU. A mechanism control portion 404 drives a mechanical portion 405, such as a carriage motor or a line feed motor and so forth as a driving power source for the carriage 101 or the feed roller 109 (both seen from FIG. 1), under a command of the control portion 402. A sensor/SW control portion 406 feeds a signal from a sensor/SW portion 407 constituted of various sensors and Sws (switches), to the control portion 402. A display element control portion 408 controls display of a display element portion 409 constituted of LEDs or printing property improving liquid crystal display elements of display panel group. The head control portion 410 independently controls driving of respective heads 30K, 30C, 30M and 30Y according to a command from the control portion 402. On the other hand, the head control portion 410 also reads temperature information or so forth indicative of the conditions of respective heads and transfers to the control portion 402. In the control portion 402, an image processing portion which performs image processing is constructed.

(Ninth Embodiment)

Figure 24:
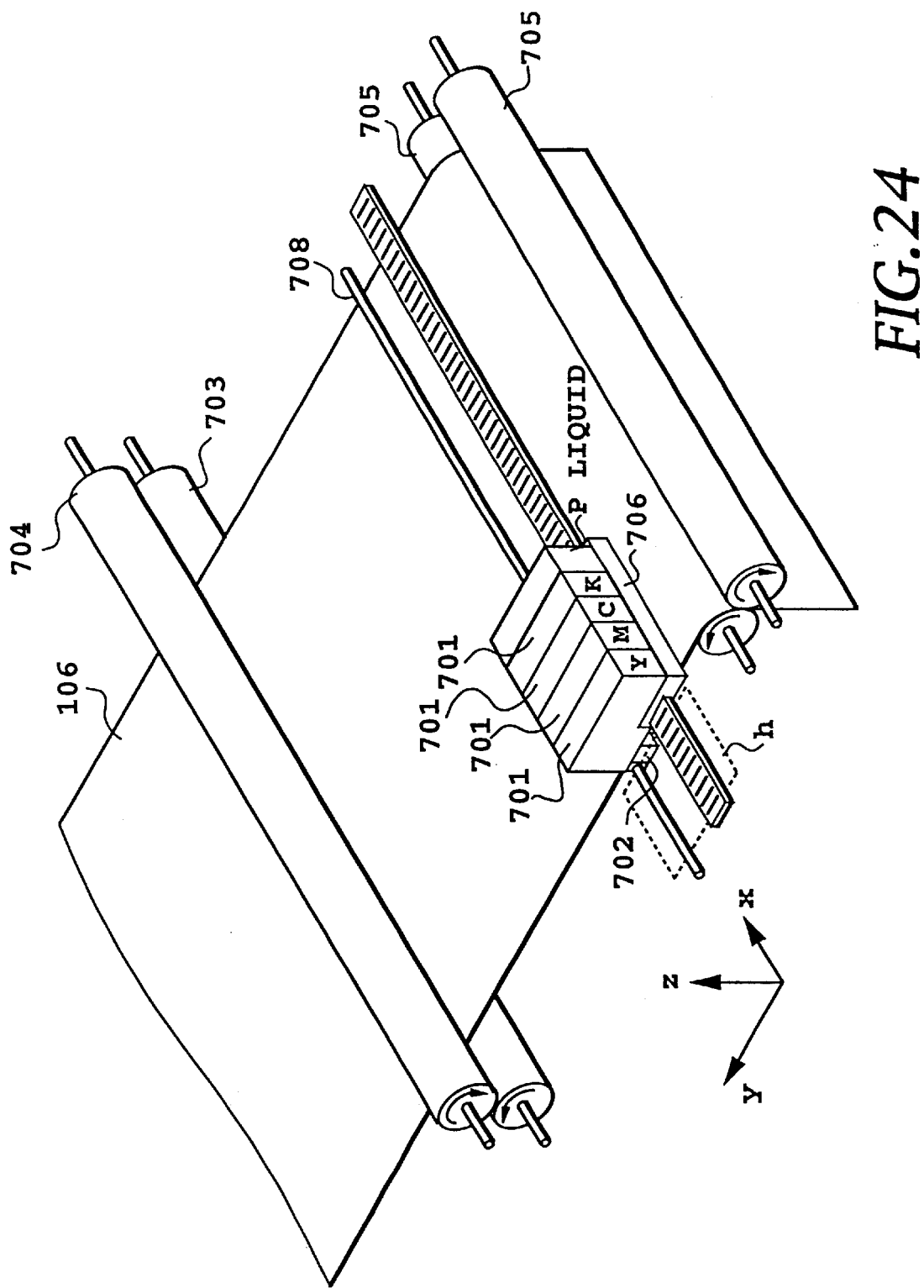
FIG. 24 is a perspective view showing general construction of the ink-jet printing apparatus which implements the ninth embodiment of the ink-jet printing method according to the invention.
Figure 25:
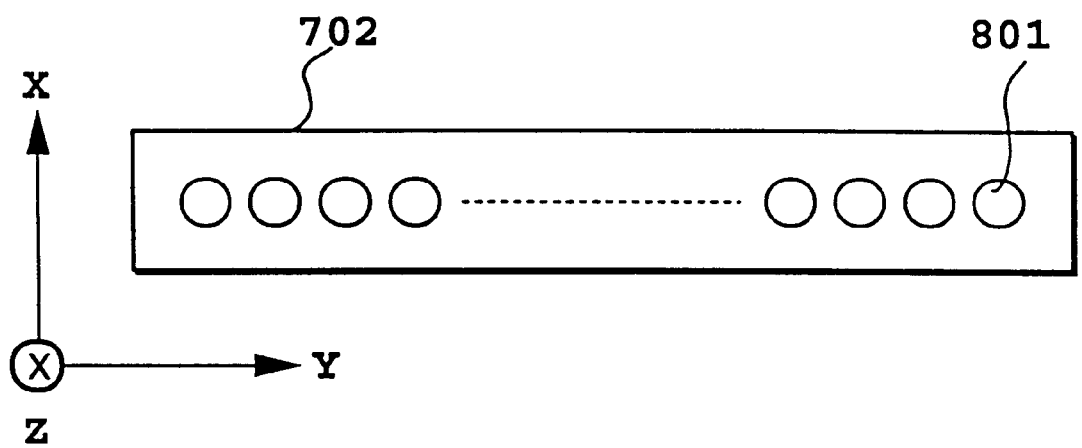
FIG. 25 is a partial illustration showing a printing head employing the ink-jet printing apparatus of FIG. 24.

FIG. 24 is a perspective view showing a general construction of a printing apparatus for implementing the ninth embodiment of the ink-jet printing method according to the present invention. In FIG. 24, 701 denotes an ink cartridges. These cartridges 701 are constituted of tanks, in which four color inks of black (K), cyan (C), magenta (M) and yellow (Y) inks and the printing property improving liquid for making the coloring agent of the inks insoluble or coagulated (hereinafter occasionally also referred to as "P liquid") are filled and a multi-head 702. The multi-nozzle arranged on the multi-head 702 is illustrated in a form as viewed in the z direction. In FIG. 24, 703 denotes a paper feeder roller-cooperated with auxiliary roller 704 rotate in the direction of arrow in FIG. 1 to hold the printing paper as the printing medium and feed the printing paper in the y direction.

Also, 705 denotes a paper supply roller for supplying the printing paper and also serves for holding the printing paper similarly to the rollers 703 and 704. 706 denotes a carriage supporting the foregoing five ink cartridges and shifting the same according to progress of printing. While printing operation is not performed or to perform the recovering operation of the multi-head, the carriage 706 is placed at the home position as shown by broken line in FIG. 24, in stand-by state.

It should be noted that, in the shown embodiment, the ejecting portions of respective ink-jet cartridge causes state variation utilizing thermal energy to eject the droplet. Here, the ejecting portion may be a part of the same head or a different head.

Here, the five cartridges mounted on the carriage 706 are arranged on the carriage for overlying inks in the order of P liquid, black ink, cyan ink, magenta ink and yellow ink.

Figure 26:
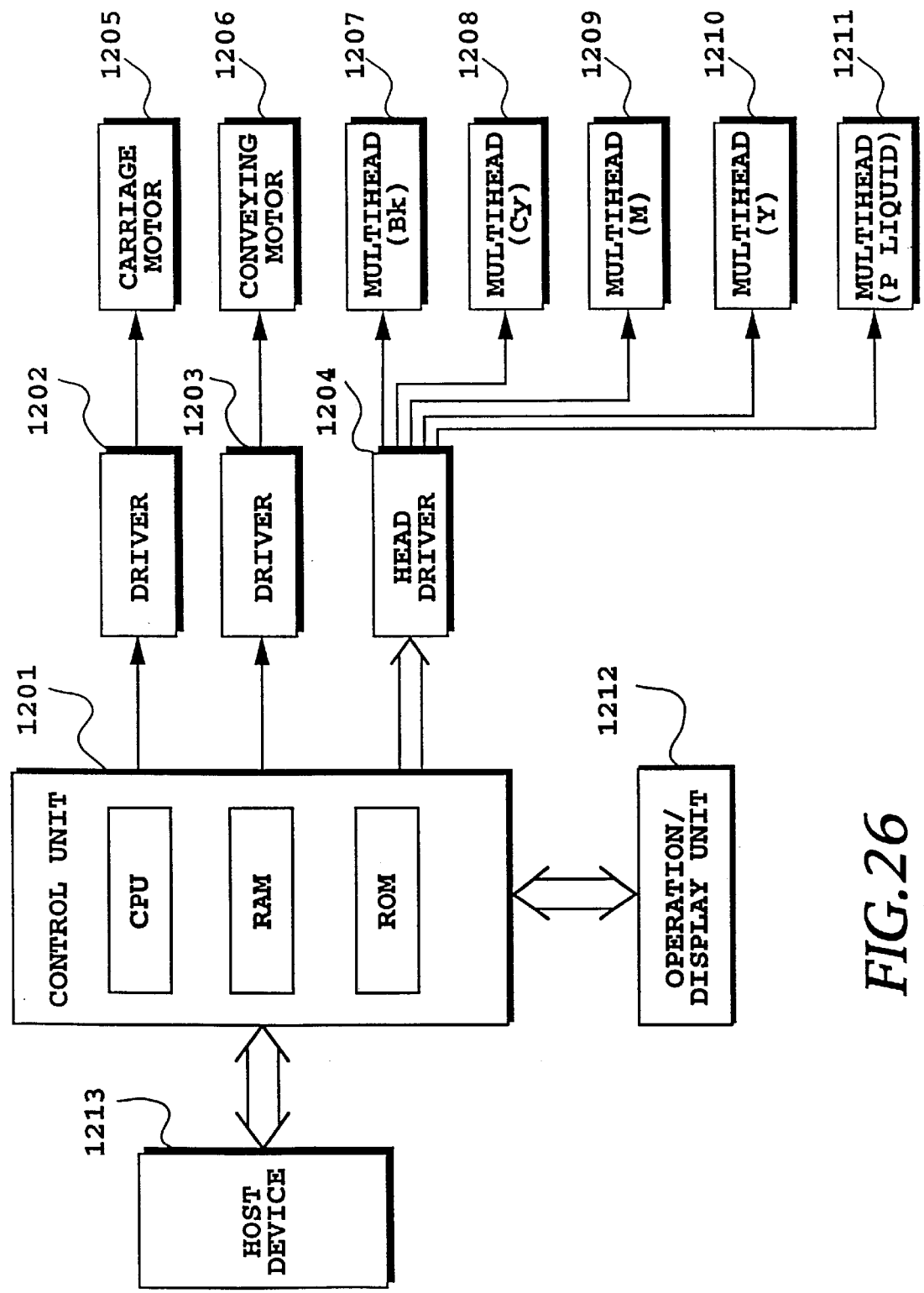
FIG. 26 is a block diagram showing a control portion of the ink-jet printing apparatus shown in FIG. 24.

FIG. 26 is a block diagram showing a control portion of the ink-jet printing apparatus shown in FIG. 24. In FIG. 26, 1201 denotes a control portion constructed mainly with CPU, ROM, RAM and so forth for controlling respective portions of the apparatus according to a program stored in ROM. 1202 denotes a driver for driving a carriage motor 1205 for shifting the carriage 706 in x direction (main scanning direction) on the basis if the signal from the control portion 1201, 1203 is a driver for driving a feeder motor 1206 for driving the supply roller 705 and the feeder roller 703 in y direction (auxiliary scanning direction) on the basis of the signal from the control portion 1201, 1204 denotes a driver for driving multi-heads 1207 to 1211 (corresponding to 702 in FIG. 24) on the basis of a printing data from the control portion, 1212 is an operation display portion for performing various key input and various display, 1213 is a host system for supplying printing data for the control portion 1201.

Before initiation of printing, the carriage 706 placed at the position h (home position) in FIG. 24, is responsive to a printing start command to perform printing on the surface of the printing medium by the n in number of multi-nozzles 801 on the multi-head 702. Upon completion of printing of the date up to the edge of the paper, and reaching a reversing position, the paper is fed in the y direction for the given amount by the feeder roller 703. Then, the carriage is initiated to move toward the home position to perform printing again. Thus, per every scan of the carriage (primary scan), printing with the multi-head and paper feed is repeated to complete data printing for one sheet.

Basically, the image data of the head for P liquid is generated as a logical sum data of the image data to be fed to respective ink-jet printing heads. In certain case, printing is performed with the thinned image data.

Figure 27:
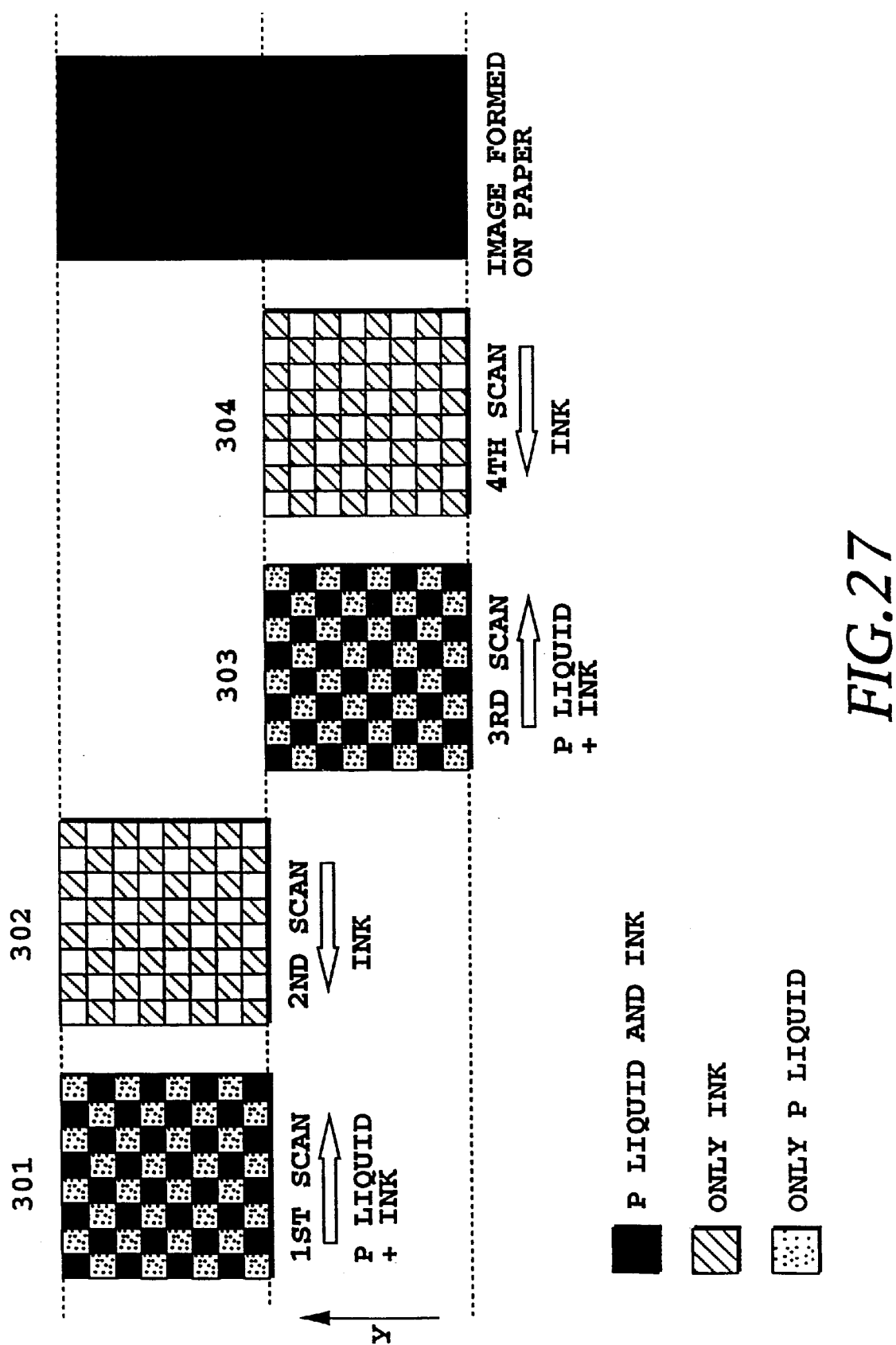
FIG. 27 is a diagrammatic illustration for explaining the ninth embodiment of the ink-jet printing method according to the invention.

FIG. 27 is a diagrammatic illustration explaining the ninth embodiment of the ink-jet printing method according to the invention.

FIG. 27 shows a manner of printing with employing head with eight nozzles, for convenience of disclosure. In the shown embodiment, the carriage 706 mounting the ink-jet printing heads for inks and the ejection head for the P liquid performs printing for pixels for an image data 301 in forward scanning with moving in the direction of the arrow for printing the ink image and P liquid image (first scanning cycle). As can be seen from 301, in the first scanning cycle, the P liquid data is not thinned and the ink image data is thinned for printing in checkered pattern. At this time, the arrangement of the heads mounted on the carriage are P liquid, K, C, M and Y in order to right. In each pixel, after hitting the printing property improving liquid, the ink is hot. Next, without effecting paper feed, the carriage driving direction is reversed to move the head in the reverse direction opposite to the first scanning direction to perform second scan. At this time, the P liquid is not ejected, and only ink is ejected according to the image data thinned in the reversed or complementary checkered fashion. Thus, the image in the printing region of the head from the upper end of the image printing region is completed. Then, the paper is fed for the amount corresponding to eight pixels in y direction by the feeder roller. Thus, the printing head is situated in the stand-by state at the position corresponding to the printing condition of 303. Then, similarly to the first scanning cycle, with scanning the carriage in the forward direction, printing is performed with the P liquid and the inks (third scanning cycle). Subsequently, forth scanning cycle similar to the second scanning cycle is performed. Thus, it becomes possible to hit the P liquid at earlier timing than the ink. In addition, since the image data for the inks is thinned, even by addition of the ejection head for the P liquid, printing can be performed without increasing the power source capacity. Also, by reciprocal printing, throughput in printing will never be lowered.

In the shown embodiment, since ink is deposited after applying the P liquid for all of the pixels, high printing density can be obtained and high quality printed image quality with no fluctuation can beobtained.

Figure 28:
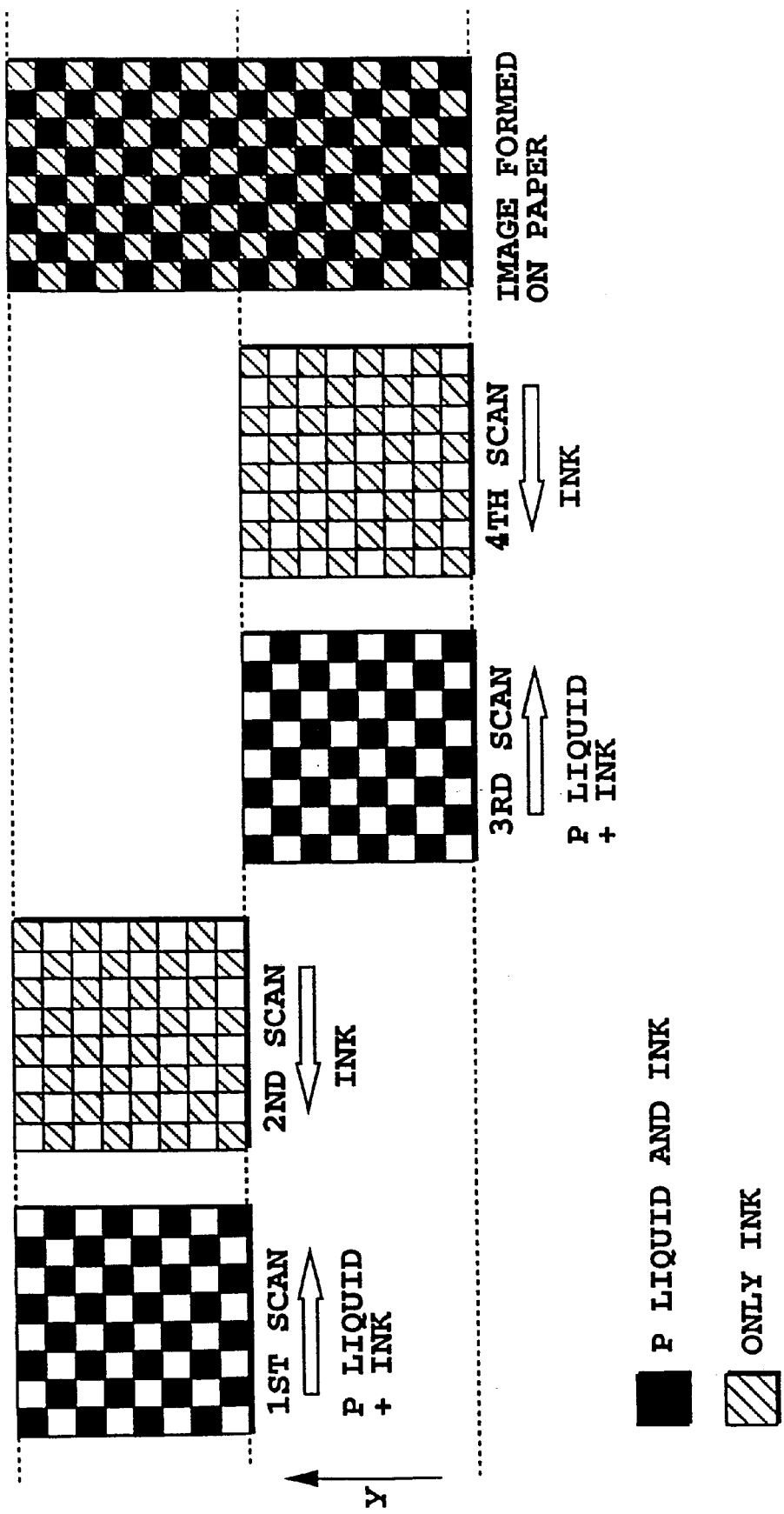
FIG. 28 is a diagrammatic illustration showing a modification of the ninth embodiment of the ink-jet printing method according to the invention.
Figure 29:
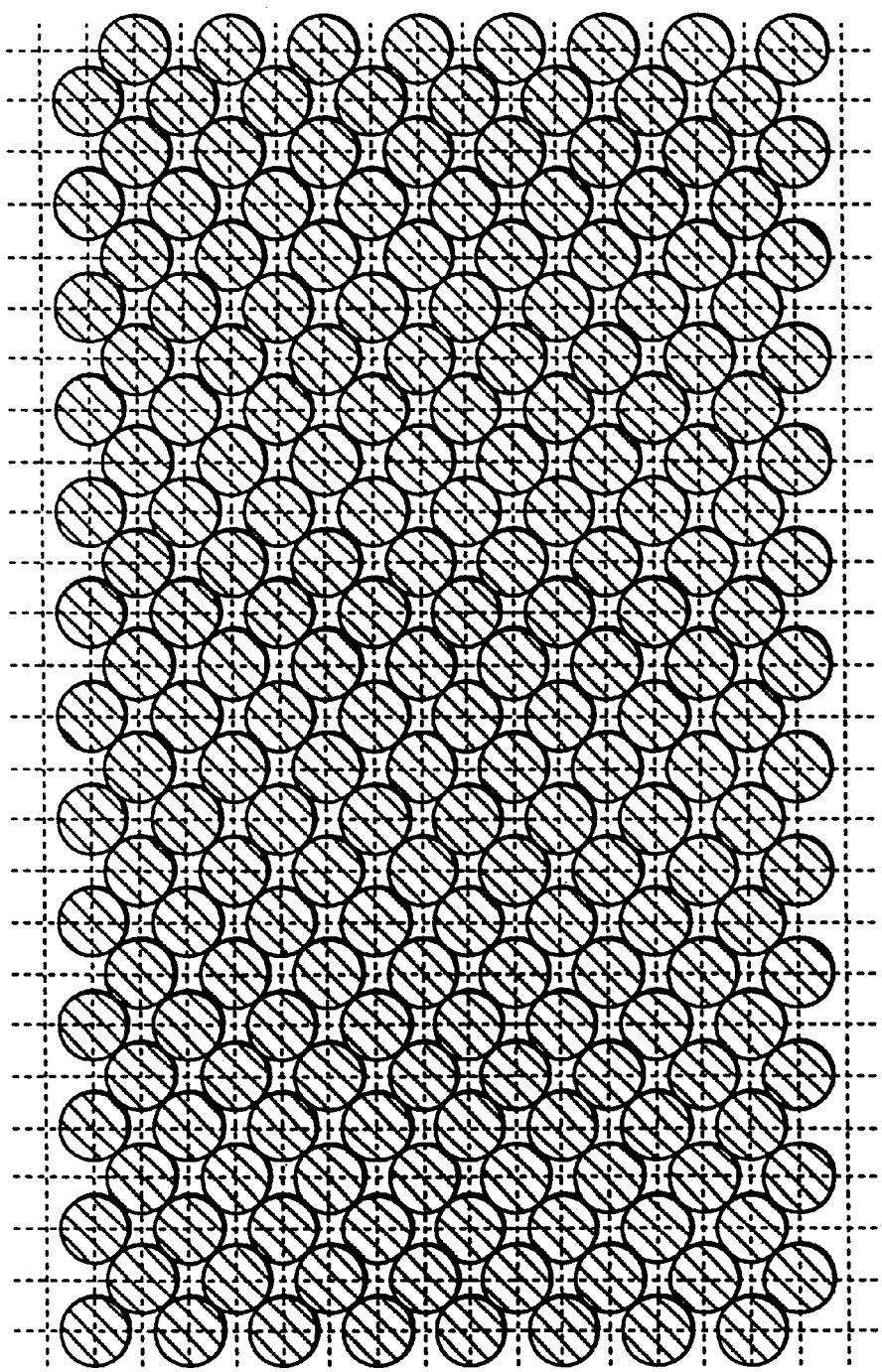
FIG. 29 is an illustration showing a dot forming condition in the case of printing the pixels in a staggered lattice pattern.

While the shown embodiment performs printing of the P liquid with the ejection data which is not thinned or curtailed, in scanning of the carriage in the forward direction, it is possible to thin the ejection data for P liquid. FIG. 28 shows a modification of the shown embodiment. Namely, in the first and third scanning cycles of the former embodiment, the ejection data for the P liquid is thinned into checkered pattern. Normally the amount of the ink droplet is designed to spread into greater area than the area given for each pixel. This is for completely covering the blank paper portion with respect to the region of 100% data. Even when only 50% of the pixel per se is printed, most of the region has been covered on the printing medium as shown in FIG. 29. Accordingly, when the checkered pattern is printed in the forward scan of the carriage in the first and third scanning cycle, most region are covered with the P liquid. Therefore, even not ejecting the P liquid in the scanning in the reverse direction, sufficient water-resistance can be achieved. Also, by thinning of the ejection data for the P liquid, consuming amount of the P liquid can be remarkably reduced. Thinning ratio of the P liquid is not specified. For instance, thinning may also be effected by thinning with the duty. Also, while the shown embodiment is designed to complete image with two scanning cycles, it is possible to complete the image with any increased number of scanning.

Hereinafter, prescription of the printing ink and the P liquid will be designated.

| Y Ink | |
|---|---|
| Glycerine | 5.0 wt. % |
| Thiodiglycol | 5.0 wt. % |
| Urea | 5.0 wt. % |
| Acetylenol EH(KawaKen Fine Cheinical) | 1.0 wt. % |
| Dyestuff, C.I. Direct Yellow 142 | 2.0 wt. % |
| Water | 82.0 wt. % |
| M Ink | |
| Glycerine | 5.0 wt. % |
| Thiodiglycol | 5.0 wt. % |
| Urea | 5.0 wt. % |
| Acetylenol EH(KawaKen Fine Chemical) | 1.0 wt. % |
| Dyestuff, C.I. Acid Red 289 | 2.5 wt.% |
| Water | 81.5 wt. % |
| C Ink | |
| Glycerine | 5.0 wt. % |
| Thiodiglycol | 5.0 wt. % |
| Urea | 5.0 wt. % |
| Acetylenol EH(KawaKen Fine Chemical) | 1.0 wt. % |
| Dyestuff, C.I. Direct Blue 199 | 2.5 wt. % |
| Water | 81.5 wt. % |
| Bk Ink | |
| Glycerine | 5.0 wt. % |
| Thiodiglycol | 5.0 wt. % |
| Urea | 5.0 wt. % |
| Isopropyl alcohol | 4.0 wt. % |
| Dyestuff, Food Black | 3.0 wt. % |
| Water | 78.0 wt. % |
| Printing Property Improving Liquid (P Liquid) | |
| Polyarylamine hydrochloride | 5.0 wt. % |
| Benzalkonium chloride | 1.0 wt. % |
| Diethylene glycol | 10.0 wt. % |
| Acetylenol EH(KawaKen Fine Chemical) | 0.5 wt. % |
| Water | 83.5 wt. % |

Here, while example where dyes are used as coloring agent of Y, M, C, Bk inks is illustrated, the present invention should not be specified to this. Namely, the coloring agent may be pigment or mixture of the pigment. and dye. Also, equivalent effect may be obtained by employing the optimal printing property improving liquid which may cause coagulation of the ink containing the coloring agent.

(Tenth Embodiment)

Figure 30:
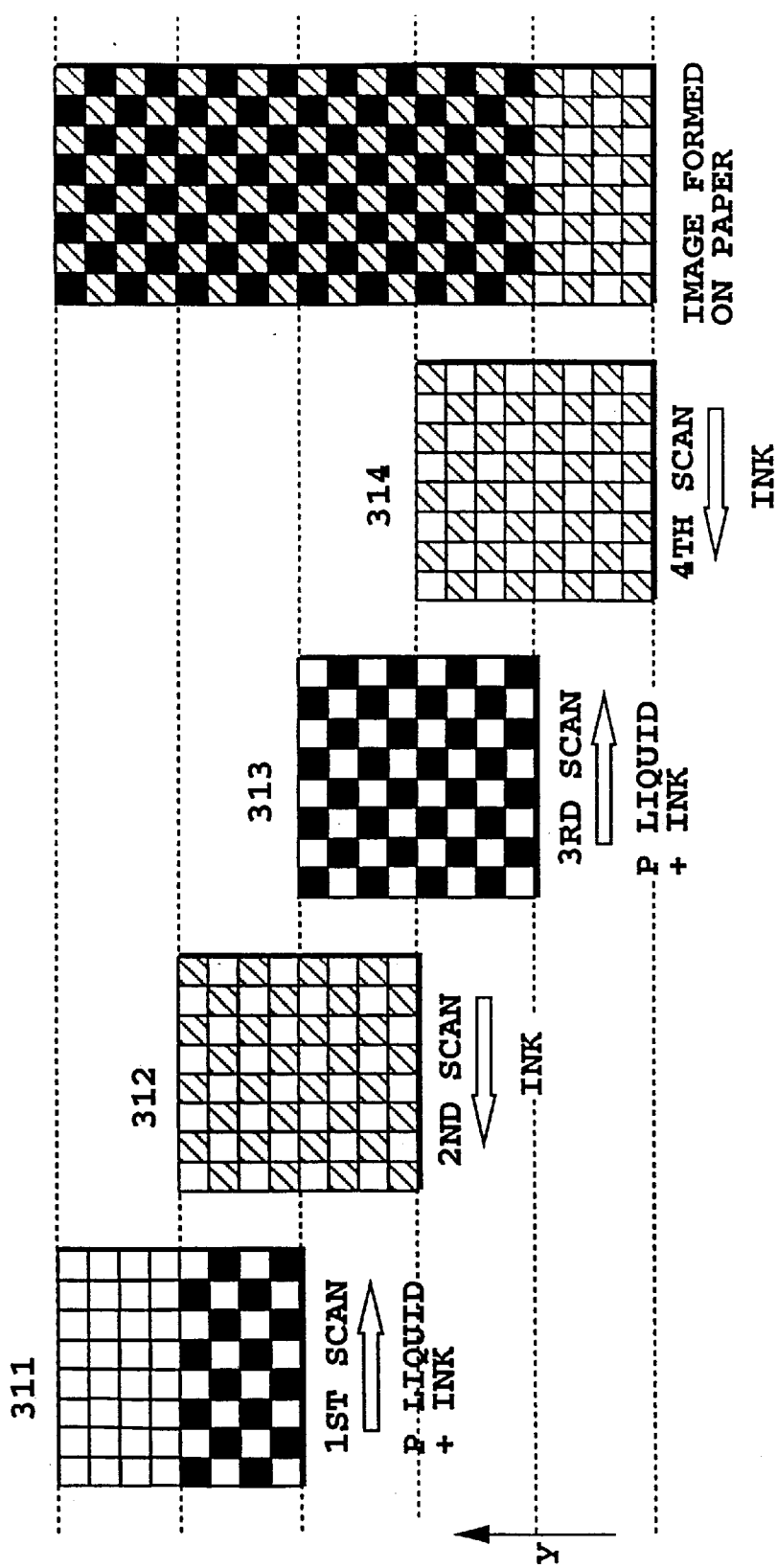
FIG. 30 is a diagrammatic illustration for explaining the tenth embodiment of the ink-jet printing method according to the invention.

FIG. 30 is a diagrammatic illustration for explaining the tenth embodiment of the ink-jet printing method according to present invention. In FIG. 30, there is shown a manner of printing with employing head with eight nozzles, for convenience of disclosure, similarly to the former embodiment. In the shown embodiment, the carriage 706 mounting the ink-jet printing heads for inks and the ejection head for the P liquid, shown in FIG. 24, performs printing for pixels for an image data 311 in forward scanning with moving in the direction of the arrow for printing the ink image and P liquid image (first scanning cycle). At this time, since the heads are arranged on the carriage in the order of P liquid, Bk, C, M, Y from right, each ink may hit after hitting the P liquid at each pixel. Next, by the paper feeder roller, paper is fed in the magnitude corresponding to four pixels in the direction of arrow y. Thus the printing head are relatively placed at the position corresponding to the condition 312 in the drawing. From this condition, the carriage driving direction is reversed to move the head in the reverse direction opposite to the first scanning direction to perform second scan. Thus, the image for four pixels are complemented and completed. At this time, the P liquid is not ejected, and only ink is ejected according to the image data thinned in the reversed or complementary checkered fashion. Thus, the image in the printing region of the head from the upper end of the image printing region is completed. Then, the paper is again fed for the amount corresponding to four pixels in y direction by the feeder roller. Thus, the printing head is situated in the stand-by state at the position corresponding to the printing condition of 313. Then, with scanning the carriage in the direction of arrow, printing is performed with the P liquid and the inks (third scanning cycle). Subsequently, forth scanning cycle similar to the second scanning cycle is performed.

Since the shown embodiment also adapted to hit the ink at the position where the P liquid is printed, printed image density is high and clean image which has no nonuniformity caused by fluctuation due to tolerance of the nozzle and line and so forth, can be obtained by divided printing. Furthermore, since the P liquid image is thinned into 50%, the consuming amount of the P liquid can be significantly reduced. Paying attention to the printed image of the P liquid, while it is not printed by divided printing, since the printing property improving liquid is substantially transparent or semi-transparent, no substantial influence will be perceptible.

While the shown embodiment takes stagger pattern in thinning of the image data, the thinning ratio will never be specified to 50% and can be any appropriate duty ratio. Also, while the shown embodiment complete the image with two times of scanning for the same region, it is possible to complete the image with greater number of scanning cycles.

(Eleventh Embodiment)

Figure 31:
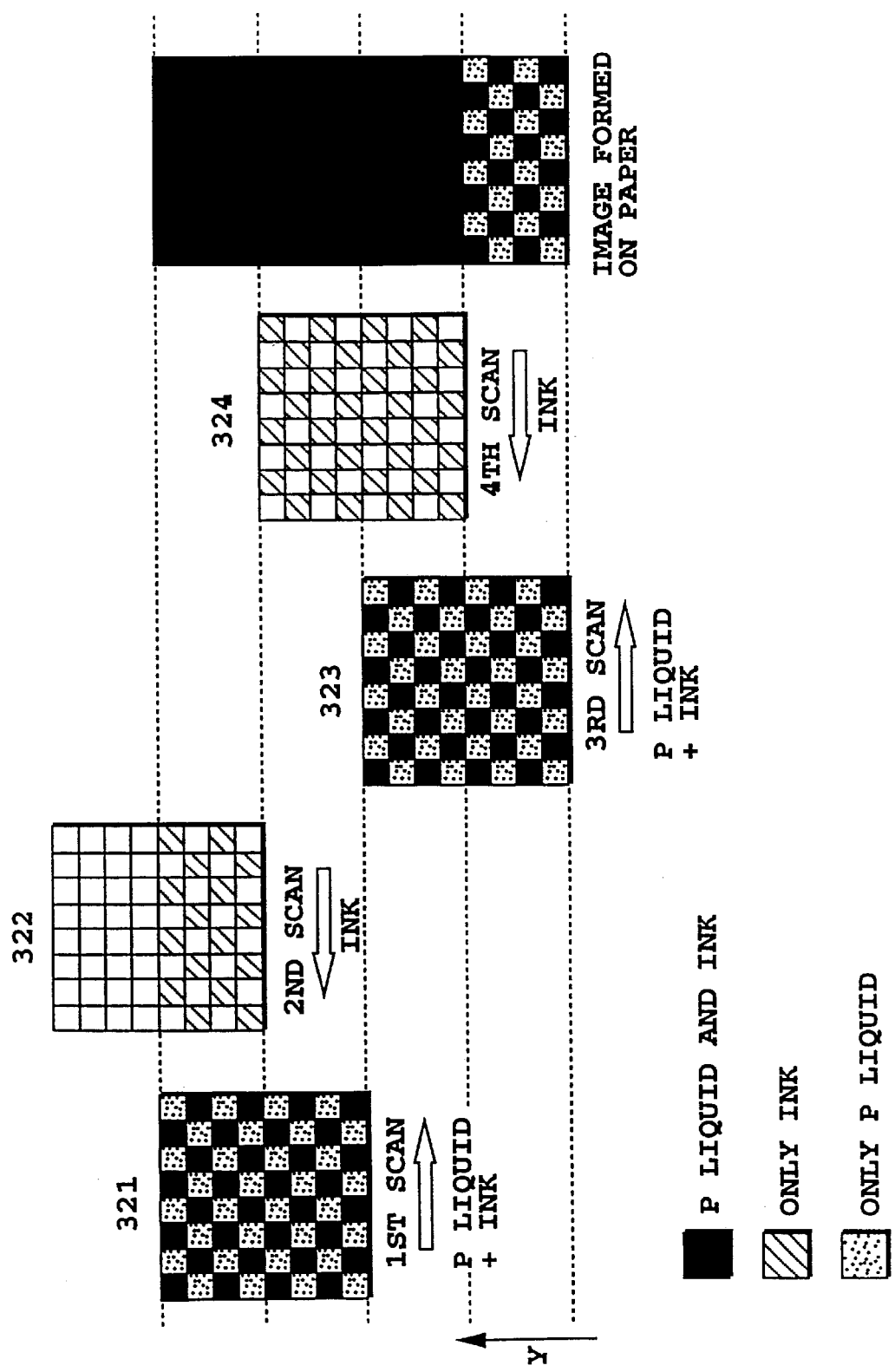
FIG. 31 is a diagrammatic illustration for explaining the eleventh embodiment of the ink-jet printing method according to the invention.

FIG. 31 is a diagrammatic illustration for showing the eleventh embodiment of the ink-jet printing method according to the present invention. There is shown a manner of printing with employing head with eight nozzles, for convenience of disclosure.

At first, the carriage 706 mounting the ink-jet printing heads for inks and the ejection head for the P liquid performs printing for pixels for an image data 321 in forward scanning with moving in the direction of the arrow for printing the ink image and P liquid image (first scanning cycle). At this time, the P liquid data is not thinned and the ink image data is thinned for printing in checkered pattern. Since the heads are arranged on the carriage in the order of P liquid, Bk, C, M, Y from right, each ink may hit after hitting the P liquid at each pixel. Next, by the paper feeder roller, paper is fed the opposite direction to the normal paper feeding direction in the magnitude corresponding to four pixels in the direction of arrow y. Thus the printing head are relatively placed at the position corresponding to the condition 322 in the drawing. From this condition, the carriage driving direction is reversed to move the head in the reverse direction opposite to the first scanning direction to perform second scan. Thus, the image for four pixels are complemented and completed. Here, since the region to be printed in scanning in the reverse direction has already been printed in the scanning in the forward direction, and thus the P liquid is applied for the pixels to be printed in the reverse scanning. Accordingly, the pixels to be printed in the reverse scanning are overlaid the ink over the P liquid. Then, the paper is again fed for the amount corresponding to twelve pixels (all nozzle number+ four pixels) in y direction by the feeder roller. Thus, the printing head is situated in the stand-by state at the position corresponding.to the printing condition of 323. Then, with scanning the carriage in the direction of arrow, printing is performed with the P liquid and the inks (third scanning cycle). Subsequently, forth scanning cycle similar to the second scanning cycle is performed.

In the shown embodiment, with respect to all pixels, the ink is deposited after application of the P liquid, high printing density can be obtained and high quality printed image with no nonuniformity can be obtained. Also, comparison with former embodiments, since the shown embodiment P liquid data is not thinned, therefore, for all pixels, the P liquid may be applied in advance of printing by the ink, and image quality with no fluctuation can be obtained.

Figure 32:
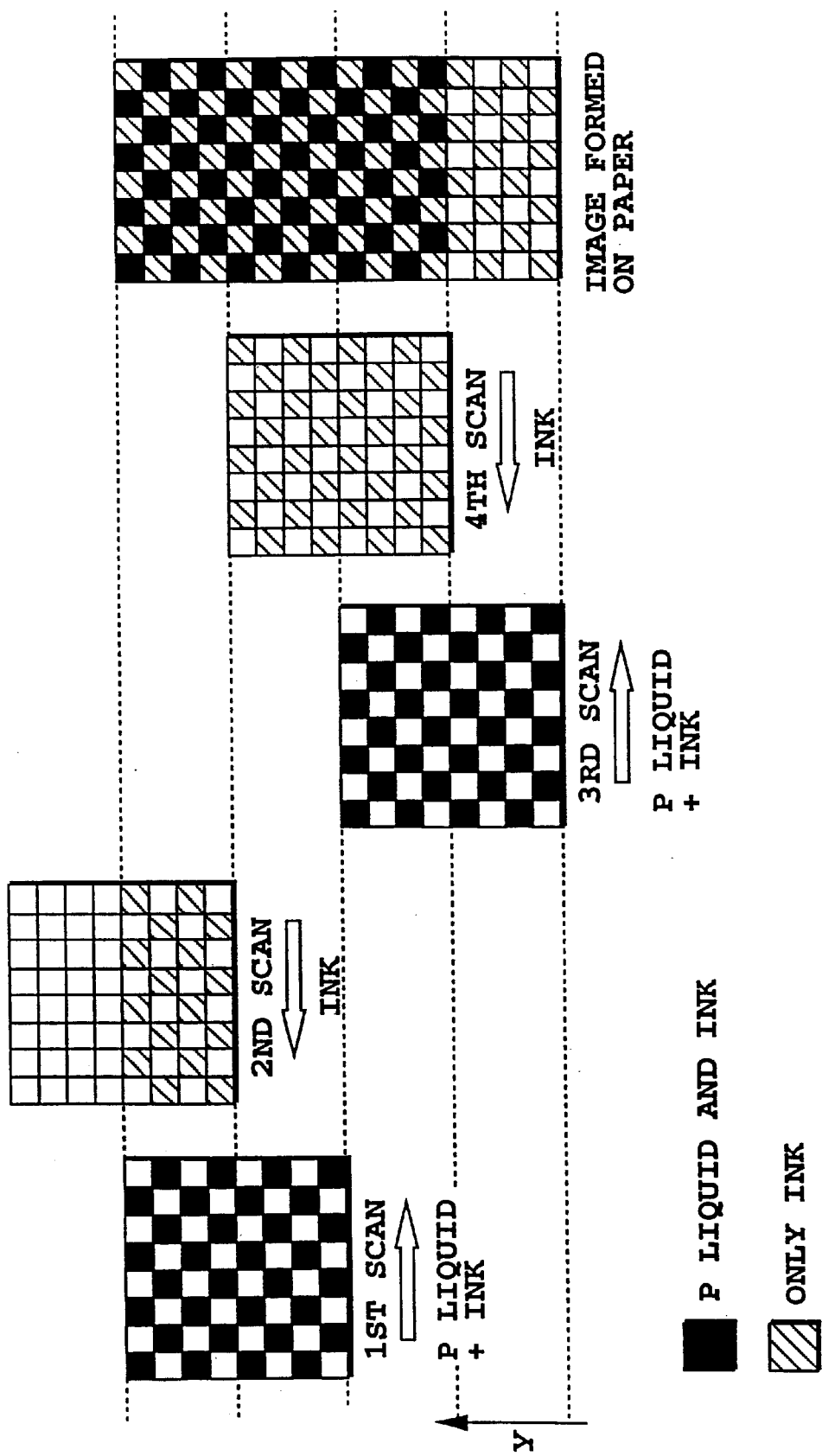
FIG. 32 is a diagrammatic illustration for explaining the modification of the eleventh embodiment of the ink-jet printing method according to the invention.

While the shown embodiment performs printing of the P liquid with the ejection data which is not thinned, in scanning of the carriage in the forward direction, it is possible to thin the ejection data for P liquid. FIG. 32 shows a modification of the shown embodiment. Namely, in the first and third scanning cycles of the former embodiment, the ejection data for the P liquid is thinned into checkered pattern. As set forth with respect to the ninth embodiment, even when only 50% of the pixel per se is printed, sufficient water-resistance can be achieved. Also, by thinning of the ejection data for the P liquid, consuming amount of the P liquid can be remarkably reduced. Thinning ratio of the P liquid is not specified. For instance, thinning may also be effected by thinning with the duty. Also, while the shown embodiment is designed to complete image with two scanning cycles, it is possible to complete the image with any increased number of scanning.

(Twelfth Embodimemt)

Figure 33:
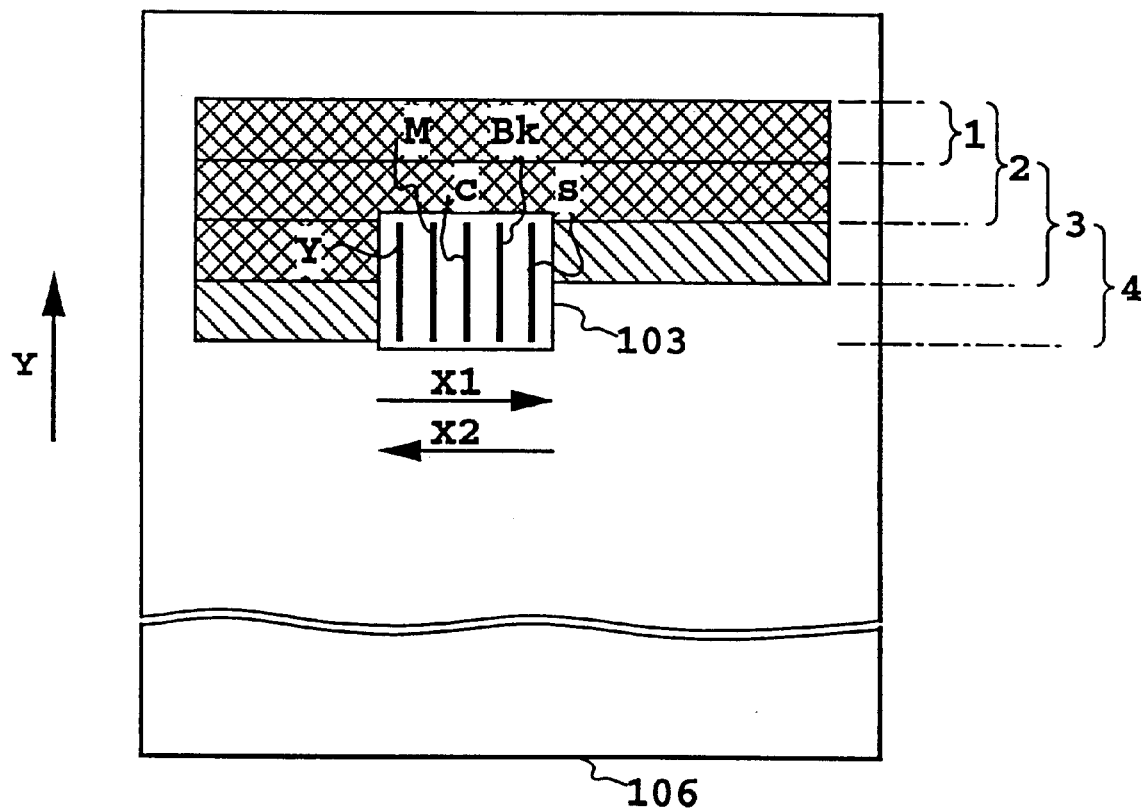
FIG. 33 is an illustration showing the twelfth embodiment of the ink-jet printing method according to the invention, for explaining the printing process of two path printing by means of a head unit in the ink-jet printing apparatus shown in FIG. 19.

The shown embodiment is directed to an ink-jet printing apparatus employing two-pass printing system employing an ink-jet printing apparatus shown in FIGS. 19 to 23. FIG. 33 shows an illustration showing a printing process of two-pass printing.

In FIG. 33, the printing medium 106 is a A4 size plain paper. The head unit relatively moves thereabove while performing printing. In FIG. 33, S denotes ejection openings for the printing property improving liquid located at the rightmost position and aligned vertically. Similarly, Bk, C, M and Y respectively denote ejection openings for Bk, C, M and Y inks. The head unit 103 performs printing operation in forward direction shown by arrow X1 and printing operation in reverse direction shown by arrow X2. In the drawing, number 1, 2, 3 and 4 at the right side are number of printing operations performed by the head unit 103 in the main scanning direction. Parentheses ( ) of the number represents printing ranges in the printing operation. In FIG. 33, there is illustrated a condition at the fourth scanning operation. Since printing operation is performed with twice scanning with respect to the unit printing region, it is generally referred to as two-pass printing. On the other hand, since printing operation is performed both in forward scanning and reverse scanning, it becomes two pass bidierectional printing.

FIGS. 34A, 34B, 34C, 34D and 34E respectively show a mask for ejection data of the printing property improving liquid S, and masks for printing data if Y, M, C Bk inks.

Figure 34C:
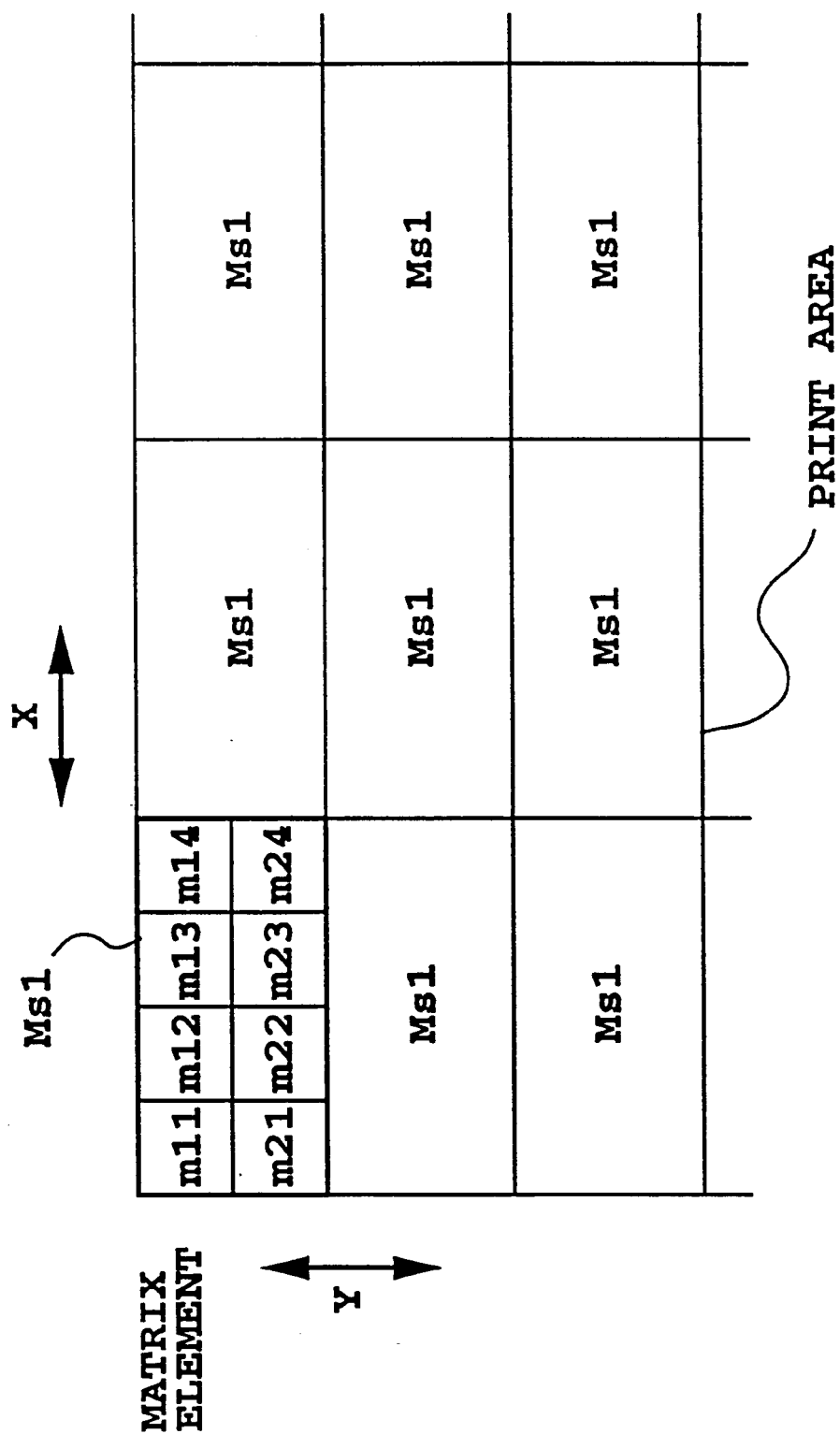

FIG. 34A is a mask of the ejection data of the printing property improving liquid S (hereinafter simply referred to as "S mask") for the first pass, FIG. 34B is the S mask in the second oath. FIG. 34C is an explanatory illustration showing a matrix Ms1 set in the printing region. FIG. 34D shows a mask of the printing data for Y, M, C, Bk inks for the first pass. FIG. 34E shows a mask of the printing data for Y, M, C, Bk inks for the second pass. The respective masks of FIGS. 34A, 34B, 34C, 34D and correspond to four pixels in the X direction as the main scanning direction and two pixels in Y direction as the secondary scanning direction (4×2 pixels). In FIGS. 34A to 34E, the minimum grid is the minimum printing pixel.

The S mask takes a matrix Ms1 of FIG. 34C as a basic matrix. With respect to this matrix Ms1 as unit, the ejection data (hereinafter referred to "S data") for the printing property improving liquid is determined. The element of the matrix Ms1 is for eight pixels of m11, m12, m13, m14, m22, m23 and m24. Accordingly, the actual size of the matrix Ms1 is for four pixels (about 70 μm×4), and two pixels (about 70 μm×4) in the Y direction.

Hereinafter process for generating the S data will be discussed.

At first, in the first pass, in relation to the printing data of the Y ink (hereinafter simply referred to as "Y printing data" in certain occasionally), the S data Ms1–Y1 of FIG. 34A is determined. Namely, with respect to Ms1, a sub-matrix of m11, m12, m21, m22 (2×2) are considered. When Y printing data (hereinafter referred to as "Y data") for ejecting the Y ink is present in any one of m11, m12, m21, m22, the S data corresponding to m11 is set to be ON (eject the printing property improving liquid S). If no Y ejection data is present in any of the m11, m12, m21, m22, the S data corresponding to ma is set at OFF (not eject the printing property improving liquid S). In S data Ms1–Y1, the S data corresponding to m12, m21, m22 are always OFF. Also, the S data corresponding to m13, m14, m23 and m24 are always held zero. Thus, the S data Ms1–Y1 for the first pass corresponding to the Y data is determined.

Similarly, in relation to the M ink printing data (hereinafter referred to as "M printing data") the S data Ms1–M1 of FIG. 34A is determined. Namely, with respect to Ms1, a sub-matrix of m11, m12, m21, m22 (2×2) are considered. When M printing data (hereinafter referred to as "Y data") for ejecting the M ink is present in any one of m11, m12, m21, m22, the S data corresponding to m12 is set to be ON (eject the printing property improving liquid S). If no Y ejection data is present in any of the m11, m12, m21, m22, the S data corresponding to may is set at OFF (not eject the printing property improving liquid S). In S data Ms1–M1, the S data corresponding to m12, m21, m22 are always OFF. Also, the S data corresponding to m13, m14, m23 and m24 are always held zero. Thus, the S data Ms1–M1 for the first pass corresponding to the M data is determined.

Similarly, in relation to the C ink printing data (hereinafter referred to as "M printing data")the S data Ms1–C1 of. FIG. 34A is determined. Namely, with respect to Ms1, a sub-matrix of m11, m12, m21, m22 (2×2) are considered. When C printing data (hereinafter referred to as "C data") for ejecting the C ink is present in any one of m11, m12, m21, m22, the S data corresponding to m22 is set to be ON (eject the printing property improving liquid S). If no C ejection data is present in any of the m11, m12, m21, m22, the S data corresponding to may is set at OFF (not eject the printing property improving liquid S). In S data Ms1–C1, the S data corresponding to m12, m21, m22 are always OFF. Also, the S data corresponding to m13, m14, m23 and m24 are always held zero. Thus, the S data Ms1–C1 for the first pass corresponding to the M data is determined.

Similarly, in relation to the Bk ink printing data (hereinafter referred to as "Bk printing data")the S data Ms1–Bk1 of FIG. 34A is determined. Namely, with respect to Ms1, a sub-matrix of m11, m12, m21, m22 (2×2) are considered. When Bk printing data (hereinafter referred to as "Bk data") for ejecting the Bk ink is present in any one of m11, m12, m21, m22, the S data corresponding to m21 is set to be ON (eject the printing property improving liquid S). If no Bk ejection data is present in any of the m11, m12, m21, m22, the S data corresponding to may is set at OFF (not eject the printing property improving liquid S). In S data Ms1–Bk1, the S data corresponding to m12, m21, m22 are always OFF. Also, the S data corresponding to m13, m14, m23 and m24 are always held zero. Thus, the S data Ms1–Bk1 for the first pass corresponding to the M data is determined.

Then, the S data for the first pass is generated as a logical sum of Ms1–Y1, Ms1–M1, Ms1–C1 and Ms1–Bk1 corresponding to the printing data of Y, M, C, Bk.

In the second pass, in relation to the printing data of the Y ink (hereinafter simply referred to as "Y printing data" in certain occasionally), the S data Ms1–Y2 of FIG. 34B is determined. Namely, with respect to Ms1, a sub-matrix of m13, m14, m23, m24 (2×2) are considered. When Y printing data (hereinafter referred to as "Y data") for ejecting the Y ink is present in any one of m13, m14, m23, m24, the S data corresponding to m13 is set to be ON (eject the printing property improving liquid S). If no Y ejection data is present in any of the m13, m14, m23, m24, the S data corresponding to ma is set at OFF (not eject the printing property improving liquid S). In S data Ms1–Y2, the S data corresponding to m14, m23, m24 are always OFF. Also, the S data corresponding to m11, m12, m21 and m22 are always held zero. Thus, the S data Ms1–Y2 for the second pass corresponding to the Y data is determined.

Similarly, the second pass S data Ms1–M2, Ms1–C2 and Ms1–Bk2 are determined corresponding to M, C, Bk.

The S data for the first pass is generated as a logical sum of Ms1–Y2, Ms1–M2, Ms1–C2 and Ms1–Bk2 corresponding to the printing data of Y, M, C, Bk.

These S data is generated in real time by processing the data to be printed by a program stored in CPU 402 when the CPU 402 accesses the memory portion 403 storing the data to be printed and feeding the fed out data to the head control portion 410. S data is also fed to the head control portion 410 in similar handling to the printing data for the respective color inks. Then, on the basis of S data and the printing data of respective color, the head 102 is driven at the position corresponding to the printing position to be printed to eject the printing property improving liquid and respective color inks. Thus, while the S data is generated by the internal program, the manner of generation of the S data is not limited to the disclosed procedure. It is possible to preliminarily perform process of the S data in the host computer and then fed to the printing apparatus to transfer to the printing process. In the alternative, it is possible to proves a hardware portion for implementing the arithmetic process of the S data in the printing apparatus.

In the shown-embodiment, the sub-matrix of the left side (2×2) among the matrix Ms1 is used for generation of S data for the first pass and the sub-matrix of the right side (2×2) among the matrix Ms1 is used for generation of the S data for the secondpass.

Thus, by dividing the matrix for (4×2) pixels into two sub-matrixes of (2×2) pixels, and by making these sub-matrixes to correspond to different pass, the printing property improving liquid S may be uniformly ejected in the first and second passes in the two pass printing system. Thus, non-uniformity of ejection of the printing property improving liquid S, such as all of the printing property improving liquid S is ejected in the first pass and no printing property improving liquid is ejected in the second pass, or most printing property improving liquid S is ejected in the first pass and a few printing property improving liquid is ejected in the second pass, and so forth. Such uniform ejection of the printing property improving liquid S in every pass may results in uniform mixing of the printing property improving liquid and the ink to cause uniform reaction to make the effect to be obtained from the mixing or reaction of the printing property improving liquid and the ink. In concrete, it can be avoided the nonuniformity, such that the ink ejected to the pixels in the first pass has water-resistance and the ink of the pixels printed in the second pass has no water-resistance and so forth. Therefore, in all of the printed pixels, satisfactory water-resistance can be obtained.

On the other hand, the mask of the printing data of Y, M, C, Bk is corresponded to the matrix Ms1 of (4×2) pixels, and, in each ink, the first pass and second pass are in complementary relationship. In FIGS. 34A to 34E, the pixels corresponding to the white portion is turned ON if the ejection data of the corresponding ink is present (ink ejected) and otherwise turned OFF (ink not ejected) Also, in FIGS. 34D and 34E, the pixel corresponding to black portion is held OFF irrespective of the printing data of the corresponding ink.

On the other hand, as viewed in micro view, with respect to the printing medium, there are portion (SI portion) where the printing property improving liquid S is first ejected and then the ink is ejected and a portion (IS portion) where the ink is first ejected and then the printing property improving liquid is. ejected. This may cause to hue at the SI portion and the IS portion due to difference of the processing liquid. However, as set forth above, because of difference of the masks for the S data and the printing data for respective color inks, the SI portions and the IS portions may be distributed uniformly in macro view. Therefore, the printing image with uniform hue can be obtained.

Furthermore, in printing with employing a plurality of colors of inks, by differentiating the masks for each of the S data and the printing data for each ink, the printing property improving liquid S can be distributed uniformly. Therefore, with respect to each ink, uniform effect of the printing property improving liquid can be attained.

Here, assuming that the printing property improving liquid S is ejected for only specific pixels and then the ink is ejected, and the printing property improving liquid S is again ejected, the printing property improving liquid S may be ejected twice for the same pixel. Such twice ejection of the same pixel is inherent to obtain satisfactory effect. However, it is desirable that the printing property improving liquid dispersed per pixel. Therefore, as in the shown embodiment, in each one pixel, by making the logical product of the S data for the first and second pass zero, namely the number of ejection of the printing property improving liquid is once per each pixel is made once to solve the problem.

On the other hand, since the logical product of the S data per pixels in the first pass becomes zero and, similarly, the logical product of respective pixels in the second pass becomes zero. Therefore, the S data corresponding to the printing data of respective ink is dispersed to make the effect which can be obtained by mixing and reacting the ink and the printing property improving liquid, can be uniform.

Since the logical product of the S data of respective pixels in the first and second passes are zero and the logical product of respective pixels in each pass is also zero, remarkable effect can be attained by mixing and causing reaction.

Here, concerning ejection of respective of Y, M, C, Bk inks, in case of the uniform printing region of with a single color ink, the printing property improving liquid S is ejected in the ratio of 25% of the pixels. This is for equivalent effect in terms of the water-resistance and so forth in comparison with the ratio of 100% In nature, upon ejecting the printing property improving liquid which is unnecessary for formation of the image, minimizing the amount of the printing property improving liquid S is effective for reducing the running cost. Also, when the printing property improving liquid as the liquid is ejected in large amount for the printing medium 106 as shown in FIG. 19, the printing medium may cause waving by absorbing large amount of the printing property improving liquid S. Such waving not only degrade the quality of the printing protect, but also, particularly in multi-pass printing, due to waving of the printing medium on printing operation, variation is caused in the distance between the head 102 and the printing medium 106 may cause displacement of the hitting position of respective ink on the printing medium to cause degradation of the printing quality. Therefore, it is desirable to eject the printing property improving liquid S in the minimum amount.

Assuming that data processing is made for ejecting the printing property improving liquid S at a ratio of 25% with respect to the logical sum of the printing data of Y, M, C, Bk, it means to eject the printing property improving liquid S in the ratio of 12.5% with respect to the secondary colors of R (red), G (green) and B (blue) combining respective two of the primary colors, the mixture ratio of the printing property improving liquid and the ink is excessively reduced to lower water-resistance as the effect of the printing property improving liquid S. Therefore, as in the shown embodiment, by differentiating the mask for the S data corresponding to the printing data of Y, M, C at least to make the logical product per each pixel being zero, namely, by making all of the logical product of the data Ms1–Y1, Ms1–M1, Ms1–Y1 and Ms1–Bk1 per pixel zero and by making all of the logical product of the data Ms1–Y2, Ms1–M2, Ms1–Y2 and Ms1–Bk2 per pixel zero, by ejecting the printing property improving liquid at a ratio of 25% to mix the printing property improving liquid and the ink in the equal ratio.

On the other hand, in the shown embodiment, while the logical product of the S data per pixel is set to zero, it may be possible to include pixels which have non-zero logical products in small number. By restricting such pixel at minimum, the printing property improving liquid and ink may be mixed to be substantially uniform.

As set forth above, instead of simply determining the S data on the basis of the logical sum of the printing data of Y, M, C but determined in consideration of the logical sum per pixel, the S data for secondary color can be greater than ½ of the duty of the S data for the primary color. Also, by setting the S data maximum at the same duty to the S data of the primary color, in comparison with deriving the S data from the logical sum of Y, M, C, the duty of the S data in the secondary color can be increased to enhance the effect of the printing property improving liquid in the secondary color.

Using four color inks and generating 25%-duty S data as in this embodiment is also advantageous in terms of data processing. Generally, the duty of (½ n)×100%, where n is an integer equal to or greater than 1, facilitates computation on the part of the processing device. In this embodiment that uses four color inks, the 25% duty therefore offers an advantage of being able to prepare independent S data masks for print data of each color ink.

By generating S data with 25% duty or less for each color, it is possible to make zero the logical product of S masks for individual colors. The duty should be made as small as possible, as long as there is an effect of the printing property improvingliquid.

In the head 102 of FIG. 21 having multiple ejecting ports 23 for each ink and printing property improving liquid S, it is possible to extend the life of the printing property improving liquid ejecting head portion by using the ejecting ports 23 for the printing property improving liquid S uniformly during the multi-pass printing. Further, if there are manufacture-related variations in the printing property improving liquid ejecting ports 23, the printing property improving liquid S can be ejected onto the print medium 106 uniformly.

If the S data should be determined based simply on logical sum among the print data of Y, M, C and Bk, particular ones of printing property improving liquid ejecting ports 23 that perform printing prior to others have a greater frequency of use. That is, in spite of the multi-pass printing, the printing property improving liquid S is very likely to be ejected in the first pass, shortening the life of those particular printing property improving liquid ejecting ports with higher priority. In the first pass of printing, variations in the amount of printing property improving liquid S delivered from the ejecting ports 23 and deviations-in the ejecting direction manifest themselves on the print medium. That is, it is impossible to divide the print operation into a multiple number of operations to cancel variations in the amount of printing property improving liquid S delivered from the ejecting ports and deviations in the ejecting direction. These problems are solved by this invention.

Hereinafter, prescription of the printing ink and the printing property improving liquid S will be designated.

| Y (Yellow) Ink | |
|---|---|
| Glycerine | 5.0 wt. % |
| Thiodiglycol | 5.0 wt. % |
| Urea | 5.0 wt. % |
| Isopropyl alcohol | 4.0 wt. % |
| Acetylenol EH(KawaKen Fine Chemical) | 1.0 wt. % |
| Dyestuff, C.I. Direct Yellow 142 | 2.0 wt. % |
| Water | 78.0 wt. % |
| M (Magenta) Ink | |
| Glycerine | 5.0 wt. % |
| Thiodiglycol | 5.0 wt. % |
| Urea | 5.0 wt. % |
| Isopropyl alcohol | 4.0 wt. % |
| Acetylenol EH(KawaKen Fine Chemical) | 1.0 wt. % |

-continued

| | |
|---|---|
| Dyestuff, C.I. Acid Red 289 | 2.5 wt .% |
| Water | 77.5 wt.% |
| C (Cyan) Ink | |
| Glycerine | 5.0 wt. % |
| Thiodiglycol | 5.0 wt. % |
| Urea | 5.0 wt. % |
| Isopropyl alcohol | 4.0 wt. % |
| Acetylenol EH(KawaKen Fine Chemical) | 1.0 wt. % |
| Dyestuff, C.I. Direct Blue 199 | 2.5 wt. % |
| Water | 77.5 wt. % |
| Bk (Black) Ink | |
| Glycerine | 5.0 wt. % |
| Thiodiglycol | 5.0 wt. % |
| Urea | 5.0 wt. % |
| Isopropyl alcohol | 4.0 wt. % |
| Dyestuff, Food Black | 3.0 wt. % |
| Water | 78.0 wt. % |
| Printing Property Improving Liquid S | |
| Polyarylamine hydrochloride | 5.0 wt. % |
| Benzalkonium chloride | 1.0 wt. % |
| Diethylene glycol | 10.0 wt. % |
| Acetylenol EH(KawaKen Fine Chemical) | 0.5 wt. % |
| Water | 83.5 wt. % |

As set forth above, 1.0% of Acetylenol EH as a surfactant is added to the Y, M and C inks to increase penetrating ability the printing medium. Therefore, the Y, M and C inks have an advantage in fixing ability to the printing medium in comparison with the Bk ink. On the other hand, the Bk ink has low penetrating ability but shows high optical density and high sharpness of an edge in a printed image. Therefore, the Bk ink is suitable for printing a character and a line. 0.5% of Acetylenol EH is added to the printing property improving liquid to slightly increase the penetrating ability.

Ink usable for carrying out the present invention should not be limited only to dyestuff ink, and pigment ink having pigment dispersed therein can also be used. Any type of treatment liquid can be used, provided that pigment is aggregated with it. The following pigment ink can be noted as an example of pigment ink adapted to cause aggregation by mixing with the liquid P previously discussed. As mentioned below, yellow ink Y2, magenta ink M2, cyan ink C2 and black ink K2 each containing pigment and anionic compound can be obtained.

[Black Ink K2]

The following materials are poured in a batch type vertical sand mill (manufactured by Aimex Co.), glass beads each having a diameter of 1 mm is filled as medium using anion based high molecular weight material P-1 (aqueous solution containing a solid ingredient of styrene methacrylic acid ethylacrylate of 20% having an acid value of 400 and average molecular weight of 6000, neutralizing agent:potassium hydroxide) as dispersing agent to conduct dispersion treatment for three hours while water-cooling the sand mill. After completion of dispersion, the resultant mixture has a viscosity of 9 cps and pH of 10.0. The dispersing liquid is poured in a centrifugal separator to remove coarse particles, and a carbon black dispersing element having a weight-average grain size of 10 nm is produced.

(Composition of Carbon Black Dispersing Element)

| | |
|---|---|
| P-1 aqueous solution (solid ingredient of 20%) | 40 parts |
| Carbon black Mogul L (prepared by Cablack Co.) | 24 parts |
| Glycerine | 15 parts |
| Ethylene glycol monobutylether | 0.5 parts |
| Isopropyl alcohol | 3 parts |
| Water | 135 parts |

Next, the thus obtained dispersing element is sufficiently dispersed in water, and black ink K2 containing pigment for ink jet printing is obtained. The final product has a solid ingredient of about 10%.

[Yellow Ink Y2]

Anionic high molecular P-2 (aqueous solution containing a solid ingredient of 20% of styreneacrylic acid methyl methacrylate having an acid value of 280 and an average molecular weight of 11,000, neutralizing agent:diethanolamine) is used as a dispersing agent and dispersive treatment is conducted in the same manner as production of the black ink K2 whereby yellow color dispersing element having a weight-average grain size of 103 nm is produced. (composition of yellow dispersing element)

| | |
|---|---|
| P-2 aqueous solution (having a solid ingredient of 20%) | 35 parts |
| C. I. pigment yellow 180 (tradename: Nobapalm yellow PH-G, prepared by Hoechst Co.) | 24 parts |
| Triethylene glycol | 10 parts |
| Diethylene glycol | 10 parts |
| Ethylene glycol monobutylether | 1.0 parts |
| Isopropyl alcohol | 0.5 parts |
| Water | 135 parts |

The thus obtained yellow dispersing element is sufficiently dispersed in water to obtain yellow ink Y2 for ink jet printing and having pigment contained therein. The final product of ink contains a solid ingredient of about 10%.

[Cyan Ink C2]

Cyan colored-dispersing element having a weight-average grain size of 120 nm is produced using anionic high molecular P-1 as dispersing agent, and moreover, using the following materials by conducting dispersing treatment in the same manner as the carbon black dispersing element.

(Composition of Cyan Colored-dispersing Element)

| | |
|---|---|
| P-1 aqueous solution (having solid ingredient of 20%) | 30 parts |
| C. I. pigment blue 153 (trade-name: Fastogen blue FGF, prepared by Dainippon Ink And Chemicals, Inc.) | 24 parts |
| Glycerine | 15 parts |
| Diethylene glycol monobutylether | 0.5 parts |
| Isopropyl alcohol | 3 parts |
| Water | 135 parts |

The thus obtained cyan colored dispersing element is sufficiently stirred to obtain cyan ink C2 for ink jet printing and having pigment contained therein. The final product of ink has a solid ingredient of about 9.6%.

[Magenta Ink M2]

Magenta color dispersing element having a weight-average grain size of 115 nm is produced by using the anionic high molecular P-1 used when producing the black ink K2 as dispersing agent, and moreover, using the following materials in the same manner as that in the case of the carbon black dispersing agent.

(Composition of the Magenta Colored Dispersing Element)

| | |
|---|---|
| P-1 aqueous solution (having a solid ingredient of 20%) | 20 parts |
| C. I. pigment red 122 (prepared by Dainippon Ink And Chemicals, Inc.) | 24 parts |
| Glycerine | 15 parts |
| Isopropyl alcohol | 3 parts |
| Water | 135 parts |

Magenta ink M2 for ink jet printing and having pigment contained therein is obtained by sufficiently dispersing the magenta colored dispersing element in water. The final product of ink has a solid ingredient of about 9.2%.

In mixing of the printing property improving liquid and the ink as set forth above, in the present invention, as a result of mixing of the printing property improving liquid and the ink on the printing medium or at a position penetrating the printing medium in a certain magnitude, as the first stage of reaction, low molecule component or cation type oligomer in the cation type substance contained in the printing property improving liquid, and anion type compound used in the water soluble dyestuff or pigment ink having anion type group cause association by ionic interaction to separate from solution phase at a moment. As a result, dispersing breakdown is caused in the pigment ink to form the coagulated body of the pigment.

Next, as the second stage of reaction, an association body of the above-mentioned dyestuff and low molecule cation type substance or cation type oligomer or coagulated body of the pigment is absorbed by high molecule components included in the printing property improving liquid. Therefore, the coagulated body of the dyestuff or the coagulated body of the pigment caused by association becomes further greater in size to become difficult to penetrate into the gap between the fiber of the printing medium. As a result, only the liquid portion resulting from solid/liquid separation penetrates into the printing paper, both of printing quality and sensibility can be achieved. At the same time, viscosity of the coagulated body formed of the low molecule component of the cation substance or cation type oligomer, anion type dyestuff and cation type substance, or the coagulated body of the pigment is increased to so as not to move according to movement of the liquid medium. Therefore, even when the adjacent ink dots are formed with different colors as in formation of a full color image, the color may not be mixed to each other. Therefore, bleeding is not caused. Also, since the coagulated body is essentially water insoluble, the moisture resistance of the formed image becomes complete. Also, color fastness to light of the formed image can be improved by the shielding effect of the polymer.

A word "insoluble" or "coagulate" used in the present specification means a function in which a coloring agent, such as the dyestuff and the pigment, is made insoluble or coagulate, and means a phenomenon only in the first stage, for one example, and phenomenon including both of the first and second stages, in another example.

On the other hand, in implementation of the present invention, since it is unnecessary to use cation high molecular substance having large molecule or polyvalent metal, or even when it is necessary to use such cation high molecular substance having large molecule or polyvalent metal salt, there are merely used auxiliary, the amount of use can be minimized. As a result, a problem of lowering of the color development of dyestuff to be encountered when attempt is made to obtain the moisture resistant effect using the conventional cation type high molecular substance or polyvalent metal salt, can be avoided as another effect of the present invention.

It should be noted that the kind of the printing medium is not specified in implementation of the present invention, and conventionally used plain paper, such as copy paper, bond paper and so forth can be suitably used. Of course, a coated paper specially prepared for ink-jet printing, transparent film for OHP and so forth may also be used suitably. Also, general wood free paper, glossy paper and so forth may also used suitably.

(Embodiment 13)

In the embodiment 12, the print data of 2×2 pixels on the left-hand side of the matrix Ms1 in FIGS. 34A to 34C was used for generating S data for the first pass of printing and the print data of 2×2 pixels on the right-hand side was used for generating S data for the second pass of printing. The S data generation is not limited to this arrangement. For example, the matrix Ms1 may be divided into a plurality of sub-matrices, which may be printed in different passes to deliver the printing property improving liquid S uniformly.

Figure 35A:
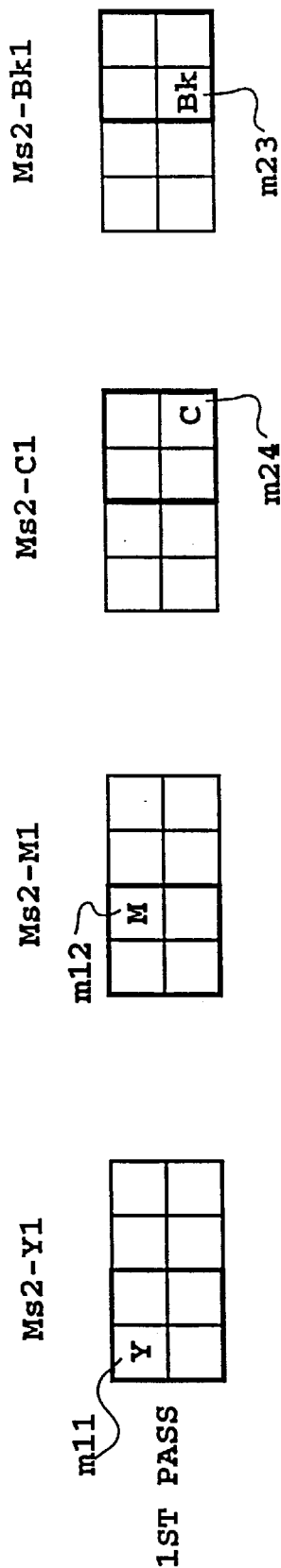
FIGS. 35A, 35B and 35C are explanatory illustrations of a mask for the printing property improving liquid in the thirteenth embodiment of the invention.
Figure 35B:
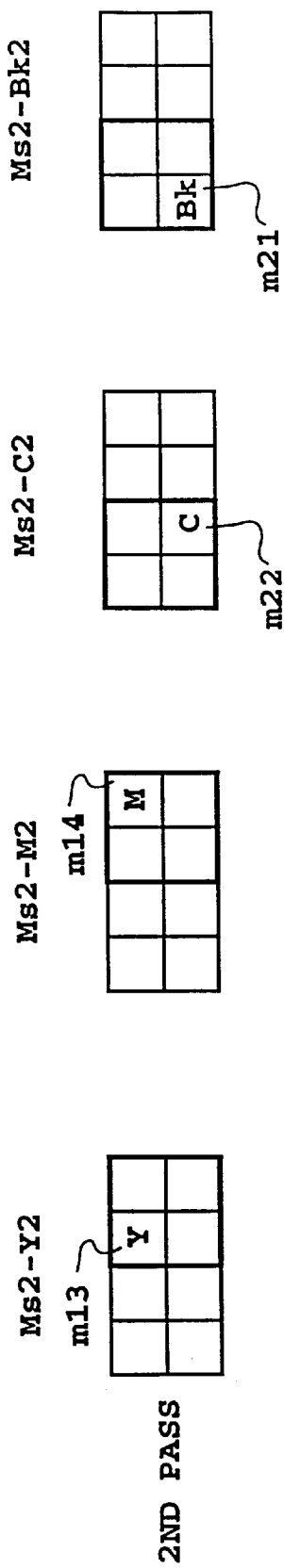
Figure 35C:
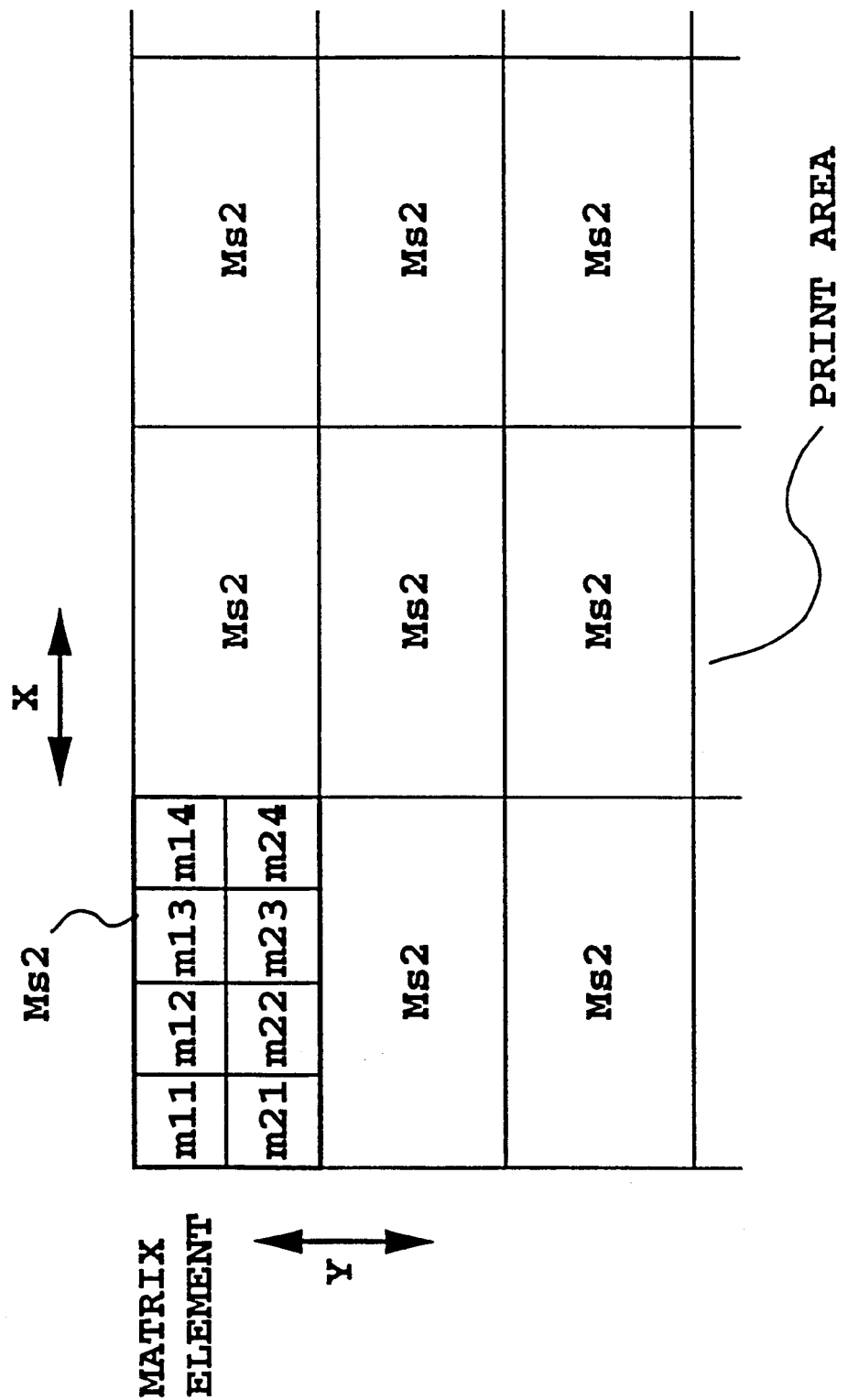

FIGS. 35A, 35B and 35C show other examples of S data masks used in the 2-pass printing. Generation of the first-pass S data Ms2–Y1 and MS2–M1 corresponding to Y and M print data uses the print data of 2×2 pixels on the left-hand side; and generation of the first-pass S data Ms2–C1 and MS2–Bk1 corresponding to C and Bk print data uses the print data of 2×2 pixels on the right-hand side. Second pass uses the print data on the opposite side.

This arrangement allows generation of more uniformly distributed S data for all Y, M, C and Bk inks than can the previous embodiment 12.

(Embodiment 14)

The embodiment 12 showed the method of realizing uniform ejecting of the printing property improving liquid S in the 2-pass printing. Other printing arrangements are possible, and this invention is valid for any multi-pass printing of two or more passes, such as 4-pass and 8-pass printings.

FIGS. 36A, 36B, 36C and 36D show S data masks for 4-pass printing. FIG. 36A represents S data masks for a first pass of printing; FIG. 36B represents those for a second pass; FIG. 36C represents those for a third pass; and FIG. 36D represents those for a fourth pass.

Here, the matrix Ms3 of 4×4 pixels is divided into four sub-matrices for each ink, each sub-matrix consisting of 2×2 pixels. These sub-matrices are printed by different passes, thereby making it possible to eject the printing property improving liquid S uniformly for each ink during the 4-pass printing.

As to the S data corresponding to the Y print data, the sub-matrix of 2×2 pixels at the upper left in the matrix Ms3 is used to generate the S data MS3–Y1 for the first pass of printing; the sub-matrix of 2×2 pixels at the upper right is used to generate the S data Ms3–Y2 for the second pass; the sub-matrix of 2×2 pixels at the lower right is used to generate the S data Ms3–Y3 for the third pass; and the sub-matrix of 2×2 pixels at the lower left is used to generate the S data Ms3–Y4 for the fourth pass. As to the S data corresponding to the M, C and Bk print data, the sub-matrix used is shifted clockwise inside the matrix in the succeeding passes as shown in FIGS. 36A to 36D. In each 2×2-pixel sub-matrix, the position where the S data is ON is set at the upper left for Y print data, at the upper right for M print data, at the lower right for C print data, and at the lower left for Bk print data.

In generating the S data corresponding to the Y print data for the first pass, for example, if there is a Y ejection data in any of the m11, m12, m21 and m22 of the upper left 2×2-pixel sub-matrix in the 4×4-pixel matrix Ms2, the S data at the position of m11 is turned ON, and the S data at other positions m12, m21, m22 are turned OFF. Similar data processing is also performed for M, C and Bk. These data Ms3–Y1, Ms3–M1, Ms3–C1 and Ms3–Bk1 are logically sum to form S data for the first pass of printing. For the second to fourth pass, similar data processing is carried out. Here, the mask configuration for the Y, M, C and Bk print data does not matter.

(Embodiment 15)

In the case of uniform printing of Y, M, C and Bk inks over an entire print region, the embodiment 12 delivers the printing property improving liquid S onto 25% of the pixels of the print region. The invention, however, is not limited to this arrangement.

If the Y, M, C and Bk inks are not uniformly printed over the entire print region but are printed sparsely on the pixels, the percentage of the printing property improving liquid S delivered in terms of pixels may become greater than 25% on average.

As to the S data corresponding to the Y print data of the first pass in FIG. 34A, for example, if there are at least two Y ejection data in the four pixels m11, m12, m21 and m22, then S data at m11 is turned ON. If at least two Y ejection data do not exist in these four pixels, the S data at m11 is turned OFF. Other S data at m12, m21 and m22 are always turned OFF. And S data at. m13, m14, m23 and m24 also are always turned OFF. In this way, the first-pass S data Ms1–Y1 corresponding to the Y ink data is determined. The sub-matrix consists of 2×2 pixels, and whether there are at least two Y ejection data in that sub-matrix is taken as a condition for turning the S data ON. This is equivalent to adopting the condition of whether the percentage of the Y ejection data in the sub-matrix is 50% or more.

Similarly, the first-pass S data corresponding to the M, C, and Bk print data are also prepared and the logical sum of these four S data is taken as the final S data for the first pass of printing operation. The second-pass S data is also generated in the same way.

In this way, by turning the S data ON or OFF for each ink according to the percentage of the ink ejection data within the sub-matrix, it is possible not to increase the average amount of the printing property improving liquid S delivered even in the sparsely printed area.

Although the percentage of the ink ejection data used as the decision criterion for turning the S data ON or OFF is set at 50% in this example, it can be set. at an optimal value depending on the characteristic of each ink and printing property improving liquid S. When the ink of the former embodiment is used, a satisfactory effect was obtained by setting the percentage at 25–75%.

(Embodiment 16)

In the case of uniform printing of Y, M, C and Bk inks over an entire print region, the embodiment 12 delivers the printing property improving liquid S onto 25% of the pixels of the print region. The invention, however, is not limited to this arrangement. Depending on the characteristics of the inks and the printing property improving liquid S used, the printing property improving liquid S may be ejected at 50% of the pixels for each ink.

Figure 37C:
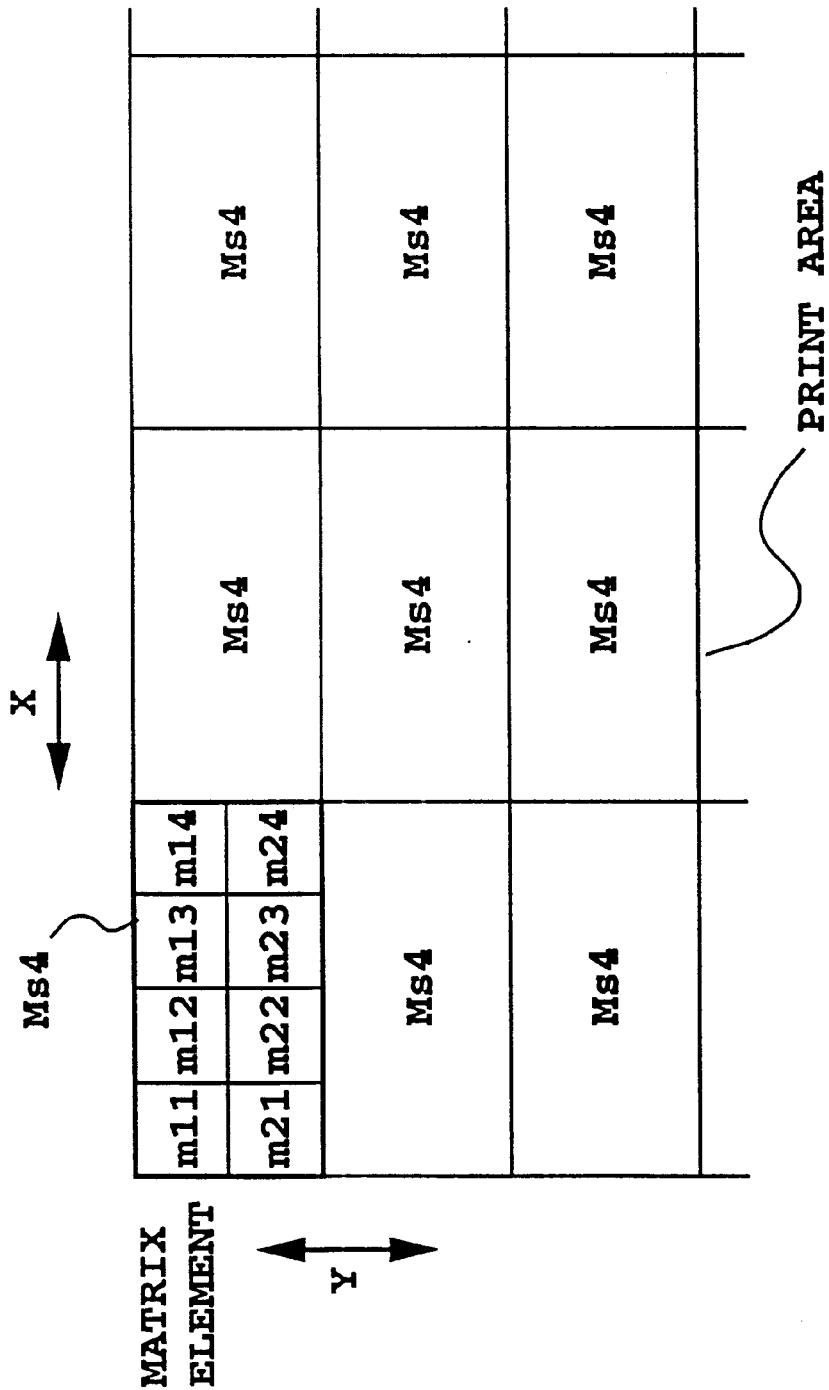

FIGS. 37A, 37B and 37C show the S data masks when the printing property improving liquid S is ejected at 50% of the pixels for each ink. This example represents a case of 2-pass printing. FIG. 37A represents an S data mask for the first pass; FIG. 37B represents an S data mask for the second pass; and FIG. 37C shows matrices Ms4 set in the print region. The first- and second-pass masks for the Y, M, C and Bk print data may be similar to those of the former embodiment.

The S data mask corresponds in size to a matrix Ms4 of 4×2 pixels, which measures four pixels in X direction or main scan direction and two pixels in Y direction or sub-scan direction perpendicular to X direction. The minimum squares in the Figure represent unit print elements.

The S data mask is determined by using the matrix Ms4 as its basic matrix. The matrix Ms4 consists of eight pixels m11, m12, m13, m14 m21, m22, m23, and m24. Therefore, the actual size of the matrix Ms4 is about 70 μm×4 in X direction and about 70 μm×2 in Y direction.

Here, the process of generating the S data is explained below.

In the first pass, the S data corresponding to Y print data is generated as follows. If, in a left sub-matrix of 2×2 pixels, m11, m12, m21, m22 in the matrix Ms4, there is at least two (=N4) Y ejection data, the S data at M11 and M12 are turned ON (printing property improving liquid S is ejected), with other pixels m13, m14, m21, m22, m23, m24 turned off (printing property improving liquid S is not ejected). When two (=N4) or more Y ejection data do not exist, the S data at all sub-matrix pixels m11–m24 are turned OFF. In this way, the first-pass S data Ms4–Y1 for Y print data is determined.

Likewise, the S data corresponding to M print data is generated as follows. If there are at least two (=N4) M ejection data in the left sub-matrix made up of m11, m12, m21 and m22, the S data at m12 and m22 are turned ON, with other pixels m11, m13, m14, m21, m23, m24 turned OFF. If two (=N4) or more M ejection data do not exit, the S data at all sub-matrix pixels m11–m24 are turned OFF. In this way, the first-pass S data Ms4–M1 for M print data is determined.

Similarly, as to the S data corresponding to C print data, when there is at least two (=N4) C ejection data in the right sub-matrix made up of m13, m14 m23 and m24, the S data at m23 and m24 are turned ON, with other pixels m11, m12, m13, m14, m21, m22 turned OFF. If two (=N4) or more C ejection data do not exit, the S data at all sub-matrix pixels m11–m24 are turned OFF. In this way, the first-pass S data Ms4–C1 for C print data is determined.

Similarly, the S data corresponding to Bk print data is generated as follows. When there is at least two (=N4) Bk ejection data in the right sub-matrix made up of m13, m14, m23 and m24, the S data at m13 and m23 are turned ON, with other pixels m11, m12, m14, m21, m22, m24 turned OFF. If two (=N4) or more Bk ejection data do not exit, the S data at all sub-matrix pixels m11–m24 are turned OFF. In this way, the first-pass S data Ms4–Bk1 for Bk print data is determined.

Then, these S data Ms4–Y1, Ms4–M1, Ms4–C1, Ms4–Bk1 corresponding to Y, M, C and Bk inks are logically summed to produce the final first-pass S data for all inks.

In the second pass of the printing operation, the S data corresponding to Y print data is generated as follows. When there is at least two (=N4) Y ejection data in the right sub-matrix made up of m13, m14, m23 and m24, the S data at m13 and m14 are turned ON, with other pixels m11, m12, m21, m22, m23, m24 turned OFF. If two (=N4) or more Y ejection data do not exit, the S data at all sub-matrix pixels m11–m24 are turned OFF. In this way, the second-pass S data Ms4–Y2 for Y print data is determined.

Similarly, the S data corresponding to M print data is generated as follows. When there is at least two (=N4) M ejection data in the right sub-matrix made up of m13, m14, m23 and m24, the S data at m14 and m24 are turned ON, with other pixels m11, m12, m13, m21, m22, m23 turned OFF. If two (=N4) or more M ejection data do not exit, the S data at all sub-matrix pixels m11–m24 are turned OFF. In this way, the second-pass S data Ms4–M2 for M print data-is determined.

Similarly, the S data corresponding to C print data is generated as follows. When there is at least two (=N4) C ejection data in the left sub-matrix made up of m11, m12, m21 and m22, the S data at m21 and m22 are turned ON, with other pixels m11, m12, m13, m14, m23, m24 turned OFF. If two (=N4) or more C ejection data do not exit, the S data at all sub-matrix pixels m11–m24 are turned OFF. In this way, the second-pass S data Ms4–C2 for C print data is determined.

Similarly, the S data corresponding to Bk print data is generated as follows. When there is at least two (=N4) Bk ejection data in the left sub-matrix made up of m11, m12, m21 and m22, the S data at m11 and m21 are turned ON, with other pixels m12, m13, m14, m22, m23, m24 turned OFF. If two (=N4) or more C ejection data do not exit, the S data at all sub-matrix pixels m11–m24 are turned OFF. In this way, the second-pass Bk data Ms4–Bk2 for Bk print data is determined.

Then, these S data Ms4–Y2, Ms4–M2, Ms4–C2, Ms4–Bk2 corresponding to Y, M, C and Bk inks are logically Summed to produce the final second-pass S data for all inks. While this example adopts N4=2, it is possible to use N4=3 or N4=4 depending on the characteristics of the printing property improving liquid and inks used.

Further, although in the above embodiment the generation of S data corresponding to Y and M print data uses the left sub-matrix for the first pass and the right sub-matrix for the second pass as the pixels of interest and the generation of S data corresponding to C and Bk print data uses the right sub-matrix for the first pass and the left sub-matrix for the second pass as the pixels of interest, either sub-matrix can be used. It is also possible to use different pixels of interest for different colors.

(Embodiment 17)

While in the preceding embodiments, the head 102 has a plurality of ink ejecting head portions and a printing property improving liquid ejecting head portion arranged in the main scan direction, other arrangements are also possible. For example, the plurality of ink ejecting head portions and the printing property improving liquid ejecting head portion may be arranged in the sub-scan direction.

Figure 38:
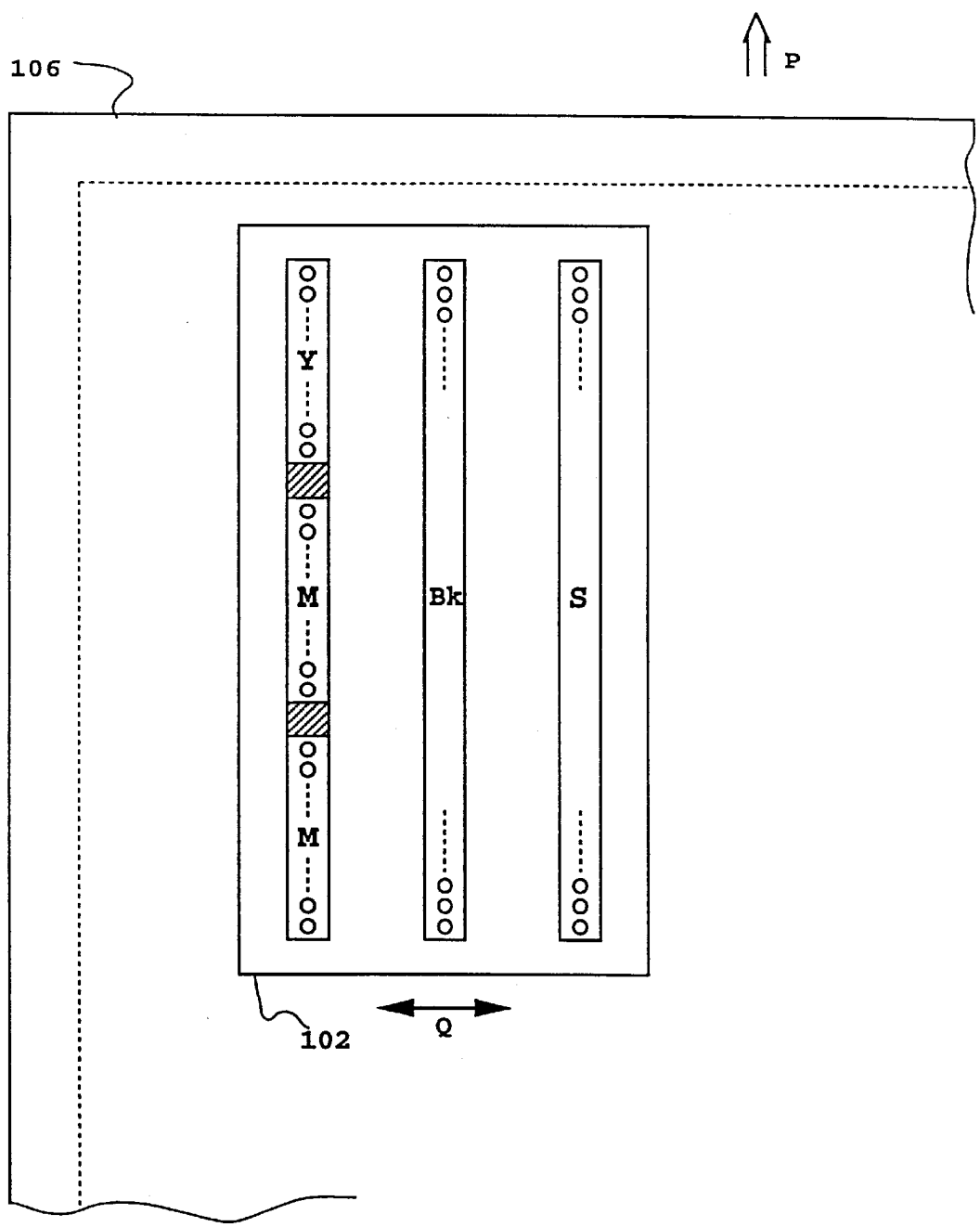
FIG. 38 is an explanatory illustration of a head in the seventeenth embodiment of the present invention.

FIG. 38 shows another configuration of the head 102, in which the Y, M and C ink ejecting head portions are arranged in the sub-scan direction (P) and in which the printing property improving liquid ejecting head portion and the Bk ink ejecting head portion are arranged in the main scan direction (Q). In this head 102, too, the relation between the ink and printing property improving liquid ejecting head portions and the print pixels is the same as that of the previous embodiments, except that the Y, M and C ink ejecting heads do not print on. the same print positions during the same main scan. Through a plurality of main scan operations and the feeding operations of the print medium 106 in the sub-scan direction, however, the ejecting of Y, M, C and Bk inks and printing property improving liquid S produces the same result on the pixels as in the head 102 as shown in FIG. 21 and therefore does not depend on the arrangement of the ink ejecting head portions and the printing property improving liquid ejecting head portion.

Although in the preceding embodiments the head 102 is provided with a heating body 30 as an electricity-heat conversion element, the inks and printing property improving liquid S may be ejected by using, for example, an electro-mechanical conversion element.

Figure 39:
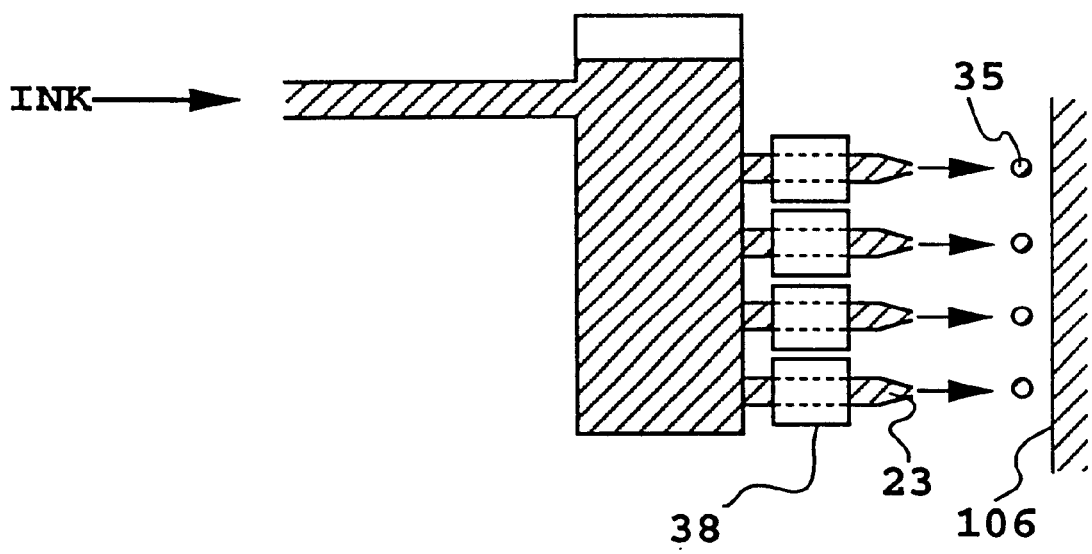
FIG. 39 is an explanatory illustration of the head in the modification of the seventeenth embodiment of the invention.

FIG. 39 shows an example configuration of the head that uses an electro-mechanical conversion element. Reference numeral 38 denotes a piezo-electric element as an electro-mechanical conversion element. In other aspects, any desired configuration may be employed.

While the preceding embodiments adopt a so-called multi-pass printing system in which the print inks are ejected on the same region of a printing medium by a plurality of scanning operation, the invention can be applied to the single pass printing system.

Figure 40:
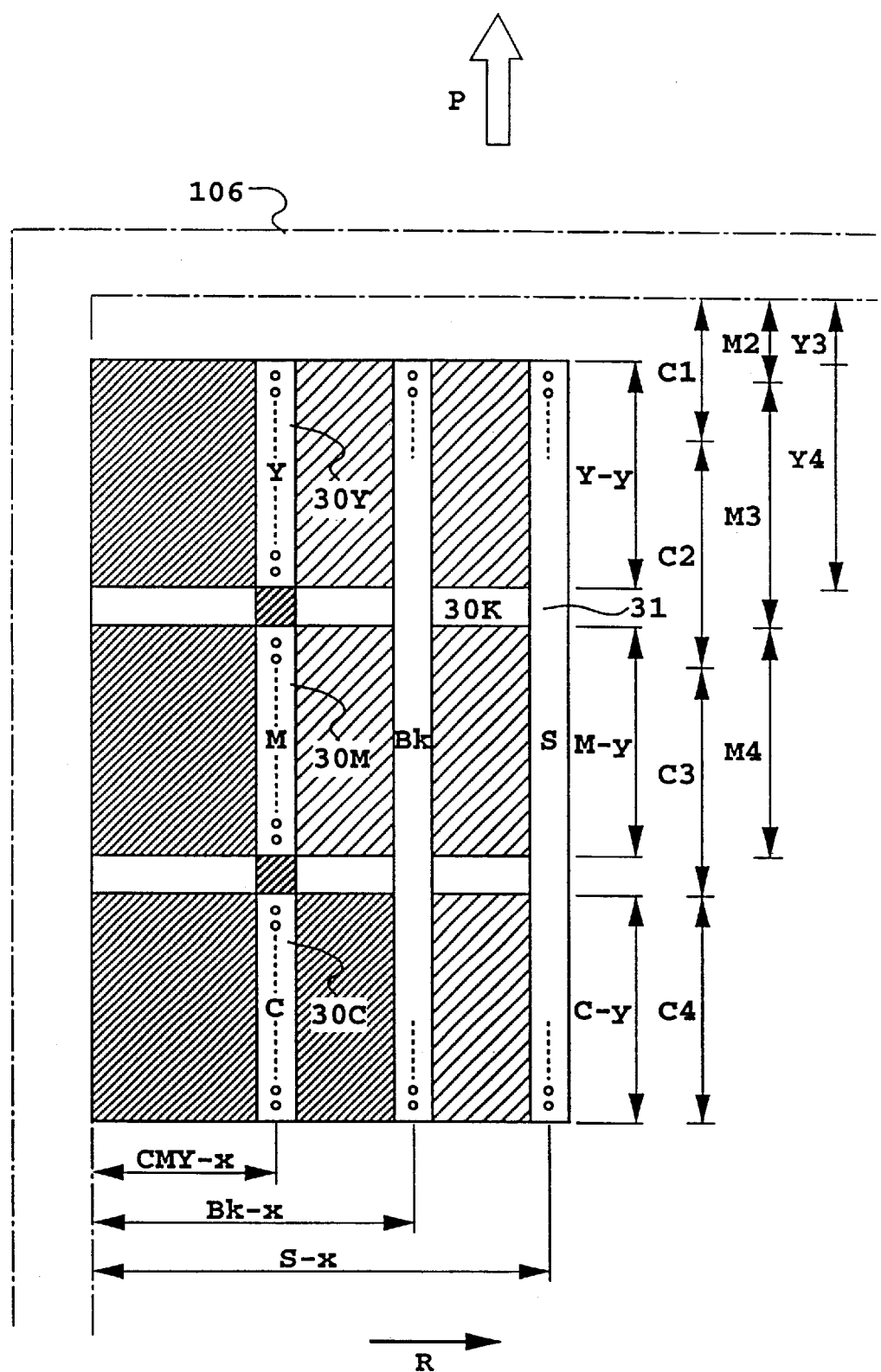
FIG. 40 is a diagrammatic illustration for explaining a printing process in a single path system of the present invention.

FIG. 40 shows the printing process of this embodiment.

When the printing operation is started, the head 31 ejects the printing property improving liquid onto the locations corresponding to the number of dots of each color ink, followed by the ejecting from the Bk head 30K, and then by the ejecting from the Y, M and C heads 30Y, 30M, 30C in that order successively. As a result, the S liquid and the Bk ink dots mix and become insoluble. Next, the S liquid and the Y, M and C ink dots mix together and become insoluble.

FIG. 40 shows the process in which the carriage mounting the head is performing a fourth main scan (or simply called a scan).

The printing operation is performed only toward the right as indicated by an arrow R and is not performed during the back scan toward the left. Dots of each ink are printed in a single scan over the same print region. That is, the printing is done in a single one-way pass.

In FIG. 40, the lengths denoted as C1–C4, M2–M4, and Y3 and Y4 represent the widths of the scan areas that are printed by the C head 30C, M head 30M and Y head 30Y during the n-th scan (in this example, n=1, 2, 3, 4) of the head unit 102. This shows that during the first scan at the start of printing, the area of width C1 is printed by ejecting from only a part of the nozzles of the C head 30C. At this time, it is needless to say that the S head 31 and the Bk head 30K also perform printing over the same scan area of the width C1 according to the ejection data. In the second and succeeding scans, too, the Bk head 30K prints the same area as that printed by the C head 30C, and the S head 31 prints the same area as that printed by the C, M and Y heads according to the ejection data.

During the second scan, the C head 30C prints a scan area of width C2 and the M head 30M prints a scan area of width M2. At this time, as can be seen from the drawing, the M head 30M prints an area (M2) partly overlapping the area (C1) printed by the C head 30C during the previous first scan.

During the third scan, the Y head 30Y joins other heads and performs printing over an area Y3. In the fourth scan, full width printing using the C, M and Y heads is performed for the first time.

FIG. 40 shows shaded the area being printed during the fourth scan.

That is, the Y head 30Y prints an area that measures CMY-x in the x direction (main scan direction) and. Y-y in the y direction (sub-scan direction). The M head 30M prints an area that measures CMY-x in the x direction and M-y in the y direction. The C head 30C prints an area measuring CMY-x in the x direction and C-y in the y direction. The Bk head 30K prints an area measuring Bk-x in the x direction and C-y in the y direction.

As mentioned above, the S head 31 ejects the printing property improving liquid over an area that overlaps the print regions of color inks in the main scan direction. As a result, the printing property improving liquid for the Y ink is ejected over an area measuring S-x in the x direction and Y-y in the y direction. For the M ink, the printing property improving liquid is ejected over an area measuring S-x in the x direction and M-y in the y direction. For C and Bk inks, the printing property improving liquid is ejected over an area measuring S-x in the x direction and C-y in the y direction.

The present invention achieves distinct effect when applied to a recording head or a recording apparatus which has means for generating thermal energy such as electro-thermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electro-thermal transducers, each disposed on a sheet or liquid passage that retains liquid (ink), and operates as follows: first, one or more drive signals are applied to the electro-thermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electro-thermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electro-thermal transducers is used as ejection orifices of the electro-thermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to arc add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electro-thermal transducers or a combination of other heater elements and the electro-thermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electro-thermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

Figure 41:
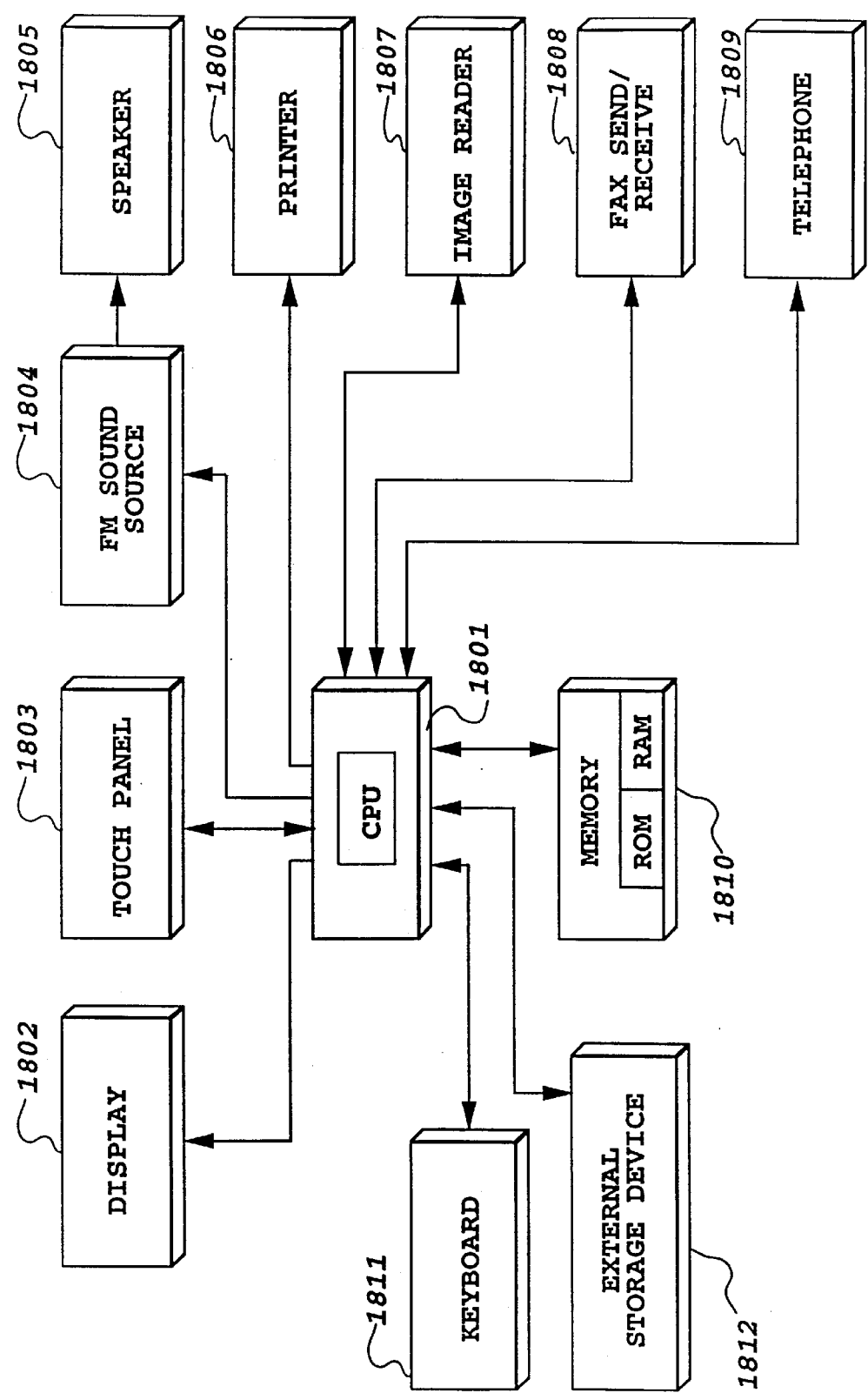
FIG. 41 is a block diagram showing one example of an information processing system employing the ink-jet printing apparatus according to the invention.

FIG. 41 is a block diagram showing general construction of an information processing apparatus having a function of word processor, personal computer, facsimile machine, a copy machine and so forth, to which the printing apparatus according too the present invention is applied.

In the drawings, a reference numeral 1801 denotes a control portion performing control of the overall apparatus, which includes CPU, such as microprocessor and so forth, and various I/O port, to perform control for outputting control signal or data signal and so forth to respective portions and inputting control signal or data signal from the respective portions. A reference numeral 1802 denotes a display portion having a display screen, on which various menu, document information and image or so forth read by an image reader 1807 are displayed. A reference numeral 1803 denotes a transparent pressure sensitive touch panel provided on the display portion 1802 for performing item entry or coordinate portion entry on the display portion 1802 by depressing the surface thereof by a finger or so forth.

A reference numeral 1804 denotes a FM (frequency modulation) sound source portion which stores music information produced by a music editor and so forth in a memory portion 1810 or an external memory 1812 and performs FM modulation by reading out the stored music information from the memory portion or so forth. An electric signal from the FM sound source portion 1804 is transformed into an audible sound by a speaker portion 1805. A printer portion 1806 is employed as an output terminal of the word processor, the personal computer, the facsimile machine, the copy machine and so forth, in which the printing apparatus according to the present invention is applied.

A reference numeral 1807 denotes an image reader portion for optoelectrically read out an original data for inputting, which is located at the intermediate position in an original feeding path and performs reading out various original document, such as original document for facsimile machine or copy machine. A reference numeral 1808 denotes a facsimile (FAX) transmission and reception portion for transmitting original data read by the image reader portion or for receiving transmitted facsimile signal, which facsimile transmission and reception portion has an external interface function. A reference numeral 1809 denotes a telephone machine portion having a normal telephone function and various associated functions, such as a recording telephone and so forth.

A reference numeral 1810 denotes a memory portion including a ROM storing a system program, a manager program, other application program and so forth, as well as character fonts, dictionary and so forth, a RAM for storing application program loaded from an external storage device 1812, document information, video information and so forth.

A reference numeral 1811 denotes a keyboard portion inputting document information or various commands. A reference numeral 1812 denotes the external storage device employing a floppy disc or hard disc drive as storage medium. In the external storage device 1812, document information, music or speech information, application program of the user and so forth are stored.

Figure 42:
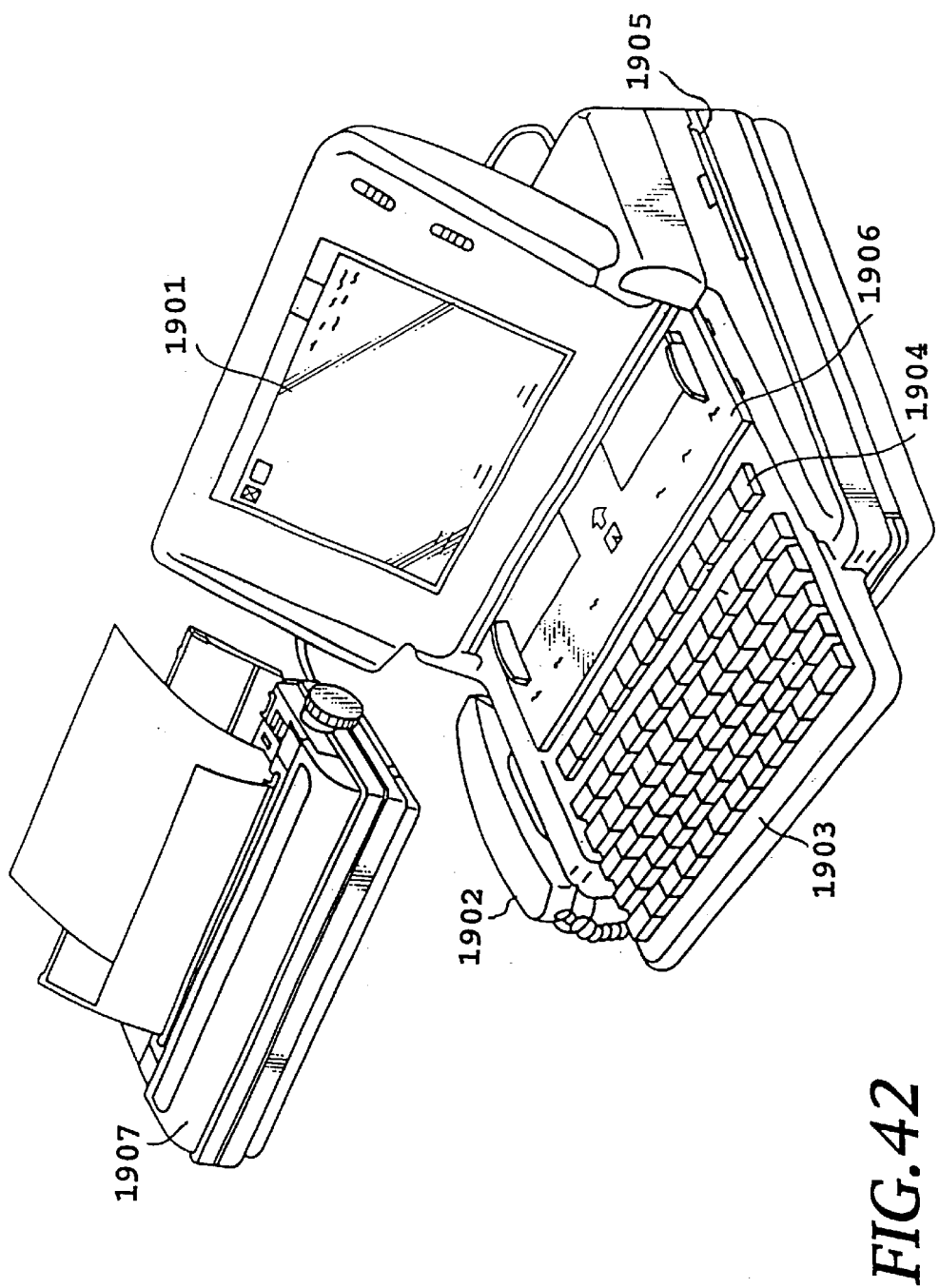
FIG. 42 is an external perspective view of the information processing system of FIG. 41.

FIG. 42 is a diagrammatic external view of the information processing system shown in FIG. 41.

In FIG. 42, a reference numeral 1901 denotes a flat panel display utilizing a liquid crystal and so forth. On this display, the touch panel 1803 is overlaid so that coordinate position input or item designation input can be performed by depressing the surface of the touch panel 1803 by a finger or so forth. A reference numeral 1902 denotes a handset to be used when a function as the telephone machine of the apparatus is used. A keyboard is detachably connected to a main body of the apparatus through a cable and adapted to permit entry of various document information or various data input. On the other hand, on the keyboard 1903, various function keys and so forth are arranged. A reference numeral 1905 denotes an insertion mouth of the external storage device 1812 for accommodating a floppy disk inserted thereinto.

A reference numeral 1906 denotes a paper stacking portion for stacking the original to be read by the image reader portion 1807. The original read by the image reader portion is discharged from the back portion of the apparatus. On the other hand, in facsimile reception, the received information is printed by the ink-jet printer 1907.

It should be noted that while the display portion 1802 may be a CRT, it is desirable to employ a flat display panel, such as a liquid crystal display employing a ferro-electric liquid crystal for capability of down-sizing and reduction of thickness as well as reduction of weight.

When the information processing apparatus as set forth apparatus is operated as the personal computer or the word processor, various information input through the keyboard portion 1811 is processed according to a predetermined program by the control portion 1801 and output as printed image by the printer portion 1806.

When the information processing apparatus is operated as a receiver of the facsimile machine, facsimile information input from the FAX transmission and reception portion 1808 via a communication network is subject reception process according to the predetermined program and output as received image by the printer portion 1808.

In addition, when the information processing apparatus is operated as a copy machine, the original is read by the image reader portion 1807 and the read original data is output to the printer portion as copy image via the control portion 1801. It should be noted that, when the information processing apparatus is used as the transmitter of the facsimile machine, the original data read by the image reader 1807 is processed for transmission according to the predetermined program by the control portion, and thereafter transmitted to the communication network via the FAX transmission and reception portion 1808.

Figure 43:
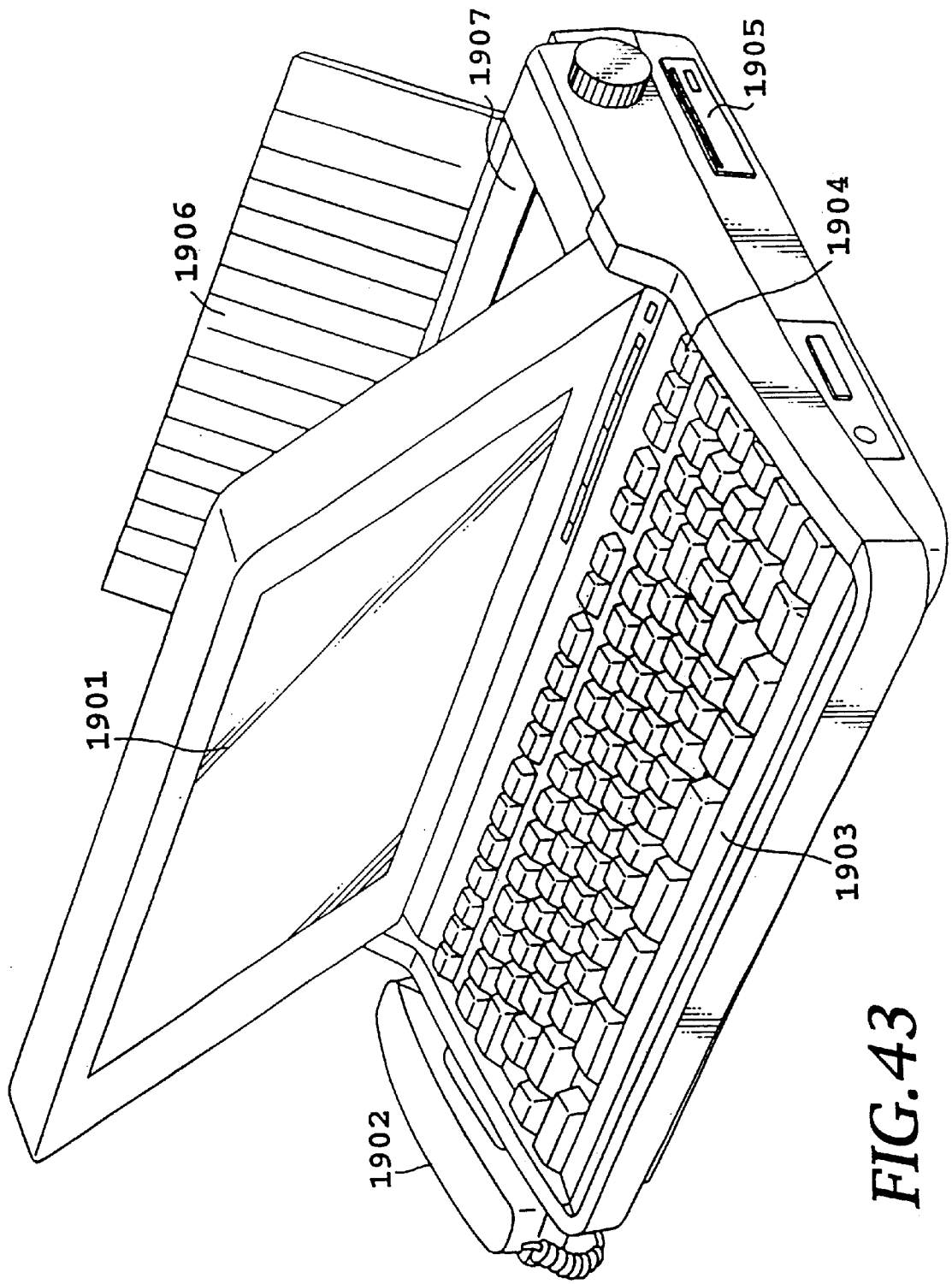
FIG. 43 is an external view showing another example of the information processing system employing the ink-jet printing apparatus according to the invention.

It should be noted that the information processing apparatus may be an integrated type incorporating the ink-jet printer within a main body as illustrated in FIG. 43. In this case, portability can be further improved. In FIG. 43, the portions having the same function to FIG. 42 are shown with the corresponding reference numerals.

As set forth above, a multi-function type information processing apparatus may obtain high quality printed image at high speed and low noise by employing the printing apparatus of the present invention. Therefore, the functions of the information processing apparatus can be further enhanced.

Under a growing trend for improving the functions of the ink jet printer on the part of the users, it is becoming an important task to prevent wrong use of consumables as much as possible. When considering the improvement of print quality by the mutual action between the print performance improvement liquid and ink or between inks, any wrong use of expendables has large adverse affects on the performance of the recovery means and print head. It is therefore important both for this invention and for the improvement of an independent tank structure to make consumables commonly usable among a variety of devices and to prevent their erroneous usage as much as possible.

The above objective can be achieved by an ink tank that can be mounted to the apparatus of this invention or used independently and which includes: a tank chamber accommodating an ink or a liquid containing at least a printing-property improving liquid applied to a print medium to improve the printing performance during ink jet printing; and a supply port to supply the ink or the liquid containing at least the printing property improving liquid from the tank chamber to the ink jet head. The ink tank also has a plurality of ink chambers integrally formed in one structure, with at least one of the ink chambers formed with a plurality of supply ports.

More specifically, in this ink tank, the ink used is a black ink, the printing property improving liquid contains cation matters of low molecular components and high molecular components, and the ink includes an anionic dyestuff.

Alternatively, the printing property improving liquid includes cationic matters of low molecular components and high molecular components, and the ink contains an anionic dyestuff or at least an anionic compound and pigment.

Another device that achieves the above objective is an ink jet cartridge that comprises an ink tank and an ink jet head. To describe in more detail, the ink tank comprises: a tank chamber accommodating an ink or a liquid containing at least a printing property improving liquid applied to a print medium to improve the printing performance during ink jet printing; a supply port to supply the ink or the liquid containing at least the printing property improving liquid from the tank chamber to the ink jet head; and a plurality of ink chambers integrally formed in one structure, with at least one of the ink chambers formed with a plurality of supply ports. The ink jet head comprises an ink ejecting head to eject the ink and a liquid ejecting head to eject the printing property improving liquid. The ink jet head is removably connected with the ink tank.

In the following descriptions, the "liquid-resistance structure," as can be seen from the succeeding embodiments, includes any structure that virtually blocks the supply or reception of liquid, such as a structure which provides a capping or other sealing structure to a pipe that receives an ink (for cost reduction of the tank side, it is normally desirable that the liquid-resistance structure be provided on the head side), a structure which provides a capping or sealing structure to the ink supply portion of the tank, or a structure which prevents unnecessary liquid from being received in the ink tank.

Such a configuration makes it possible to change the functional characteristics without unduly increasing the number of kinds of consumables and therefore to provide a group of ink jet printers and a group of ink tanks, whose print speed and relation between print quality and cost can be modified according to users' demands.

In this way, rather than storing in separate tanks the printing property improving liquid and the ink containing visible coloring substances for recording, the above construction accommodates the liquid and the ink in an integrally combined ink tank. This integral structure of the ink tank offers the advantage of eliminating the chance of attaching a wrong tank to the head as might occur in the present user environment where separate tanks are used for different color inks.

Particularly, in the case of FIG. 12, in which the head has a head portion or ink receiving portion that accepts two tanks of the same color, there is a possibility that the printing property improving liquid tank may be erroneously mounted to where another same ink (black) tank should be attached. The integrally structured tank, however, prevents such erroneous mounting.

Figure 44:
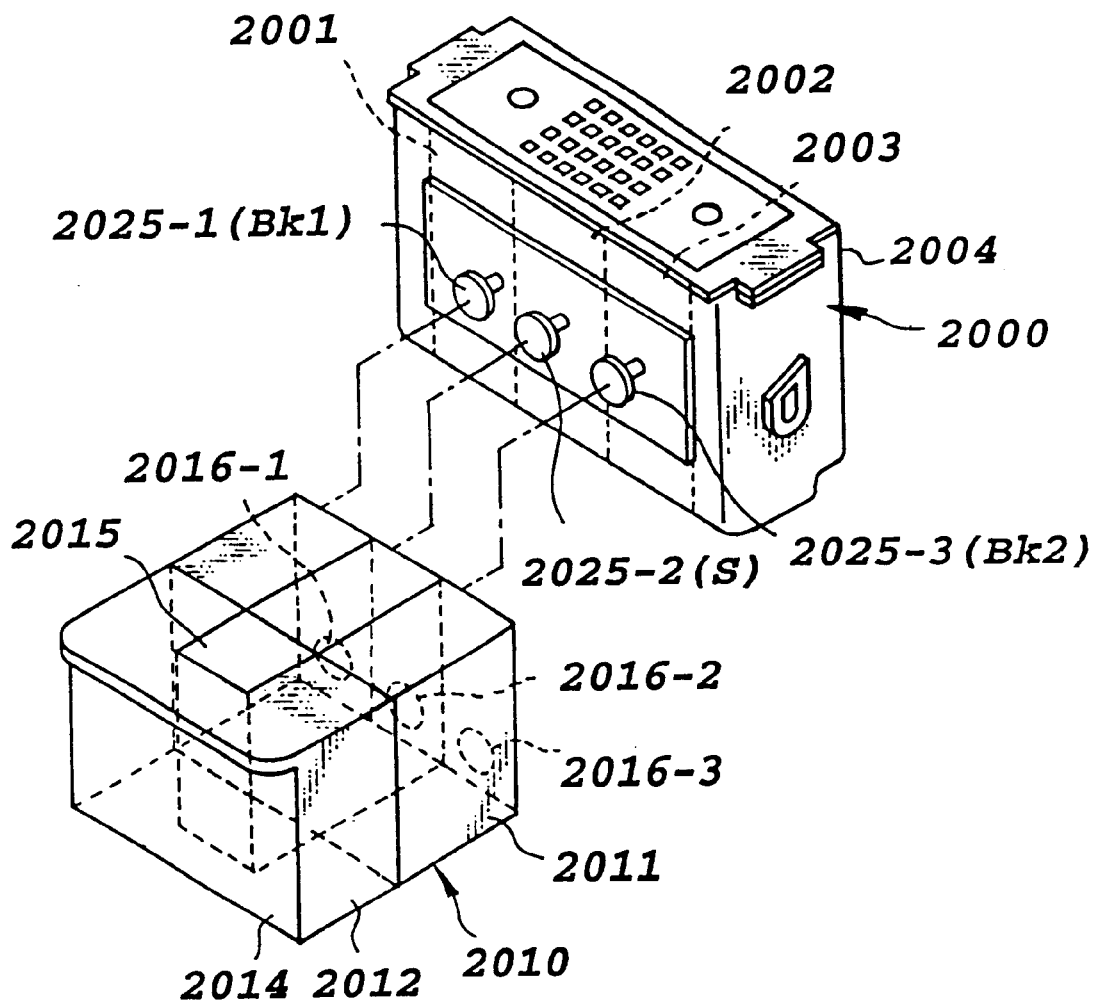
FIG. 44 is a perspective view showing a monochrome printing head unit 1 which is used in FIG. 12.

FIG. 44 shows a perspective view of an ink jet cartridge (consisting of a head unit and an ink tank) of a kind that is shown in FIG. 12. A head unit 2000 and a tank 2010 are removably connected. When an ink volume detection mechanism not shown finds that the ink is running out, it prompts the user, through the device body, to replace the tank.

The tank 2010 connected to the head unit 2000 is divided into a plurality of chambers, as shown in FIG. 44. One of the chambers 2011 accommodates a sponge (it has a buffer chamber filled with air which does not contain a sponge and is communicated with an open air), and another chamber 2012 accommodates a liquid ink (or raw ink). A single tank 2010 can accommodate two kinds of ink (a black ink 2014 and a printing property improving liquid 2015). The black ink 2014 are accommodated symmetrically on the left and right sides of the center of the tank, with the printing property improving liquid 2015 received at the central portion of the tank. The tank 2010 has three ink supply ports 2016-1, 2016-2, 2016-3 communicating to the chamber 2011 where a sponge is installed. The supply ports 2016-1, 2016-2, 2016-3 receive mesh filters 2025-1, 2025-2 and 2025-3. The ink supply is performed as follows. The filters 2025-1, 2025-2 and 2025-3 of the head 2000 are inserted through the supply ports 2016-1, 2016-2 and 2016-3 until their front ends contact the sponges in the tank 2010. By activating the recovery means not shown, the ink and liquid are pumped by suction through one supply port at a time successively or through three supply ports simultaneously to supply the ink and liquid to the head.

Ink can be held in the ink tank in a variety of ways. For example, an ink absorbing body may be installed in a part of the tank as in this example. The ink accommodating portion may be filled entirely with the ink absorbing body. Conversely, rather than using the ink absorbing body like a sponge, it is possible to use an ink bag acted upon by a spring force.

The ink tank of this embodiment is characterized in that the black ink is supplied commonly from the ink chamber accommodating the black ink to two ink jet heads through two supply ports. If there is no need to provide ink tanks that are applicable for ink jet printers which are designed to have a wide range of functional expandability as in this embodiment, the above-mentioned black ink tank may be divided into separate tanks so that they can be replaced independently. When, for example, we consider developing an ink jet printer that places more importance on the cost than on the print speed or quality, a conceivable solution may be combining expensive print heads into one. In this case too, the ink tank of this embodiment can be applied. If in this case the separately replaceable ink tanks are used, it is apparent that they can be applied commonly to the above two types of ink jet printers. Such separate ink tanks, however, have a smaller storage volume of ink than the ink tank of this embodiment, which commonly supplies the black ink to a plurality of heads through a plurality of supply ports formed in the ink tank. This in turn significantly increases the frequency that the user has to replace the ink tank. Therefore, in designing ink tanks that can be commonly applied to different types of ink jet printers, it is obvious that the structure having a plurality of supply ports formed in one ink tank so as to be applicable to different types of print heads, as in this embodiment, has a clear advantage.

The ink tank of this embodiment is also characterized in that the ink tank containing the printing property improving liquid is formed integral with the ink tank for the black ink. The printing property improving liquid in this invention is supposed to exhibit its effect by reacting with an ordinary ink on a print medium. If the reaction of the printing property improving liquid is made to occur in the ink jet print head or in the ink tank, significant degradation in the printing performance as well as operation failures will result. In the ink jet printers of this embodiment, the ink jet head for ejecting the printing property improving liquid is set at the second position from the left. Hence, with the integral type ink tank of this embodiment accommodating the black ink and the printing property improving liquid, the liquid is automatically placed at its correct mounting position, so that the printing property improving liquid is prevented from being applied to a wrong ink jet head. This integral tank structure also makes it practically impossible for the normal ink such as black ink to be mounted to where the printing property improving liquid should be applied.

Ink tanks that integrally accommodate a plurality of inks and prevent erroneous mounting have been proposed and put into practical use. These ink tanks, however, are designed simply to prevent mixing of different colors. Color inks, if mixed, can be separated. The ink tank of this embodiment is designed to prevent reaction between the ink and the printing property improving liquid, which, once occurred, is irreversible. This embodiment offers a far greater advantage than the conventional similar tanks.

Figure 45A:
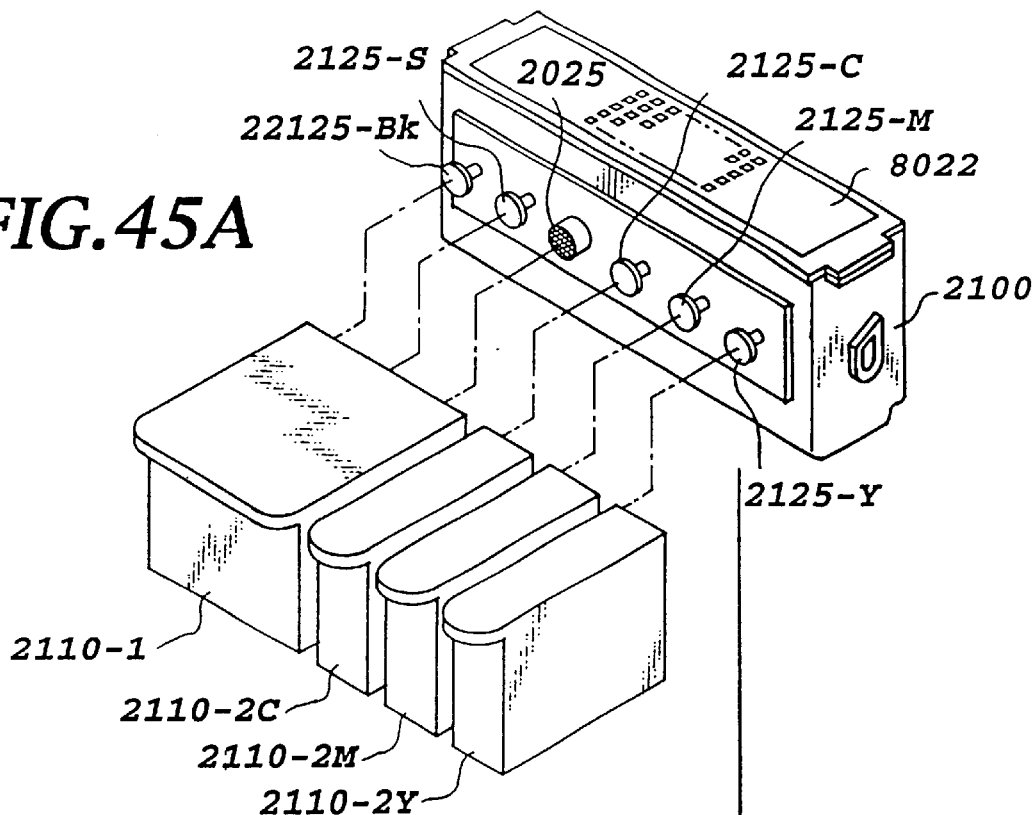
FIGS. 45A and 45B are exploded views showing a carriage portion in a color ink jet printing apparatus which is used in embodiment 2, respectively.
Figure 45B:
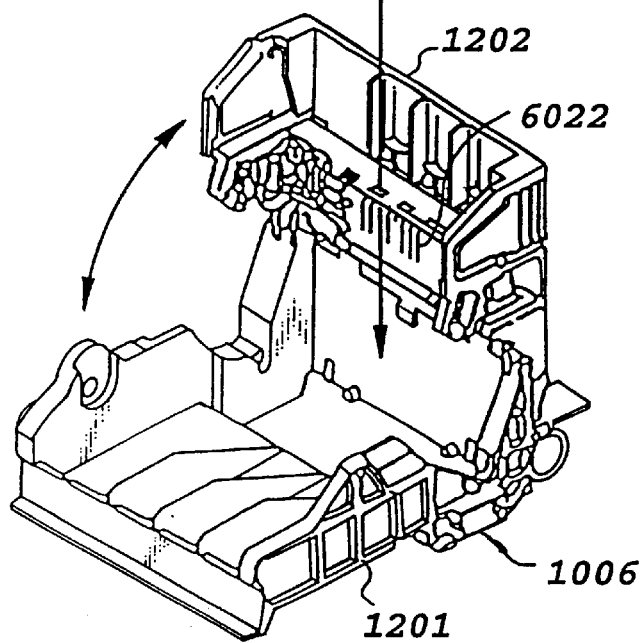

The color ink jet printer mounting the color ink jet heads described above will be explained briefly. FIGS. 45A and 45B are enlarged views showing the carriage and its associated components in the ink jet printer.

On the carriage 1006 can be mounted a print head unit 2100 and ink tanks 2110-1, 2 that supply inks to the print head 2100. The carriage 1006 comprises mainly a carriage base 1201 on which to mount the print head unit 2100 and the ink tanks 2110, and a head lever 1202 for holding the print head unit 2100. The print head unit 2100 is provided at its top with a connector 8022 that receives signals and wires for performing the drive control on the print head. When the print head unit 2100 is mounted on the carriage 1006, the connector 8022 is electrically connected to a connector 6022 provided on the carriage 1006.

The tank 2210-1 (for black ink and S liquid) in FIG. 45 is similar to the tank in FIG. 44, and its explanation is omitted. Further, the tanks 2210-2C, 2M, 2Y are similar to those in FIG. 44 and their explanations are not given. Although the tank 2210-1 (for Bk and S) in this example is similar to the one used in the previous embodiment, it is mounted on two head chips. Hence, the head unit 2100 is provided with a cover 2105. This head can not only be used for the "BK+S" print mode explained earlier but also use the same tank as that of FIG. 44.

Figure 46:
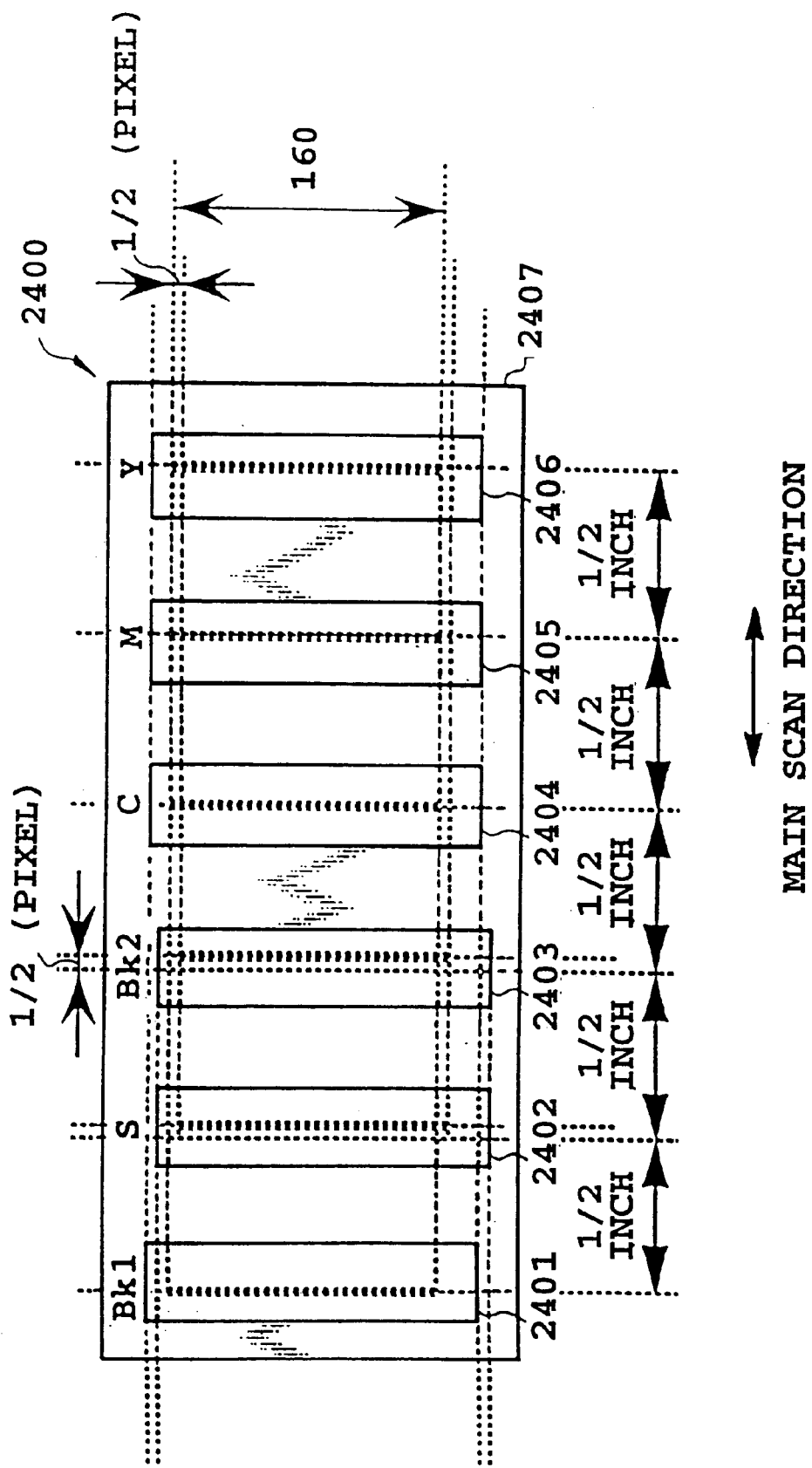
FIG. 46 is a plan view showing a color printing head unit shown in FIG. 45A.
Figure 48A:
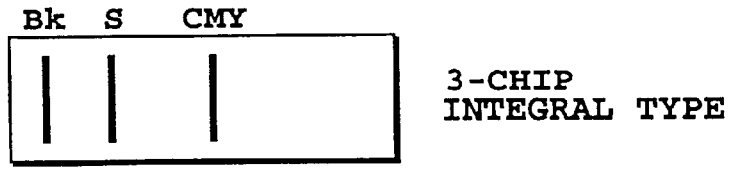
FIGS. 48A, 48B and 48C are drawings showing examples of separate type heads in another embodiment according to the present invention, respectively.
Figure 48B:
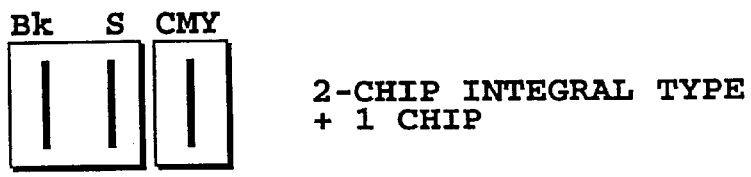
Figure 48C:
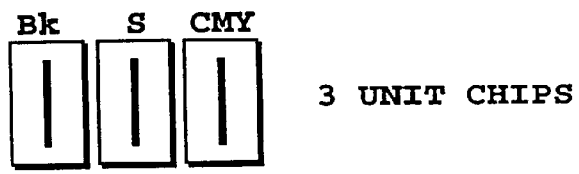
Figure 49A:
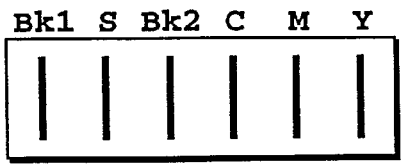
FIGS. 49A, 49B, 49C and 49D are drawings showing examples of separate type heads in another embodiment according to the present invention, respectively.
Figure 49B:
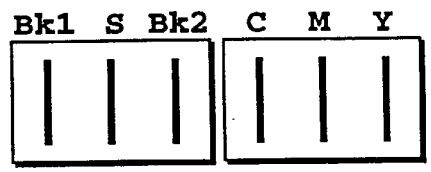
Figure 49C:
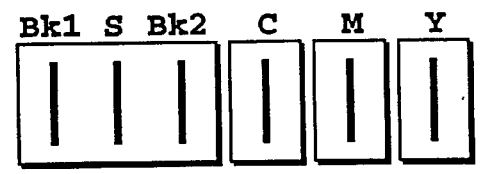
Figure 49D:
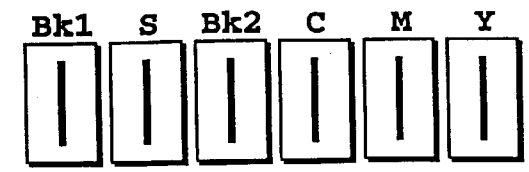

FIG. 46 shows the configuration of a color head unit 2400 that can be used in FIGS. 44, 45A and 45B. The unit comprises a Bk1 chip 2401, an S (printing property improving liquid) chip 2402, a Bk2 chip 2403, a C chip 2404, an M chip 2405 and a Y chip 2406. These chips are arranged on the frame 2307 at a ½-inch pitch and are so tilted as to be corrected for the drive timing. The Bk2 chip is shifted in the X and Y direction with respect to the Bk1 chip and other chips by a half pixel of 360 dpi. This is intended to enable the 720 dpi printing to be performed in one pass because of the half-pixel shift between Bk1 and Bk2.

To produce optimum 360/720 dpi images at high speed, two heaters are arranged parallelly in each nozzle and are independently driven so that three volumes of ink 70/45/25 (pl) can be ejected from a single chip for Bk1 and Bk2 and that three volumes 40/25/15 (pl) can be ejected from a single chip for S C, M and Y. The structures of the nozzle and heater are shown in FIGS. 16A to 16C. In the liquid path communicating to each nozzle, two heaters, one large and one small, are parallelly arranged as shown in FIGS. 16A, 16B and 16C. By sending signal wave-forms to the heater board of FIG. 21, it is possible to select from among large, medium and small volume of ink.

FIGS. 47A to 47C and 48A to 48C (as well as 49A to 49D) show chip arrangements that receive an integral type ink tank which has a predetermined interval between the ink supply portions. Although the head portion structures may differ, the ink receiving portions of the chips are spaced at an interval equal to that of the ink supply portions of the integral type ink tank. The head that receives only a unit type ink tank need only correspond to the reaction color liquid of the ink supply portion. The structure of the liquid receiving portion is not shown. See the preceding embodiment for reference. The interval between the liquid receiving portions need only match the interval between the ink supply portions of the integral type ink tank as it is mounted on the carriage). With this common structure of the ink tank, it is possible to lower the cost of the ink tank. At the same time, because the liquid-proof structure of each head portion can obviate unnecessary ink structure, the life of the head can be extended.

By applying the printing apparatus of this invention to the multi-function type information processing device, it is possible to produce high-quality printed images at high speed and with low noise and therefore to further improve the function of the information processing device.

With this invention, it is possible to prevent degradation of image quality caused by the differing ejecting orders of the ink and the printing property improving liquid or by variations of time elapsed between the ejection of ink and liquid, thereby forming an image with good uniformity and color development.

This invention can therefore provide an ink jet printing method which can produce printed images with high density, with no density variations and with good water resistance. The invention can also provide an ink jet printing apparatus which can produce excellent print images without increasing the power supply capacity or lowering the printing speed.

When a plurality of printing operations are performed over the same print region, because this invention determines the mode of applying the liquid containing at least a printing property improving liquid in each printing operation according to the mode of applying ink, it is possible with this invention to keep the amount of liquid applied to the minimum required level and therefore produce high-quality print images with improved water resistance and light resistance, with reduced feathering and bleeds among colors, and with good color development and print density.

The present invention has been described in detail with respect to preferred embodiments, and it will now be that changes and modifications may be made without departing from the invention in its broader aspects, and it is the invention, therefore, in the appended claims to cover all such changes and modifications as fall within the true spirit of the invention.

What is claimed is:

1. An ink jet printing apparatus for ejecting an ink from an ink ejecting portion and a liquid from a liquid ejecting portion, comprising:
   ink ejection data setting means for separately setting ink ejecting data for ejecting the ink from the ink ejecting portion;
   liquid ejection data setting means for separately setting liquid ejecting data for ejecting the liquid from the liquid ejecting portion, in accordance with a setting manner different from a setting manner used by said ink ejection data setting means; and
   an ejection controller for ejecting the ink from the ink ejecting portion and the liquid from the liquid ejecting portion onto a recording medium, based on the ink ejecting data and the liquid ejecting data, respectively,
   wherein the liquid comprises a printing property improving liquid for improving at least one printing property of the ink ejecting portion,
   wherein the ink ejecting data and the liquid ejecting data correspond to image data for recording an image on the recording medium,
   wherein the ink ejecting portion and the liquid ejecting portion are moved across the recording medium, and the ink and the liquid are ejected thereon such that the liquid is ejected onto at least part of the same area on the recording medium where the ink is also ejected, and
   wherein the liquid ejection data setting means sets the liquid ejecting data so that a ratio of the number of printed pixels to which the liquid is ejected to a total number of printed pixels is less than 100%.

2. An ink jet printing apparatus as claimed in claim 1, wherein, for each pass of the ink ejecting portion and the liquid ejecting portion across the recording medium, the logical product of the liquid ejecting data per pixel is zero.

3. An ink jet printing apparatus as claimed in claim 1, wherein the ink ejecting portion ejects a plurality of inks.

4. An ink jet printing apparatus as claimed in claim 3, wherein, for each pass of the ink ejecting portion and the liquid ejecting portion across the recording medium, the logical product of the liquid ejection data per pixel is zero for each ink of the plurality of inks.

5. An ink jet printing apparatus as claimed in claim 3, wherein the ink ejecting portion ejects four inks, and wherein the liquid ejection data setting means sets the liquid ejecting data so that a ratio of the number of printed pixels to which the liquid is ejected to a total number of printed pixels is kept constant for each ink of the plurality of inks.

6. An ink jet printing apparatus as claimed in claim 5, wherein the ratio is 25% or less.

7. An ink jet printing apparatus as claimed in claim 5, wherein the ratio is 25%.

8. An ink jet printing apparatus as claimed in claim 3, wherein the ink ejecting portion ejects at least yellow, magenta and cyan inks for forming a printed pixel having a secondary color of red, green or blue, and wherein the liquid ejection data setting means sets the liquid ejecting data so that a ratio of the printed pixels to which the liquid is ejected to a total number of printed pixels is held constant for each of the yellow, magenta, and cyan inks.

9. An ink jet printing apparatus as claimed in claim 8, wherein the ratio is 25% or less.

10. An ink jet printing apparatus as claimed in claim 8, wherein the ratio is 25%.

11. An ink jet printing apparatus as claimed in claim 3, wherein a first colored ink is ejected at least once onto the recording medium, the printing property improving liquid is applied at least once to at least part of the same area on the recording medium where the first colored ink is ejected, and a second colored ink is ejected at least once onto at least part of the same area on the recording medium where the printing property improving liquid is ejected.

12. An ink jet printing apparatus as claimed in claim 3, wherein an area on the printing medium is printed by applying at least one of a plurality of inks, wherein an image pixel printed on the recording medium comprises a first layer on the recording medium, a printing property improving liquid layer superposed on the first ink layer, and a second ink layer superposed on the printing property improving liquid layer.

13. An ink jet printing apparatus as claimed in claim 3, wherein an area on the printing medium is printed by applying at least one of a plurality of inks, and wherein relative times between a time when the printing property improving liquid contacts the printing medium and a time when the at least one of the plurality of inks contacts the printing medium are different.

14. An ink jet printing apparatus as claimed in claim 3, wherein the printing is performed while performing a main scanning of the recording medium for reciprocally scanning the ejecting portions in reciprocal main scanning directions and performing an auxiliary scanning for conveying the printing medium in a perpendicular direction to the main scanning directions, wherein the ink ejection is performed by the ink ejecting portion in the reciprocal main scanning directions, and the printing property improving liquid ejection is performed by the liquid ejecting portion in one of the reciprocal main scanning directions.

15. An ink jet printing apparatus as claimed in claim 1, wherein the printing property improving liquid contains cationic substances as low and high molecular weight components, and the ink contains an anionic dyestuff.

16. An ink jet printing apparatus as claimed in claim 1, wherein the printing property improving liquid contains cationic substances as low and high molecular weight components, and the ink contains at least an anionic compound and pigment.

17. An ink jet printing apparatus as claimed in claim 1, wherein the ink ejecting portion and the liquid ejecting portion eject the ink and the liquid, respectively, by utilizing thermal energy, and wherein the ejecting portions include a thermal energy transducer for generating thermal energy to be given to the ink and the liquid.

18. An ink jet printing method for ejecting an ink from an ink ejecting portion and a liquid from a liquid ejecting portion, comprising the steps of:

separately setting ink ejecting data for ejecting the ink from the ink ejecting portion;

separately setting liquid ejecting data for ejecting the liquid from the liquid ejecting portion, in accordance with a setting manner different from a setting manner used in said step of setting ink ejecting data; and controllably ejecting the ink from the ink ejecting portion and the liquid from the liquid ejecting portion onto a recording medium based on the ink ejecting data and the liquid ejecting data, respectively, wherein the liquid comprises a printing property improving liquid for improving at least one printing property of the ink ejecting portion, wherein the ink ejecting data and the liquid ejecting data correspond to image data for recording an image on the recording medium, and wherein the ink ejecting portion and the liquid ejecting portion are moved across the recording medium, and the ink and the liquid are ejected thereon such that the liquid is ejected onto at least part of the same area on the recording medium where the ink is also ejected, and wherein the liquid ejection data setting means sets the liquid ejecting data so that a ratio of the number of printed pixels to which the liquid is ejected to a total number of printed pixels is less than 100%.

19. An ink jet printing apparatus for ejecting ink onto a recording medium from an ink ejecting portion and for applying a liquid containing at least a printing property improving liquid for improving a printing property from a liquid ejecting portion, wherein to form an initial pixel, the liquid ejecting portion first applies the printing property improving liquid at least once onto the recording medium and the ink ejecting portion then ejects, immediately after application of the printing property improving liquid, ink at least once to the same area on the printing medium where the printing property improving liquid is applied, and wherein at least one subsequent pixel is formed by repeating the application by the liquid ejecting portion and the ejecting by the ink ejecting portion.

20. An ink jet printing apparatus as claimed in claim 19, wherein the ink ejecting portion prints at least one time with the colored ink on a position where the printing property improving liquid is applied or a position where the colored ink comes in contact with at least a part of the position where the printing property improving liquid is applied, wherein the liquid ejecting portion applies the printing property improving liquid at a pixel where the colored ink is printed or a position where the printing property improving liquid comes in contact with at least part of the pixel printed with the colored ink, wherein the ink ejecting portion prints with the colored ink at a printing property improving liquid applied position where the colored ink comes in contact with at least part of the printing property improving liquid applied position, and wherein a series of applications by the liquid ejecting portion and printing by the ink ejecting portion is repeated at least one time at a separate location to form at least one subsequent pixel.

21. An ink jet printing apparatus as claimed in claim 19, wherein said ink jet head further includes an electrical-thermal transducer as an energy generating element for generating thermal energy which causes the colored ink or the printing property improving liquid to induce a phenomenon of film boiling.

* * * * *

UNITED STATES PATENT AND TRADEMARK OFFICE
CERTIFICATE OF CORRECTION

PATENT NO.    : 6,267,476 B1
DATED         : July 31, 2001
INVENTOR(S)   : Masao Kato et al.

It is certified that error appears in the above-identified patent and that said Letters Patent is hereby corrected as shown below:

<u>Title page,</u>
Item [56], References Cited,
U.S. PATENT DOCUMENTS, "Uchiyama" should read -- Uchiyama et al. --; and
FOREIGN PATENT DOCUMENTS, "01114450" should read -- 1-114450 --.

Item [30], Foreign Application Priority Data, "Feb. 19, 1995" should read
-- Feb. 13, 1995 --.

<u>Column 1,</u>
Line 10, "obtain" should read -- obtain a --;
Line 17, "of" should be deleted;
Line 18, "apparatus" should read -- apparatuses --;
Line 21, "appliance," should read -- appliances, -- and "as" should read -- as a --;
Line 35, "obtain" should read -- obtain a --; and
Line 40, "case" should read -- cases --.

<u>Column 3,</u>
Line 1, "followings" should read -- following -- and "discussion" should read
-- discussions --;
Line 19, "becomes" should read -- become --;
Line 32, "be" should read -- been --; and
Line 60, "reason." should read -- reasons. --.

<u>Column 5,</u>
Line 15, "colors" should read -- color --; and
Line 22, "colors" should read -- color --.

<u>Column 6,</u>
Line 5, "colors" should read -- color --.

<u>Column 10,</u>
Line 14, "liquid, is applied" should read -- liquid is applied, --.

<u>Column 13,</u>
Line 7, "and" should be deleted; and
Line 63, "colored" should read -- colored ink --.

UNITED STATES PATENT AND TRADEMARK OFFICE
CERTIFICATE OF CORRECTION

PATENT NO.     : 6,267,476 B1
DATED          : July 31, 2001
INVENTOR(S)    : Masao Kato et al.

It is certified that error appears in the above-identified patent and that said Letters Patent is hereby corrected as shown below:

Column 17,
Line 67, "inks." should read -- ink. --.

Column 18,
Line 35, "contain," should read --contain--; and
Line 40, "utilizing." should read -- utilizing --.

Column 19,
Line 5, "each" should read -- each of the --;
Line 10, "of" should be deleted;
Line 55, "or" should read -- or a --;
Line 59, "chamber" should read -- chambers --;
Line 63, "and" should read -- and an --; and
Line 65, "thirty" should read -- twenty --.

Column 21,
Line 1, "integrate" should read -- integrated --;
Line 4, "number" should read -- a number --;
Line 19, "can" should read -- and can --;
Line 32, "for" should be deleted;
Line 34, "are" should read -- is --; and
Line 49, "finally" should read -- final --.

Column 22,
Line 21, "products" should read -- product --.

Column 24,
Line 53, "other" should read -- another --; and
Line 54, "unnecessary" should read -- unnecessarily --.

Column 25,
Line 3, "in" should read -- in the --;
Line 4, "cycle" should read -- cycles --; and
Line 8, "cycle" should read -- cycles --.

UNITED STATES PATENT AND TRADEMARK OFFICE
CERTIFICATE OF CORRECTION

PATENT NO.    : 6,267,476 B1
DATED         : July 31, 2001
INVENTOR(S)   : Masao Kato et al.

It is certified that error appears in the above-identified patent and that said Letters Patent is hereby corrected as shown below:

Column 26,
Line 22, "the" (second occurrence) should read -- they --;
Line 53, "amount" should read -- the amount --;
Line 65, "highly" should read -- a highly -- and "image," should read --image.--; and
Line 66, "by" should read -- by a --.

Column 27,
Line 26, "number number scanning cycles," should read -- number scanning cycles number, --.

Column 29,
Line 42, "that" should read -- of --;
Line 55, "printed are" should read -- printed,--; and
Line 61, "overlaps" should read -- overlapped --.

Column 30,
Line 5, "results" should read -- result --;
Line 28, "in" should read -- the --;
Line 40, "show" should read -- shows --; and
Line 45, "forth," should read -- forth. --.

Column 31,
Line 65, "as" should read -- as a --.

Column 32,
Line 66, "head" should read -- heads --.

Column 33,
Line 13, "a" should read -- an --;
Line 43, "term" should read -- terms --;
Line 48, "of" should read -- when --; and
Line 65, "make" should read -- make it --.

Column 34,
Line 13, "thinning" should read -- a thinning --.

Column 35,
Line 41, "property improving" (second occurrence) should be deleted; and
Line 42, "uid" should read -- uid, then the printing ink, then the printing property improving liquid --.

UNITED STATES PATENT AND TRADEMARK OFFICE
CERTIFICATE OF CORRECTION

PATENT NO.    : 6,267,476 B1
DATED         : July 31, 2001
INVENTOR(S)   : Masao Kato et al.

It is certified that error appears in the above-identified patent and that said Letters Patent is hereby corrected as shown below:

Column 38,
Line 53, "droplet" should read -- droplets --.

Column 39,
Line 22, "in" should read -- in a --.

Column 40,
Line 31, "an" should be deleted;
Line 40, "roller-corporated" should read -- roller corporated -- and "rotate" should read -- rotated --;
Line 41, "of" should read -- of the --;
Line 51, "by" should read -- by the --; and
Line 67, "in" should read -- in the --.

Column 41,
Line 4, "in" should read -- in the --.

Column 42,
Line 2, "beobtained." should read -- be obtained. --;
Line 17, "cycle, most" should read -- cycles, most of the -- and "are" should read -- is --; and
Line 66, "agent" should read -- agents --.

Column 43,
Line 1, "pigment." should read -- pigment --;
Line 8, "to" should read -- to the --;
Line 21, "head" should read -- heads --;
Line 36, "of" should read -- of the --;
Line 37, "forth" should read -- a fourth --; and
Line 55, "complete" should read -- completes --.

Column 44,
Line 9, "head" should read -- heads --;
Line 24, "corresponding.to" should read -- corresponding to --; and
Line 27, "forth" should read -- a fourth --.

UNITED STATES PATENT AND TRADEMARK OFFICE
CERTIFICATE OF CORRECTION

PATENT NO.    : 6,267,476 B1
DATED         : July 31, 2001
INVENTOR(S)   : Masao Kato et al.

It is certified that error appears in the above-identified patent and that said Letters Patent is hereby corrected as shown below:

Column 45,
Line 19, "oath." should read -- pass. --;
Line 24, "34D and" should read -- and 34D --;
Line 26, "in" should read -- in the --;
Line 31, "to" should read -- to as --; and
Line 41, "occasionally)," should read -- occasions), --.

Column 46,
Line 6, "are" should read -- is --;
Line 21, "are" should read -- is --;
Line 38, "occasionally)," should read -- occasions), --;
Line 40, "are" should read -- is --; and
Line 57, "is" should read -- are --.

Column 47,
Line 4, "then" should read -- then be --;
Line 5, "proves" should read -- provide --;
Line 8, "shown-embodiment," should read -- shown embodiment, --;
Line 12, "secondpass." should read -- second pass. --;
Line 26, "results" should read -- result --;
Line 39, "is" should read -- are --;
Line 41, "ejected)" (second occurrence) should read -- ejected). --;
Line 46, "portion" should read -- portions --; and
Line 50, "is." should read -- is --.

Column 48,
Line 3, "liquid" should read -- liquid be --;
Line 9, "since" should be deleted;
Line 19, "of" (second occurrence) should be deleted;
Line 20, "of" should be deleted;
Line 24, "100%" should read -- 100%. --;
Line 29, "in" should read -- in a --;
Line 31, "large" should read -- a large --;
Line 32, "degrade" should read -- degrades --; and
Line 35, "is" should be deleted.

Column 49,
Line 21, "improvingliquid." should read -- improving liquid. --;
Line 33, "sum" should read -- sum --; and
Line 42, "deviations-in" should read -- deviations in --.

UNITED STATES PATENT AND TRADEMARK OFFICE
CERTIFICATE OF CORRECTION

PATENT NO.    : 6,267,476 B1
DATED         : July 31, 2001
INVENTOR(S)   : Masao Kato et al.

It is certified that error appears in the above-identified patent and that said Letters Patent is hereby corrected as shown below:

Column 51,
Line 16, "styreneacrylic" should read -- styrene acrylic --;
Line 23, "produced. (composition of yellow dispersing" should read -- produced. ¶ (Composition of Yellow Dispersing --;
Line 24, "element)" should read -- Element) --; and
Line 47, "Colored-dispersing" should read -- Colored Dispersing --.

Column 52,
Line 46, "to" (first occurrence) should be deleted.

Column 53,
Line 2, "when" should read -- when an --; and
Line 12, "also" should read -- also be --.

Column 54,
Line 9, "sum" should read -- summed --.

Column 55,
Line 12, "m14m21," should read -- m14, m21, --; and
Line 22, "off" should read -- OFF --.

Column 56,
Line 5, "data-is" should read -- data is --;
Line 27, "Summed" should read -- summed --; and
Line 57, "on." should read -- on --.

Column 57,
Line 12, "operation," should read -- operations, --; and
Line 58, "and." should read -- and --.

Column 58,
Line 59, "be also" should read -- also be --; and
Line 62, "consists" should read -- consist --.

Column 59,
Line 19, "be also" should read -- also be --.

UNITED STATES PATENT AND TRADEMARK OFFICE
CERTIFICATE OF CORRECTION

PATENT NO. : 6,267,476 B1
DATED : July 31, 2001
INVENTOR(S) : Masao Kato et al.

It is certified that error appears in the above-identified patent and that said Letters Patent is hereby corrected as shown below:

Column 60,
Line 2, "port," should read -- ports, --;
Line 28, "document," should read -- documents, -- and "as" should read -- as an -- and "for" should read -- for a --; and
Line 41, "storing" should read -- storing an --.

Column 61,
Line 62, "printing-" should read -- printing --.

Column 63,
Line 7, "are" should read -- is --.

Column 64,
Line 59, "S" should read -- S, --.

Column 65,
Line 10, "as" should read -- (as --.

Column 67,
Line 46, "medium, and" should read -- medium, --.

Signed and Sealed this

Ninth Day of July, 2002

Attest:

JAMES E. ROGAN
*Attesting Officer*        *Director of the United States Patent and Trademark Office*